(12) United States Patent
Sharma et al.

(10) Patent No.: US 12,509,506 B2
(45) Date of Patent: Dec. 30, 2025

(54) ANTI-HOG TCN1 MONOCLONAL ANTIBODIES AND METHODS OF PRODUCTION AND USE THEREOF

(71) Applicant: Siemens Healthcare Diagnostics Inc., Tarrytown, NY (US)

(72) Inventors: Manoj Sharma, Hockessin, DE (US); Tatiana Mareeva, Haddonfield, NJ (US); Yuriy Smirnov, Haddonfield, NJ (US); Pratap Singh, Richmond, TX (US); William Bedzyk, Odessa, DE (US)

(73) Assignee: Siemens Healthcare Diagnostics Inc., Tarrytown, NY (US)

( * ) Notice: Subject to any disclaimer, the term of this patent is extended or adjusted under 35 U.S.C. 154(b) by 940 days.

(21) Appl. No.: 17/633,131

(22) PCT Filed: Aug. 7, 2020

(86) PCT No.: PCT/US2020/045318
§ 371 (c)(1),
(2) Date: Feb. 4, 2022

(87) PCT Pub. No.: WO2021/030166
PCT Pub. Date: Feb. 18, 2021

(65) Prior Publication Data
US 2022/0332803 A1 Oct. 20, 2022

Related U.S. Application Data

(60) Provisional application No. 62/884,711, filed on Aug. 9, 2019.

(51) Int. Cl.
*C07K 16/18* (2006.01)
*G01N 33/68* (2006.01)
*C07K 14/47* (2006.01)

(52) U.S. Cl.
CPC ............ *C07K 16/18* (2013.01); *G01N 33/68* (2013.01); *C07K 14/47* (2013.01); *C07K 2317/34* (2013.01); *C07K 2317/565* (2013.01); *G01N 2333/47* (2013.01)

(58) Field of Classification Search
CPC ... C07K 14/47; C07K 16/18; C07K 2317/565
See application file for complete search history.

(56) References Cited

U.S. PATENT DOCUMENTS

| | | | |
|---|---|---|---|
| 5,227,311 | A | 7/1993 | Kuemmerle et al. |
| 5,451,508 | A | 9/1995 | Hoyle et al. |
| 5,506,109 | A | 4/1996 | Pourfarzaneh et al. |
| 5,843,887 | A | 12/1998 | Petit et al. |
| 6,942,977 | B1 | 9/2005 | Newman et al. |
| 2004/0132213 | A1 | 7/2004 | Orning |
| 2005/0169910 | A1 | 8/2005 | Morgan et al. |
| 2006/0073161 | A1 | 4/2006 | Breton |
| 2010/0124754 | A1 | 5/2010 | Wonderling et al. |
| 2013/0164309 | A1 | 6/2013 | Quadros et al. |
| 2018/0371055 | A1 | 12/2018 | Kwon |

FOREIGN PATENT DOCUMENTS

| | | |
|---|---|---|
| CN | 1530659 | 9/2004 |
| CN | 1788200 | 6/2006 |
| CN | 1324450 | 7/2007 |
| CN | 1549862 | 11/2014 |
| CN | 103857698 | 11/2014 |
| CN | 104198598 | 3/2016 |
| CN | 105601752 | 5/2016 |
| CN | 106693443 | 5/2017 |
| CN | 108368160 | 8/2018 |
| CN | 107001474 | 10/2021 |
| EP | 0287012 | 10/1988 |
| EP | 2042870 | 4/2009 |
| JP | 2004526973 | 9/2004 |
| JP | 2006520466 | 9/2006 |
| WO | 2001063297 | 8/2001 |
| WO | 2002086513 | 10/2002 |
| WO | 2008053019 | 5/2008 |
| WO | 2017189959 | 11/2017 |
| WO | 2018213316 | 11/2018 |

OTHER PUBLICATIONS

Benjamini et al., 1991. Immunology: A Short Course, 2nd edition, p. 40 only.*
Ferrara et al (2015. mAbs. 7(1): 32-41).*
Hewitt (1990. Eur J Biochem. 189: 125-130).*
Campbell (1984, Laboratory Techniques in Biochemistry And Molecular Biology, vol. 13, Chapter 1, pp. 1-33).*
www.ncbi.nlm.nih.go v /protein/PI 7630.1 , Apr. 3, 2013, RecName: Full=Transcobalamin-1; Short=TC-1; AltName: Full=Cobalophilin; AltName: Full=Haptocorrin; AltName: Full=Protein R; AltName: Full=Transcobalamin I; Short=TC I; Short=TCI; Flags: Precursor.
Vitamin b12, Elecsys and cobas e analyzers, vitB12 on roche-04745736, cobas, Aug. 31, 2007.
International Search Report for PCT/US2020/045318 dated Nov. 23, 2020.
Yang Huixin et al:"Preparation and identification of monoclonal antibody against porcine skeletal muscle myosin light chain kinase", Animal Husbandry & Veterinary Medicine 2017 vol. 49 No. 2, p. 68-72, Feb. 10, 2017, English Abstract.
Marcoullis George et al:"Isolation of Vitamin B-12-Binding Proteins By Combined Immuno and Affinity Chromatography" Biochimica et Biophysica Acta, 1977, vol. 495, pp. 336-348.

(Continued)

*Primary Examiner* — Zachary C Howard

(57) ABSTRACT

Anti-hog TCN1 monoclonal antibodies are disclosed, along with epitopes recognized by same. Also disclosed are kits containing the monoclonal antibodies and methods of producing the antibodies. Further disclosed are methods of using the monoclonal antibodies, such as (but not limited to) in methods of estimating and/or removing TCN1 from hog intrinsic factor preparations.

26 Claims, 13 Drawing Sheets
Specification includes a Sequence Listing.

(56) References Cited

OTHER PUBLICATIONS

Hygum Katrine et al:"Mouse Transcobalamin Has Features Resembling both Human Transcobalamin and Haptocorrin", PLoS ONE, vol. 6, No. 5 e20638, pp. 1-7, May 2011.

Fedosov Sergey N. et al:"Mapping the functional domains of human transcobalamin using monoclonal antibodies", FEBS Journal, 2005, vol. 272, pp. 3887-3898.

Rudikoff S et al; "Single amino acid substitution altering antigen-binding specificity"; Proceedings of the national academy of sciences; vol. 79; Mar. 1, 1982; pp. 1979-1983.

Nexo E et al: "Measurement of Transcobalamin By Elisa" Clinical Chemistry, Oxford University Press US; vol. 46, No. 10; Oct. 1, 2000; pp. 1643-1649.

Hardlei et al.; "Enzymatic extraction of cobalin from monoclanal antibody captured haptocorrin and transcobalamin"; Clinical Biochemistry, Elsevier, Amsterdam, NL, vol. 40, No. 18; Nov. 26, 2007; (Nov. 26, 2007); pp. 1392-1397.

Enquirebiotm; "Recombinant Pig transcobalamin-1 Protein"; Oct. 12, 2022; XP055970478; Retrieved from the Internet; www.fishersci.de/shop/products/Recombinant-Pig-transcobalamin-1-Protein-9/1609827.

Anonymous: "MeSH Browser"; Nov. 19, 1974; XP055970398; Retrieved from the Internet: https://meshb.nlm.nih.gov/record/ui?name=Transcolabamins; Retrieved on Dec. 10, 2022.

* cited by examiner

```
                    Signal peptide                         R1 peptide
       MRQSHQLPLVGLLLFSLIPSQLCQSCVVSEKDYSHLRLLISAMDNLEQIRGI--YGA--    55
HC  1  ++ ++ +++++++ ++++ +   +++S +   +++ ++   +++ ++ +    +++
IF  1  MDSTGESGMARAALQLLTLLWAVAGTSTQTRSSCSVPSAEGPLVNGIGVLMEQSVTSSAFPNPS   63

R2 peptide
       SILLSQRLAGIQNPSLEEELSQRIQDDMNRRDMSNLTSGQLALIILAF-GACKTPDVRFI    114
HC  56 SIL++   LAG N    +E L+ ++    + S+LT+GQLAL I+A   +C+ P  R
IF  64 SILIAMNLAGAYNTEAQELLTYKLMAS----NTSDLTTGQLALTIMALTSSCRDPGNRIA    119

HDHHLVEKLGEKFKEEIKNMEIHNSNPLTNYYQLSFDVLTLCLFRGNYSISNVTHYFNPE    174
HC 115       +E           +++ H S    +Y+ S  +LTLC         ++    +
IF 120 ILQGQMENWAPP------SLDTHAST----FYEPSLGILTLCQNNPEKTLPLAARFAKTL    169

R3 peptide
       NKNFNLSGHFSVDTGAVAVLALTCVKRSISNGKIKA-AIKDSDTIQKYIESLVHKIQSEK    233
HC 175    N    S   F++DTGA+A LALTC+    I  G +     S   ++  +E++  +IQ
IF 170 LAN---SSPFNMDTGAMATLALTCMYNKIPVGSEEGYRALFSQVLRNTVENISMRIQDNG    226

MVVSL-ETRIAQEKLCRLSLSHQTITKMNQIAKKLWTRCLTHSQGVFRLPIAAAQILPAL    292
HC 234 ++ ++  T +A + L   S++ +     K    K +  T       +G F  P+A AQILP+L
IF 227 IIGNIYSTGLAMQAL---SVTPERPNKEWDCQKTMDTVLTEIKEGKFHNPMAIAQILPSL    283

LGKTYLDVTKLLLVP--KVQVNITDEPVPVPTLSPENISVIYCV--KINEISNCINIT-    347
HC 293                 GKTYLDV +   P  +V  + + P P VPT +P NI+VIY  +   ++    N T
IF 284 KGKTYLDVPHVSCSPGHEVPPTLPNHPSP-VPTPAP-NITVIYTINNQLRGVELLFNETI    341

------VFLDVMKAAQEKNSTIYGFTMTETPWGPYITSVQGIWANNNERTYWE    394
HC 348        V L V++ AQ KN     + F MT T WGP ++S+   I  N N RTYW+
IF 342 SVSVKRGSVLLIVLEEAQRKNPK-FKFEMTMTSWGPVVSSINNIAENVNHRTYWQ    395
```

FIG. 2

SEQUENCE LISTING

<160> NUMBER OF SEQ ID NOS: 71

<210> SEQ ID NO 1
<211> LENGTH: 417
<212> TYPE: PRT
<213> ORGANISM: Sus scrofa

<400> SEQUENCE: 1

```
Met Arg Gln Ser His Gln Leu Pro Leu Val Gly Leu Leu Leu Phe Ser
1               5                   10                  15

Leu Ile Pro Ser Gln Leu Cys Gln Ser Cys Val Val Ser Glu Lys Asp
                20                  25                  30

Tyr Ser His Leu Arg Leu Leu Ile Ser Ala Met Asp Asn Leu Glu Gln
            35                  40                  45

Ile Arg Gly Ile Tyr Gly Ala Ser Ile Leu Leu Ser Gln Arg Leu Ala
        50                  55                  60

Gly Ile Gln Asn Pro Ser Leu Glu Glu Glu Leu Ser Gln Arg Ile Gln
65                  70                  75                  80

Asp Asp Met Asn Arg Arg Asp Met Ser Asn Leu Thr Ser Gly Gln Leu
                85                  90                  95

Ala Leu Ile Ile Leu Ala Phe Gly Ala Cys Lys Thr Pro Asp Val Arg
```

```
                    100                 105                 110
        Phe Ile His Asp His His Leu Val Glu Lys Leu Gly Glu Lys Phe Lys
                        115                 120                 125
        Glu Glu Ile Lys Asn Met Glu Ile His Asn Ser Asn Pro Leu Thr Asn
                130                 135                 140
        Tyr Tyr Gln Leu Ser Phe Asp Val Leu Thr Leu Cys Leu Phe Arg Gly
        145                 150                 155                 160
        Asn Tyr Ser Ile Ser Asn Val Thr His Tyr Phe Asn Pro Glu Asn Lys
                        165                 170                 175
        Asn Phe Asn Leu Ser Gly His Phe Ser Val Asp Thr Gly Ala Val Ala
                    180                 185                 190
        Val Leu Ala Leu Thr Cys Val Lys Arg Ser Ile Ser Asn Gly Lys Ile
                    195                 200                 205
        Lys Ala Ala Ile Lys Asp Ser Asp Thr Ile Gln Lys Tyr Ile Glu Ser
        210                 215                 220
        Leu Val His Lys Ile Gln Ser Glu Lys Met Val Val Ser Leu Glu Thr
        225                 230                 235                 240
        Arg Ile Ala Gln Glu Lys Leu Cys Arg Leu Ser Leu Ser His Gln Thr
                        245                 250                 255
        Ile Thr Lys Met Asn Gln Ile Ala Lys Lys Leu Trp Thr Arg Cys Leu
                    260                 265                 270
        Thr His Ser Gln Gly Val Phe Arg Leu Pro Ile Ala Ala Gln Ile
                275                 280                 285
        Leu Pro Ala Leu Leu Gly Lys Thr Tyr Leu Asp Val Thr Lys Leu Leu
            290                 295                 300
        Leu Val Pro Lys Val Gln Val Asn Ile Thr Asp Glu Pro Val Pro Val
        305                 310                 315                 320
        Val Pro Thr Leu Ser Pro Glu Asn Ile Ser Val Ile Tyr Cys Val Lys
                        325                 330                 335
        Ile Asn Glu Ile Ser Asn Cys Ile Asn Ile Thr Val Phe Leu Asp Val
                    340                 345                 350
        Met Lys Ala Ala Gln Glu Lys Asn Ser Thr Ile Tyr Gly Phe Thr Met
                    355                 360                 365
        Thr Glu Thr Pro Trp Gly Pro Tyr Ile Thr Ser Val Gln Gly Ile Trp
                370                 375                 380
        Ala Asn Asn Asn Glu Arg Thr Tyr Trp Glu His Ser Glu Gln Gln Gln
        385                 390                 395                 400
        Ile Thr Lys Pro Arg Ser Met Gly Ile Met Leu Ser Lys Met Glu Ser
                        405                 410                 415
        Ile

<210> SEQ ID NO 2
<211> LENGTH: 11
<212> TYPE: PRT
<213> ORGANISM: Sus scrofa

<400> SEQUENCE: 2

Ser Glu Lys Asp Tyr Ser His Leu Arg Leu Leu
1               5                   10

<210> SEQ ID NO 3
<211> LENGTH: 10
<212> TYPE: PRT
<213> ORGANISM: Sus scrofa
<220> FEATURE:
<221> NAME/KEY: MISC_FEATURE
```

```
<222> LOCATION: (4)..(4)
<223> OTHER INFORMATION: Methionine in native TCN1 sequence; Norleucine
      in R2 peptide sequence
<220> FEATURE:
<221> NAME/KEY: MISC_FEATURE
<222> LOCATION: (9)..(9)
<223> OTHER INFORMATION: Methionine in native TCN1 sequence; Norleucine
      in R2 peptide sequence

<400> SEQUENCE: 3

Gln Asp Asp Xaa Asn Arg Arg Asp Xaa Ser
1               5                   10

<210> SEQ ID NO 4
<211> LENGTH: 16
<212> TYPE: PRT
<213> ORGANISM: Sus scrofa

<400> SEQUENCE: 4

Lys Arg Ser Ile Ser Asn Gly Lys Ile Lys Ala Ala Ile Lys Asp Ser
1               5                   10                  15

<210> SEQ ID NO 5
<211> LENGTH: 1422
<212> TYPE: DNA
<213> ORGANISM: artificial sequence
<220> FEATURE:
<223> OTHER INFORMATION: DNA sequence of heavy chain of monoclonal
      antibody 171B 1G5

<400> SEQUENCE: 5
atgatggtgt taagtcttct gtacctgttg acagcccttc gggtatcct  gtcagaggtg      60 cagcttcagg agtcaggacc tagcctcgtg aaaccttctc agactctgtc cctcacctgt    120
tctgtcactg gcgactccat caccagtgat tactggaact ggatccggaa gttcccaggg    180
aataaacttg agtacatggg gtacataagt tacagtggta acacttatta cattccatct    240
ctcaaaagtc gaatctccat cactcgagac acatccaaga accagtacta cctgcagttg    300
aattctgtca cttctgagga cacagccacg tattactgtg caaggtatga ttacgacgtt    360
tacttttctc tggactactg gggtcaagga acctcagtca ccgtctcctc agccaaaaca    420
acacccccat cagtctatcc actggcccct gggtgtggag atacaactgg ttcctccgtg    480
actctgggat gcctggtcaa gggctacttc cctgagtcag tgactgtgac ttggaactcc    540
ggatccctgt ccagcagtgt gcacaccttc ccagctctcc tgcagtctgg actctacact    600
atgagcagct cagtgactgt cccctccagc acctggccaa gccagaccgt acctgcagt    660 gttgctcacc cagccagcag caccacggtg gacaaaaaac ttgagcccag cgggcccact    720
tcaacaatca cccctgtcc tccatgcaag gagtgtcaca atgcccagc tcctaacctc    780 gagggtggac catccgtctt catcttccct ccaaatatca aggatgtact catgatctcc    840
ctgacaccca aggtcacgtg tgtggtggtg gatgtgagcg aggatgaccc agacgtccag    900
atcagctggt ttgtgaacaa cgtggaagta ctcacagctc agacacaaac ccatagagag    960
gattacaaca gtactatccg ggtggtcagt gccctcccca tccagcacca ggactggatg   1020
agtggcaagg agttcaaatg caaggtcaac aacaaagacc tcccagcgcc cattgagaga   1080
accatctcaa aaattaaagg atagtcaga gctccacaag tatacatctt gtcgccacca   1140
ccagagcagt gtccaggaa agatgtcagt ctgacttgcc tggccgtggg cttcagccct   1200
gaagacatca gtgtggagtg gaccagcaat gggcatacag aggagaacta caagaacacc   1260
gcaccagtcc tagactctga cggttcttac ttcatataca gcaagctcga tataaaaaca   1320
```

```
agcaagtggg agaaaacaga ttccttctca tgcaacgtga acatgaggg tctgcacagt  1380 tactacctga agaagaccat ctcccggtct ccgggtaaat ga                    1422
```

<210> SEQ ID NO 6
<211> LENGTH: 473
<212> TYPE: PRT
<213> ORGANISM: artificial sequence
<220> FEATURE:
<223> OTHER INFORMATION: Amino acid sequence of heavy chain of
      monoclonal antibody 171B 1G5

<400> SEQUENCE: 6

```
Met Met Val Leu Ser Leu Leu Tyr Leu Leu Thr Ala Leu Pro Gly Ile
1               5                   10                  15

Leu Ser Glu Val Gln Leu Gln Glu Ser Gly Pro Ser Leu Val Lys Pro
            20                  25                  30

Ser Gln Thr Leu Ser Leu Thr Cys Ser Val Thr Gly Asp Ser Ile Thr
        35                  40                  45

Ser Asp Tyr Trp Asn Trp Ile Arg Lys Phe Pro Gly Asn Lys Leu Glu
    50                  55                  60

Tyr Met Gly Tyr Ile Ser Tyr Ser Gly Asn Thr Tyr Tyr Ile Pro Ser
65                  70                  75                  80

Leu Lys Ser Arg Ile Ser Ile Thr Arg Asp Thr Ser Lys Asn Gln Tyr
                85                  90                  95

Tyr Leu Gln Leu Asn Ser Val Thr Ser Glu Asp Thr Ala Thr Tyr Tyr
            100                 105                 110

Cys Ala Arg Tyr Asp Tyr Asp Val Tyr Phe Ser Leu Asp Tyr Trp Gly
        115                 120                 125

Gln Gly Thr Ser Val Thr Val Ser Ser Ala Lys Thr Thr Pro Pro Ser
    130                 135                 140

Val Tyr Pro Leu Ala Pro Gly Cys Gly Asp Thr Thr Gly Ser Ser Val
145                 150                 155                 160

Thr Leu Gly Cys Leu Val Lys Gly Tyr Phe Pro Glu Ser Val Thr Val
                165                 170                 175

Thr Trp Asn Ser Gly Ser Leu Ser Ser Val His Thr Phe Pro Ala
            180                 185                 190

Leu Leu Gln Ser Gly Leu Tyr Thr Met Ser Ser Ser Val Thr Val Pro
        195                 200                 205

Ser Ser Thr Trp Pro Ser Gln Thr Val Thr Cys Ser Val Ala His Pro
    210                 215                 220

Ala Ser Ser Thr Thr Val Asp Lys Lys Leu Glu Pro Ser Gly Pro Thr
225                 230                 235                 240

Ser Thr Ile Asn Pro Cys Pro Pro Cys Lys Glu Cys His Lys Cys Pro
                245                 250                 255

Ala Pro Asn Leu Glu Gly Gly Pro Ser Val Phe Ile Phe Pro Pro Asn
            260                 265                 270

Ile Lys Asp Val Leu Met Ile Ser Leu Thr Pro Lys Val Thr Cys Val
        275                 280                 285

Val Val Asp Val Ser Glu Asp Asp Pro Asp Val Gln Ile Ser Trp Phe
    290                 295                 300

Val Asn Asn Val Glu Val Leu Thr Ala Gln Thr Gln Thr His Arg Glu
305                 310                 315                 320

Asp Tyr Asn Ser Thr Ile Arg Val Val Ser Ala Leu Pro Ile Gln His
                325                 330                 335
```

```
Gln Asp Trp Met Ser Gly Lys Glu Phe Lys Cys Lys Val Asn Asn Lys
                340                 345                 350

Asp Leu Pro Ala Pro Ile Glu Arg Thr Ile Ser Lys Ile Lys Gly Ile
            355                 360                 365

Val Arg Ala Pro Gln Val Tyr Ile Leu Ser Pro Pro Glu Gln Leu
370                 375                 380

Ser Arg Lys Asp Val Ser Leu Thr Cys Leu Ala Val Gly Phe Ser Pro
385                 390                 395                 400

Glu Asp Ile Ser Val Glu Trp Thr Ser Asn Gly His Thr Glu Glu Asn
                405                 410                 415

Tyr Lys Asn Thr Ala Pro Val Leu Asp Ser Asp Gly Ser Tyr Phe Ile
            420                 425                 430

Tyr Ser Lys Leu Asp Ile Lys Thr Ser Lys Trp Glu Lys Thr Asp Ser
        435                 440                 445

Phe Ser Cys Asn Val Arg His Glu Gly Leu His Ser Tyr Tyr Leu Lys
    450                 455                 460

Lys Thr Ile Ser Arg Ser Pro Gly Lys
465                 470

<210> SEQ ID NO 7
<211> LENGTH: 137
<212> TYPE: PRT
<213> ORGANISM: artificial sequence
<220> FEATURE:
<223> OTHER INFORMATION: Amino acid sequence of heavy chain variable
      region of monoclonal antibody 171B 1G5

<400> SEQUENCE: 7

Met Met Val Leu Ser Leu Leu Tyr Leu Leu Thr Ala Leu Pro Gly Ile
1               5                   10                  15

Leu Ser Glu Val Gln Leu Gln Glu Ser Gly Pro Ser Leu Val Lys Pro
            20                  25                  30

Ser Gln Thr Leu Ser Leu Thr Cys Ser Val Thr Gly Asp Ser Ile Thr
        35                  40                  45

Ser Asp Tyr Trp Asn Trp Ile Arg Lys Phe Pro Gly Asn Lys Leu Glu
    50                  55                  60

Tyr Met Gly Tyr Ile Ser Tyr Ser Gly Asn Thr Tyr Tyr Ile Pro Ser
65                  70                  75                  80

Leu Lys Ser Arg Ile Ser Ile Thr Arg Asp Thr Ser Lys Asn Gln Tyr
                85                  90                  95

Tyr Leu Gln Leu Asn Ser Val Thr Ser Glu Asp Thr Ala Thr Tyr Tyr
            100                 105                 110

Cys Ala Arg Tyr Asp Tyr Asp Val Tyr Phe Ser Leu Asp Tyr Trp Gly
        115                 120                 125

Gln Gly Thr Ser Val Thr Val Ser Ser
    130                 135

<210> SEQ ID NO 8
<211> LENGTH: 5
<212> TYPE: PRT
<213> ORGANISM: artificial sequence
<220> FEATURE:
<223> OTHER INFORMATION: amino acid sequence of heavy chain CDR1 of mAb
      171B 1G5

<400> SEQUENCE: 8

Ser Asp Tyr Trp Asn
1               5
```

```
<210> SEQ ID NO 9
<211> LENGTH: 16
<212> TYPE: PRT
<213> ORGANISM: artificial sequence
<220> FEATURE:
<223> OTHER INFORMATION: amino acid sequence of heavy chain CDR2 of mAb
      171B 1G5

<400> SEQUENCE: 9

Tyr Ile Ser Tyr Ser Gly Asn Thr Tyr Tyr Ile Pro Ser Leu Lys Ser
1               5                   10                  15

<210> SEQ ID NO 10
<211> LENGTH: 11
<212> TYPE: PRT
<213> ORGANISM: artificial sequence
<220> FEATURE:
<223> OTHER INFORMATION: amino acid sequence of heavy chain CDR3 of mAb
      171B 1G5

<400> SEQUENCE: 10

Tyr Asp Tyr Asp Val Tyr Phe Ser Leu Asp Tyr
1               5                   10

<210> SEQ ID NO 11
<211> LENGTH: 717
<212> TYPE: DNA
<213> ORGANISM: artificial sequence
<220> FEATURE:
<223> OTHER INFORMATION: DNA sequence of light chain of mAb 171B 1G5

<400> SEQUENCE: 11
atgaagttgc ctgttaggct gttggtgctg atgttctgga ttcctgcttc cagcagtgat      60
gttgtgatga cccaaactcc actctccctg cctgtcagtc ttggagatca agcctccatc     120
tcttgcagat ctagtcagag ccttgtacac agtaatagaa atacctattt acattggtac     180
ctgcagaggc caggccagtc tccaaaaactc tggtctaca aagtttccaa ccgattttct     240
ggggtcccag acaggttcag tggcagtgga tcagggacag atttcacact caagatcagc     300
agagtggagg ctgaggatct gggagtttat ttctgctctc aaagtacaca tgttcctctc     360
acgttcggtg ctgggaccaa gctggagctg aaacggctg atgctgcacc aactgtatcc     420
atcttcccac catccagtga gcagttaaca tctggaggtg cctcagtcgt gtgcttcttg     480
aacaacttct accccaaaga catcaatgtc aagtggaaga ttgatggcag tgaacgacaa     540
aatggcgtcc tgaacagttg gactgatcag gacagcaaag acagcaccta cagcatgagc     600
agcaccctca cgttgaccaa ggacgagtat gaacgacata cagctatac ctgtgaggcc     660 actcacaaga catcaacttc acccattgtc aagagcttca caggaatga gtgttag       717

<210> SEQ ID NO 12
<211> LENGTH: 238
<212> TYPE: PRT
<213> ORGANISM: artificial sequence
<220> FEATURE:
<223> OTHER INFORMATION: Amino acid sequence of light chain of
      monoclonal antibody 171B 1G5

<400> SEQUENCE: 12

Met Lys Leu Pro Val Arg Leu Leu Val Leu Met Phe Trp Ile Pro Ala
1               5                   10                  15

Ser Ser Ser Asp Val Val Met Thr Gln Thr Pro Leu Ser Leu Pro Val
                20                  25                  30
```

Ser Leu Gly Asp Gln Ala Ser Ile Ser Cys Arg Ser Gln Ser Leu
            35                  40                  45

Val His Ser Asn Arg Asn Thr Tyr Leu His Trp Tyr Leu Gln Arg Pro
 50                  55                  60

Gly Gln Ser Pro Lys Leu Leu Val Tyr Lys Val Ser Asn Arg Phe Ser
 65                  70                  75                  80

Gly Val Pro Asp Arg Phe Ser Gly Ser Gly Ser Gly Thr Asp Phe Thr
                 85                  90                  95

Leu Lys Ile Ser Arg Val Glu Ala Glu Asp Leu Gly Val Tyr Phe Cys
            100                 105                 110

Ser Gln Ser Thr His Val Pro Leu Thr Phe Gly Ala Gly Thr Lys Leu
            115                 120                 125

Glu Leu Lys Arg Ala Asp Ala Ala Pro Thr Val Ser Ile Phe Pro Pro
130                 135                 140

Ser Ser Glu Gln Leu Thr Ser Gly Gly Ala Ser Val Val Cys Phe Leu
145                 150                 155                 160

Asn Asn Phe Tyr Pro Lys Asp Ile Asn Val Lys Trp Lys Ile Asp Gly
                165                 170                 175

Ser Glu Arg Gln Asn Gly Val Leu Asn Ser Trp Thr Asp Gln Asp Ser
            180                 185                 190

Lys Asp Ser Thr Tyr Ser Met Ser Ser Thr Leu Thr Leu Thr Lys Asp
            195                 200                 205

Glu Tyr Glu Arg His Asn Ser Tyr Thr Cys Glu Ala Thr His Lys Thr
210                 215                 220

Ser Thr Ser Pro Ile Val Lys Ser Phe Asn Arg Asn Glu Cys
225                 230                 235

<210> SEQ ID NO 13
<211> LENGTH: 112
<212> TYPE: PRT
<213> ORGANISM: artificial sequence
<220> FEATURE:
<223> OTHER INFORMATION: Amino acid sequence of light chain variable
      region of monoclonal antibody 171B 1G5

<400> SEQUENCE: 13

Asp Val Val Met Thr Gln Thr Pro Leu Ser Leu Pro Val Ser Leu Gly
 1               5                  10                  15

Asp Gln Ala Ser Ile Ser Cys Arg Ser Gln Ser Leu Val His Ser
            20                  25                  30

Asn Arg Asn Thr Tyr Leu His Trp Tyr Leu Gln Arg Pro Gly Gln Ser
            35                  40                  45

Pro Lys Leu Leu Val Tyr Lys Val Ser Asn Arg Phe Ser Gly Val Pro
 50                  55                  60

Asp Arg Phe Ser Gly Ser Gly Ser Gly Thr Asp Phe Thr Leu Lys Ile
 65                  70                  75                  80

Ser Arg Val Glu Ala Glu Asp Leu Gly Val Tyr Phe Cys Ser Gln Ser
                 85                  90                  95

Thr His Val Pro Leu Thr Phe Gly Ala Gly Thr Lys Leu Glu Leu Lys
            100                 105                 110

<210> SEQ ID NO 14
<211> LENGTH: 16
<212> TYPE: PRT
<213> ORGANISM: artificial sequence
<220> FEATURE:
<223> OTHER INFORMATION: amino acid sequence of light chain CDR1 of mAb
      171B 1G5

```
<400> SEQUENCE: 14

Arg Ser Ser Gln Ser Leu Val His Ser Asn Arg Asn Thr Tyr Leu His
1               5                  10                  15

<210> SEQ ID NO 15
<211> LENGTH: 7
<212> TYPE: PRT
<213> ORGANISM: artificial sequence
<220> FEATURE:
<223> OTHER INFORMATION: amino acid sequence of light chain CDR2 of mAb
      171B 1G5

<400> SEQUENCE: 15

Lys Val Ser Asn Arg Phe Ser
1               5

<210> SEQ ID NO 16
<211> LENGTH: 9
<212> TYPE: PRT
<213> ORGANISM: artificial sequence
<220> FEATURE:
<223> OTHER INFORMATION: amino acid sequence of light chain CDR3 of mAb
      171B 1G5

<400> SEQUENCE: 16

Ser Gln Ser Thr His Val Pro Leu Thr
1               5

<210> SEQ ID NO 17
<211> LENGTH: 425
<212> TYPE: PRT
<213> ORGANISM: Sus scrofa

<400> SEQUENCE: 17

Met Asp Ser Thr Gly Glu Ser Gly Met Ala Arg Ala Ala Leu Gln Leu
1               5                  10                  15

Leu Thr Leu Leu Trp Ala Val Ala Gly Thr Ser Thr Gln Thr Arg Ser
            20                  25                  30

Ser Cys Ser Val Pro Ser Ala Glu Gln Pro Leu Val Asn Gly Ile Gln
        35                  40                  45

Val Leu Met Glu Gln Ser Val Thr Ser Ser Ala Phe Pro Asn Pro Ser
    50                  55                  60

Ile Leu Ile Ala Met Asn Leu Ala Gly Ala Tyr Asn Thr Glu Ala Gln
65                  70                  75                  80

Glu Leu Leu Thr Tyr Lys Leu Met Ala Ser Asn Thr Ser Asp Leu Thr
                85                  90                  95

Thr Gly Gln Leu Ala Leu Thr Ile Met Ala Leu Thr Ser Ser Cys Arg
            100                 105                 110

Asp Pro Gly Asn Arg Ile Ala Ile Leu Gln Gly Gln Met Glu Asn Trp
        115                 120                 125

Ala Pro Pro Ser Leu Asp Thr His Ala Ser Thr Phe Tyr Glu Pro Ser
    130                 135                 140

Leu Gly Ile Leu Thr Leu Cys Gln Asn Asn Pro Glu Lys Thr Leu Pro
145                 150                 155                 160

Leu Ala Ala Arg Phe Ala Lys Thr Leu Leu Ala Asn Ser Ser Pro Phe
                165                 170                 175

Asn Met Asp Thr Gly Ala Met Ala Thr Leu Ala Leu Thr Cys Met Tyr
            180                 185                 190

Asn Lys Ile Pro Val Gly Ser Glu Glu Gly Tyr Arg Ala Leu Phe Ser
```

```
                195                 200                 205
Gln Val Leu Arg Asn Thr Val Glu Asn Ile Ser Met Arg Ile Gln Asp
    210                 215                 220
Asn Gly Ile Ile Gly Asn Ile Tyr Ser Thr Gly Leu Ala Met Gln Ala
225                 230                 235                 240
Leu Ser Val Thr Pro Glu Arg Pro Asn Lys Glu Trp Asp Cys Gln Lys
                245                 250                 255
Thr Met Asp Thr Val Leu Thr Glu Ile Lys Glu Gly Lys Phe His Asn
            260                 265                 270
Pro Met Ala Ile Ala Gln Ile Leu Pro Ser Leu Lys Gly Lys Thr Tyr
        275                 280                 285
Leu Asp Val Pro His Val Ser Cys Ser Pro Gly His Glu Val Pro Pro
    290                 295                 300
Thr Leu Pro Asn His Pro Ser Pro Val Pro Thr Pro Ala Pro Asn Ile
305                 310                 315                 320
Thr Val Ile Tyr Thr Ile Asn Asn Gln Leu Arg Gly Val Glu Leu Leu
                325                 330                 335
Phe Asn Glu Thr Ile Ser Val Ser Val Lys Arg Gly Ser Val Leu Leu
            340                 345                 350
Ile Val Leu Glu Glu Ala Gln Arg Lys Asn Pro Lys Phe Lys Phe Glu
        355                 360                 365
Thr Thr Met Thr Ser Trp Gly Pro Val Val Ser Ser Ile Asn Asn Ile
    370                 375                 380
Ala Glu Asn Val Asn His Arg Thr Tyr Trp Gln Phe Leu Ser Gly Gln
385                 390                 395                 400
Thr Pro Leu Asn Glu Gly Val Ala Asp Tyr Ile Pro Phe Asn His Glu
                405                 410                 415
His Ile Thr Ala Asn Phe Thr Gln Tyr
            420                 425

<210> SEQ ID NO 18
<211> LENGTH: 15
<212> TYPE: PRT
<213> ORGANISM: artificial sequence
<220> FEATURE:
<223> OTHER INFORMATION: Amino acid sequence of AA junction of heavy
      chain of monoclonal antibody 171B 1G5

<400> SEQUENCE: 18

Cys Ala Arg Tyr Asp Tyr Asp Val Tyr Phe Ser Leu Asp Tyr Trp
1               5                   10                  15

<210> SEQ ID NO 19
<211> LENGTH: 11
<212> TYPE: PRT
<213> ORGANISM: artificial sequence
<220> FEATURE:
<223> OTHER INFORMATION: Amino acid sequence of AA junction of light
      chain of monoclonal antibody 171B 1G5

<400> SEQUENCE: 19

Cys Ser Gln Ser Thr His Val Pro Leu Thr Phe
1               5                   10

<210> SEQ ID NO 20
<211> LENGTH: 6
<212> TYPE: PRT
<213> ORGANISM: Sus scrofa

<400> SEQUENCE: 20
```

Asp Met Asn Arg Arg Asp
1               5

<210> SEQ ID NO 21
<211> LENGTH: 12
<212> TYPE: PRT
<213> ORGANISM: Sus scrofa

<400> SEQUENCE: 21

Leu Glu Gln Ile Arg Gly Ile Tyr Gly Ala Ser Ile
1               5                   10

<210> SEQ ID NO 22
<211> LENGTH: 9
<212> TYPE: PRT
<213> ORGANISM: Sus scrofa

<400> SEQUENCE: 22

Phe Ile His Asp His His Leu Val Glu
1               5

<210> SEQ ID NO 23
<211> LENGTH: 11
<212> TYPE: PRT
<213> ORGANISM: Sus scrofa

<400> SEQUENCE: 23

Glu Lys Leu Gly Glu Lys Phe Lys Glu Glu Ile
1               5                   10

<210> SEQ ID NO 24
<211> LENGTH: 420
<212> TYPE: DNA
<213> ORGANISM: artificial sequence
<220> FEATURE:
<223> OTHER INFORMATION: DNA sequence of heavy chain variable region of
      mAb 171J 3F1

<400> SEQUENCE: 24

```
atgggatgga gctggatctt tctctttctc ctgtcaggaa ctgcaagtgt cctctctgag      60
gtccagctac aacagtctgg acctgaactg ctgaagcctg gggtttcagt gatgatatcc     120
tgtagggctt ctggatacac tttcactgac tacaccatgc actgggtgaa acagagccat     180
ggagagagcc ttgagtggat tggaggtatt attcctaaat ctgggacttc taactacaac     240
gagaaattca aggacaaggc cacattgact gtagacaagt cctcaagcac atcctacatg     300
gagctccgca gcctgacatc tgaagattct gcagtctatt actgtgcaag aaattactat     360
gatggtggct cttactactt tgactactgg ggccaaggca ccactctcac agtctcctca     420
```

<210> SEQ ID NO 25
<211> LENGTH: 140
<212> TYPE: PRT
<213> ORGANISM: artificial sequence
<220> FEATURE:
<223> OTHER INFORMATION: amino acid sequence of heavy chain variable
      region of mAb 171J 3F1

<400> SEQUENCE: 25

Met Gly Trp Ser Trp Ile Phe Leu Phe Leu Leu Ser Gly Thr Ala Ser
1               5                   10                  15

Val Leu Ser Glu Val Gln Leu Gln Gln Ser Gly Pro Glu Leu Leu Lys
            20                  25                  30

```
Pro Gly Val Ser Val Met Ile Ser Cys Arg Ala Ser Gly Tyr Thr Phe
           35                  40                  45

Thr Asp Tyr Thr Met His Trp Val Lys Gln Ser His Gly Glu Ser Leu
 50                  55                  60

Glu Trp Ile Gly Gly Ile Ile Pro Lys Ser Gly Thr Ser Asn Tyr Asn
 65                  70                  75                  80

Glu Lys Phe Lys Asp Lys Ala Thr Leu Thr Val Asp Lys Ser Ser Ser
                 85                  90                  95

Thr Ser Tyr Met Glu Leu Arg Ser Leu Thr Ser Glu Asp Ser Ala Val
                100                 105                 110

Tyr Tyr Cys Ala Arg Asn Tyr Tyr Asp Gly Gly Ser Tyr Tyr Phe Asp
            115                 120                 125

Tyr Trp Gly Gln Gly Thr Thr Leu Thr Val Ser Ser
130                 135                 140

<210> SEQ ID NO 26
<211> LENGTH: 5
<212> TYPE: PRT
<213> ORGANISM: artificial sequence
<220> FEATURE:
<223> OTHER INFORMATION: AA sequence of HCVR CDR1 of mAb 171J 3F1

<400> SEQUENCE: 26

Asp Tyr Thr Met His
1               5

<210> SEQ ID NO 27
<211> LENGTH: 17
<212> TYPE: PRT
<213> ORGANISM: artificial sequence
<220> FEATURE:
<223> OTHER INFORMATION: amino acid sequence of HCVR CDR2 of mAb 171J
      3F1

<400> SEQUENCE: 27

Gly Ile Ile Pro Lys Ser Gly Thr Ser Asn Tyr Asn Glu Lys Phe Lys
1               5                   10                  15

Asp

<210> SEQ ID NO 28
<211> LENGTH: 12
<212> TYPE: PRT
<213> ORGANISM: artificial sequence
<220> FEATURE:
<223> OTHER INFORMATION: amino acid sequence of HCVR CDR3 of mAb 171J
      3F1

<400> SEQUENCE: 28

Asn Tyr Tyr Asp Gly Gly Ser Tyr Tyr Phe Asp Tyr
1               5                   10

<210> SEQ ID NO 29
<211> LENGTH: 381
<212> TYPE: DNA
<213> ORGANISM: artificial sequence
<220> FEATURE:
<223> OTHER INFORMATION: DNA sequence of light chain variable region of
      mAb 171 3F1

<400> SEQUENCE: 29
atgagtgtgc tcactcaggt cctggcgttg ctgctgctgt ggcttacagg tgccagatgt      60
gacatccaga tgactcagtc tccagcctcc ctatctgcat ctgtgggaga aactgtcacc     120
```

```
atcacatgtc gaacaagtgg aaatattcac aattttttaa catggtttca gcagaaacag    180
ggaaaatctc ctcagctcct ggtctatagt gcagaaacct tagcagatgg tgtgccatca    240
aggttcagtg gcagtggatc aggaacacaa tttctctca  ggatcaatag cctgcagcct    300
gaagattttg ggagttattt ttgtcaacat ttttggaata ctccattcac gttcggctcg    360
gggacaaaat tggaaatgaa a                                              381
```

```
<210> SEQ ID NO 30
<211> LENGTH: 127
<212> TYPE: PRT
<213> ORGANISM: artificial sequence
<220> FEATURE:
<223> OTHER INFORMATION: amino acid sequence of LCVR of mAb 171J 3F1

<400> SEQUENCE: 30
```

Met Ser Val Leu Thr Gln Val Leu Ala Leu Leu Leu Trp Leu Thr
1               5                   10                  15

Gly Ala Arg Cys Asp Ile Gln Met Thr Gln Ser Pro Ala Ser Leu Ser
            20                  25                  30

Ala Ser Val Gly Glu Thr Val Thr Ile Thr Cys Arg Thr Ser Gly Asn
        35                  40                  45

Ile His Asn Phe Leu Thr Trp Phe Gln Gln Lys Gln Gly Lys Ser Pro
    50                  55                  60

Gln Leu Leu Val Tyr Ser Ala Glu Thr Leu Ala Asp Gly Val Pro Ser
65                  70                  75                  80

Arg Phe Ser Gly Ser Gly Ser Gly Thr Gln Phe Ser Leu Arg Ile Asn
                85                  90                  95

Ser Leu Gln Pro Glu Asp Phe Gly Ser Tyr Phe Cys Gln His Phe Trp
            100                 105                 110

Asn Thr Pro Phe Thr Phe Gly Ser Gly Thr Lys Leu Glu Met Lys
        115                 120                 125

```
<210> SEQ ID NO 31
<211> LENGTH: 11
<212> TYPE: PRT
<213> ORGANISM: artificial sequence
<220> FEATURE:
<223> OTHER INFORMATION: amino acid sequence of LCVR CDR1 of mAb 171J
      3F1

<400> SEQUENCE: 31
```

Arg Thr Ser Gly Asn Ile His Asn Phe Leu Thr
1               5                   10

```
<210> SEQ ID NO 32
<211> LENGTH: 7
<212> TYPE: PRT
<213> ORGANISM: artificial sequence
<220> FEATURE:
<223> OTHER INFORMATION: amino acid sequence of LCVR CDR2 of mAb 171J
      3F1

<400> SEQUENCE: 32
```

Ser Ala Glu Thr Leu Ala Asp
1               5

```
<210> SEQ ID NO 33
<211> LENGTH: 9
<212> TYPE: PRT
<213> ORGANISM: artificial sequence
<220> FEATURE:
<223> OTHER INFORMATION: amino acid sequence of LCVR CDR3 of mAb 171J
```

-continued

3F1

<400> SEQUENCE: 33

Gln His Phe Trp Asn Thr Pro Phe Thr
1               5

<210> SEQ ID NO 34
<211> LENGTH: 16
<212> TYPE: PRT
<213> ORGANISM: artificial sequence
<220> FEATURE:
<223> OTHER INFORMATION: amino acid junction of heavy chain of mAb 171J
      3F1

<400> SEQUENCE: 34

Cys Ala Arg Asn Tyr Tyr Asp Gly Gly Ser Tyr Tyr Phe Asp Tyr Trp
1               5                   10                  15

<210> SEQ ID NO 35
<211> LENGTH: 11
<212> TYPE: PRT
<213> ORGANISM: artificial sequence
<220> FEATURE:
<223> OTHER INFORMATION: AA junction of LC of mAb 171J 3F1

<400> SEQUENCE: 35

Cys Gln His Phe Trp Asn Thr Pro Phe Thr Phe
1               5                   10

<210> SEQ ID NO 36
<211> LENGTH: 408
<212> TYPE: DNA
<213> ORGANISM: artificial sequence
<220> FEATURE:
<223> OTHER INFORMATION: DNA sequence of heavy chain variable region of
      mAb 171J 3A6

<400> SEQUENCE: 36
atgggatgga gcactatcat cctcttttg gtagcaacaa ctacaggtgt ccactcccag        60
gtccaactgc agcagcctgg ggctgagctg gtgaggcctg gagctttagt gaagctgtcc     120
tgcaaggctt ctggctacac attcaccaga tattggatac agtgggtgaa gcagaggcct     180
ggacaaggcc ttgagtggat tggaaacatt agtcctaata gtggcagtgt aaactacagt     240
gagaagttca gggcaaggc cacactgact gtagacaagc cctccagcac agcctacatg      300
cagctcaaca gcctgacatc tgaggactct gcggcctatt actgtgtaag atcagggggt     360
gactactttg actactgggg ccaaggcacc actctcacag tctcctca                  408

<210> SEQ ID NO 37
<211> LENGTH: 136
<212> TYPE: PRT
<213> ORGANISM: artificial sequence
<220> FEATURE:
<223> OTHER INFORMATION: amino acid sequence of HCVR of mAb 171J 3A6

<400> SEQUENCE: 37

Met Gly Trp Ser Thr Ile Ile Leu Phe Leu Val Ala Thr Thr Thr Gly
1               5                   10                  15

Val His Ser Gln Val Gln Leu Gln Gln Pro Gly Ala Glu Leu Val Arg
            20                  25                  30

Pro Gly Ala Leu Val Lys Leu Ser Cys Lys Ala Ser Gly Tyr Thr Phe
        35                  40                  45

Thr Arg Tyr Trp Ile Gln Trp Val Lys Gln Arg Pro Gly Gln Gly Leu

```
                50                  55                  60
Glu Trp Ile Gly Asn Ile Ser Pro Asn Ser Gly Ser Val Asn Tyr Ser
 65                  70                  75                  80

Glu Lys Phe Lys Gly Lys Ala Thr Leu Thr Val Asp Lys Pro Ser Ser
                 85                  90                  95

Thr Ala Tyr Met Gln Leu Asn Ser Leu Thr Ser Glu Asp Ser Ala Ala
            100                 105                 110

Tyr Tyr Cys Val Arg Ser Gly Gly Asp Tyr Phe Asp Tyr Trp Gly Gln
        115                 120                 125

Gly Thr Thr Leu Thr Val Ser Ser
    130                 135

<210> SEQ ID NO 38
<211> LENGTH: 5
<212> TYPE: PRT
<213> ORGANISM: artificial sequence
<220> FEATURE:
<223> OTHER INFORMATION: amino acid sequence of HCVR CDR1 of mAb 171J
      3A6

<400> SEQUENCE: 38

Arg Tyr Trp Ile Gln
 1               5

<210> SEQ ID NO 39
<211> LENGTH: 17
<212> TYPE: PRT
<213> ORGANISM: artificial sequence
<220> FEATURE:
<223> OTHER INFORMATION: amino acid sequence of HCVR CDR2 of mAb 171J
      3A6

<400> SEQUENCE: 39

Asn Ile Ser Pro Asn Ser Gly Ser Val Asn Tyr Ser Glu Lys Phe Lys
 1               5                  10                  15

Gly

<210> SEQ ID NO 40
<211> LENGTH: 8
<212> TYPE: PRT
<213> ORGANISM: artificial sequence
<220> FEATURE:
<223> OTHER INFORMATION: amino acid sequence of HCVR CDR3 of mAb 171J
      3A6

<400> SEQUENCE: 40

Ser Gly Gly Asp Tyr Phe Asp Tyr
 1               5

<210> SEQ ID NO 41
<211> LENGTH: 393
<212> TYPE: DNA
<213> ORGANISM: artificial sequence
<220> FEATURE:
<223> OTHER INFORMATION: DNA sequence of LCVR of mAb 171J 3A6

<400> SEQUENCE: 41
atgaagttgc ctgttaggct gttggtgctg atgttctgga ttcctgcttc cagcagtgat      60
gttttgatga cccaaactcc gctctccctg cctgtcagtc ttggagttca agcctccatc     120
tcttgcagat ctagtcagag cattttacat gctaatggaa acacctattt agaatggtac     180
ctgcagaaac caggccagtc tccaaagctc ctgatctaca agtttccaa ccgattttct     240
```

```
ggggtcccag acaggttcag tggcagtgga tcagggacag atttcacact atatatcagt    300
agagtggagg ctgaggatct gggagtttat tactgctttc aaggttcaca tcttccgtgg    360
acgttcggtg gaggcaccaa gctggaaatc aaa                                 393
```

<210> SEQ ID NO 42
<211> LENGTH: 131
<212> TYPE: PRT
<213> ORGANISM: artificial sequence
<220> FEATURE:
<223> OTHER INFORMATION: amino acid sequence of LCVR of mAb171J 3A6

<400> SEQUENCE: 42

```
Met Lys Leu Pro Val Arg Leu Leu Val Leu Met Phe Trp Ile Pro Ala
1               5                   10                  15

Ser Ser Ser Asp Val Leu Met Thr Gln Thr Pro Leu Ser Leu Pro Val
            20                  25                  30

Ser Leu Gly Val Gln Ala Ser Ile Ser Cys Arg Ser Ser Gln Ser Ile
        35                  40                  45

Leu His Ala Asn Gly Asn Thr Tyr Leu Glu Trp Tyr Leu Gln Lys Pro
    50                  55                  60

Gly Gln Ser Pro Lys Leu Leu Ile Tyr Lys Val Ser Asn Arg Phe Ser
65                  70                  75                  80

Gly Val Pro Asp Arg Phe Ser Gly Ser Gly Ser Gly Thr Asp Phe Thr
                85                  90                  95

Leu Tyr Ile Ser Arg Val Glu Ala Glu Asp Leu Gly Val Tyr Tyr Cys
            100                 105                 110

Phe Gln Gly Ser His Leu Pro Trp Thr Phe Gly Gly Gly Thr Lys Leu
        115                 120                 125

Glu Ile Lys
    130
```

<210> SEQ ID NO 43
<211> LENGTH: 16
<212> TYPE: PRT
<213> ORGANISM: artificial sequence
<220> FEATURE:
<223> OTHER INFORMATION: amino acid sequence of LCVR CDR1 of mAb 171J
    3A6

<400> SEQUENCE: 43

```
Arg Ser Ser Gln Ser Ile Leu His Ala Asn Gly Asn Thr Tyr Leu Glu
1               5                   10                  15
```

<210> SEQ ID NO 44
<211> LENGTH: 7
<212> TYPE: PRT
<213> ORGANISM: artificial sequence
<220> FEATURE:
<223> OTHER INFORMATION: amino acid sequence of LCVR CDR2 of mAb 171J
    3A6

<400> SEQUENCE: 44

```
Lys Val Ser Asn Arg Phe Ser
1               5
```

<210> SEQ ID NO 45
<211> LENGTH: 9
<212> TYPE: PRT
<213> ORGANISM: artificial sequence
<220> FEATURE:
<223> OTHER INFORMATION: amino acid sequence of LCVR CDR3 of mAb 171J
    3A6

-continued

<400> SEQUENCE: 45

Phe Gln Gly Ser His Leu Pro Trp Thr
1               5

<210> SEQ ID NO 46
<211> LENGTH: 12
<212> TYPE: PRT
<213> ORGANISM: artificial sequence
<220> FEATURE:
<223> OTHER INFORMATION: amino acid sequence of VDF junction of HC of
      mAb 171J 3A6

<400> SEQUENCE: 46

Cys Val Arg Ser Gly Gly Asp Tyr Phe Asp Tyr Trp
1               5                   10

<210> SEQ ID NO 47
<211> LENGTH: 11
<212> TYPE: PRT
<213> ORGANISM: artificial sequence
<220> FEATURE:
<223> OTHER INFORMATION: amino acid sequence of VDJ junction of LC of
      mAb 171J 3A6

<400> SEQUENCE: 47

Cys Phe Gln Gly Ser His Leu Pro Trp Thr Phe
1               5                   10

<210> SEQ ID NO 48
<211> LENGTH: 417
<212> TYPE: DNA
<213> ORGANISM: artificial sequence
<220> FEATURE:
<223> OTHER INFORMATION: DNA sequence of HCVR of mAb 171J 5H12

<400> SEQUENCE: 48
atggaatggc cttgtatctt tctcttcctc ctgtcagtaa ctgaaggtgt ccaatcccag      60
gtccaactac agcagtctgg ggctgagctg gtgaagcctg ggcctcagt gaagatttcc     120 tgcaaagctt ctggctacgc attcagtagc tcctggatga actgggtgaa gcagaggcct    180
ggaaagggtc ttgagtggat tggacagatc tatcctggag atggtgacac taactacaat    240
ggaaagttca aggataaagc cacactgact gcagacaagt cctccaacac agcctacatg    300
caactcagca gcctgacatc tgaggactct gcggtctatt tctgtgcaag agttaactgg    360
gacgctttct cttacatcga tgtctggggc acagggacca cggtcaccgt ctcctca       417

<210> SEQ ID NO 49
<211> LENGTH: 139
<212> TYPE: PRT
<213> ORGANISM: artificial sequence
<220> FEATURE:
<223> OTHER INFORMATION: amino acid sequence of HCVR of mAb 171J 5H12

<400> SEQUENCE: 49

Met Glu Trp Pro Cys Ile Phe Leu Phe Leu Leu Ser Val Thr Glu Gly
1               5                   10                  15

Val Gln Ser Gln Val Gln Leu Gln Gln Ser Gly Ala Glu Leu Val Lys
            20                  25                  30

Pro Gly Ala Ser Val Lys Ile Ser Cys Lys Ala Ser Gly Tyr Ala Phe
        35                  40                  45

Ser Ser Ser Trp Met Asn Trp Val Lys Gln Arg Pro Gly Lys Gly Leu
    50                  55                  60

Glu Trp Ile Gly Gln Ile Tyr Pro Gly Asp Gly Asp Thr Asn Tyr Asn
65                  70                  75                  80

Gly Lys Phe Lys Asp Lys Ala Thr Leu Thr Ala Asp Lys Ser Ser Asn
            85                  90                  95

Thr Ala Tyr Met Gln Leu Ser Ser Leu Thr Ser Glu Asp Ser Ala Val
                100                 105                 110

Tyr Phe Cys Ala Arg Val Asn Trp Asp Ala Phe Ser Tyr Ile Asp Val
            115                 120                 125

Trp Gly Thr Gly Thr Thr Val Thr Val Ser Ser
    130                 135

<210> SEQ ID NO 50
<211> LENGTH: 5
<212> TYPE: PRT
<213> ORGANISM: artificial sequence
<220> FEATURE:
<223> OTHER INFORMATION: HCVR CDR1 of mAb 171J 5H12

<400> SEQUENCE: 50

Ser Ser Trp Met Asn
1               5

<210> SEQ ID NO 51
<211> LENGTH: 17
<212> TYPE: PRT
<213> ORGANISM: artificial sequence
<220> FEATURE:
<223> OTHER INFORMATION: HCVR CDR2 of mAb 171J 5H12

<400> SEQUENCE: 51

Gln Ile Tyr Pro Gly Asp Gly Asp Thr Asn Tyr Asn Gly Lys Phe Lys
1               5                   10                  15

Asp

<210> SEQ ID NO 52
<211> LENGTH: 11
<212> TYPE: PRT
<213> ORGANISM: artificial sequence
<220> FEATURE:
<223> OTHER INFORMATION: HCVR CDR3 of mAb 171J 5H12

<400> SEQUENCE: 52

Val Asn Trp Asp Ala Phe Ser Tyr Ile Asp Val
1               5                   10

<210> SEQ ID NO 53
<211> LENGTH: 381
<212> TYPE: DNA
<213> ORGANISM: artificial sequence
<220> FEATURE:
<223> OTHER INFORMATION: DNA sequence of LCVR of mAb 171J 5H12

<400> SEQUENCE: 53
atgaggaccc ctgctcagtt tcttggaatc ttgttgctct ggtttccagg tttcaaatgt      60
gacatcaaga tgacccagtc tccatcttcc atgtatgaat ctctaggaga gagagtcaca     120
atcacttgca gggcgagtca ggacattaat gtctatttaa ctggttcca gcagaaaccc     180 ggggaatctc ctaagaccct gatctatcgt gcagacagat ggtagatgg tgtcccatca     240 aggttcagtg gcagtggatc tggacaagat tactctctca ccatcagcag cctggaatat     300
gaagatgtgg gaatttatta ttgtctacag tatgatgagt ttccttacac gttcggaggg     360
gggaccaagc tggaaataaa a        381

<210> SEQ ID NO 54
<211> LENGTH: 127
<212> TYPE: PRT
<213> ORGANISM: artificial sequence
<220> FEATURE:
<223> OTHER INFORMATION: amino acid sequence of LCVR of mAb 171J 5H12

<400> SEQUENCE: 54

Met Arg Thr Pro Ala Gln Phe Leu Gly Ile Leu Leu Leu Trp Phe Pro
1               5                   10                  15

Gly Phe Lys Cys Asp Ile Lys Met Thr Gln Ser Pro Ser Ser Met Tyr
            20                  25                  30

Glu Ser Leu Gly Glu Arg Val Thr Ile Thr Cys Arg Ala Ser Gln Asp
        35                  40                  45

Ile Asn Val Tyr Leu Ser Trp Phe Gln Gln Lys Pro Gly Glu Ser Pro
    50                  55                  60

Lys Thr Leu Ile Tyr Arg Ala Asp Arg Leu Val Asp Gly Val Pro Ser
65                  70                  75                  80

Arg Phe Ser Gly Ser Gly Ser Gly Gln Asp Tyr Ser Leu Thr Ile Ser
                85                  90                  95

Ser Leu Glu Tyr Glu Asp Val Gly Ile Tyr Tyr Cys Leu Gln Tyr Asp
            100                 105                 110

Glu Phe Pro Tyr Thr Phe Gly Gly Thr Lys Leu Glu Ile Lys
        115                 120                 125

<210> SEQ ID NO 55
<211> LENGTH: 11
<212> TYPE: PRT
<213> ORGANISM: artificial sequence
<220> FEATURE:
<223> OTHER INFORMATION: amino acid sequence of LCVR CDR1 of mAb 171J
      5H12

<400> SEQUENCE: 55

Arg Ala Ser Gln Asp Ile Asn Val Tyr Leu Ser
1               5                   10

<210> SEQ ID NO 56
<211> LENGTH: 7
<212> TYPE: PRT
<213> ORGANISM: artificial sequence
<220> FEATURE:
<223> OTHER INFORMATION: amino acid sequence of LCVR CDR2 of mAb 171J
      5H12

<400> SEQUENCE: 56

Arg Ala Asp Arg Leu Val Asp
1               5

<210> SEQ ID NO 57
<211> LENGTH: 9
<212> TYPE: PRT
<213> ORGANISM: artificial sequence
<220> FEATURE:
<223> OTHER INFORMATION: amino acid sequence of LCVR CDR3 of mAb 171J
      5H12

<400> SEQUENCE: 57

Leu Gln Tyr Asp Glu Phe Pro Tyr Thr
1               5

```
<210> SEQ ID NO 58
<211> LENGTH: 15
<212> TYPE: PRT
<213> ORGANISM: artificial sequence
<220> FEATURE:
<223> OTHER INFORMATION: amino acid sequence of VDJ junction of HC of
      mAb 171J 5H12

<400> SEQUENCE: 58

Cys Ala Arg Val Asn Trp Asp Ala Phe Ser Tyr Ile Asp Val Trp
1               5                   10                  15

<210> SEQ ID NO 59
<211> LENGTH: 11
<212> TYPE: PRT
<213> ORGANISM: artificial sequence
<220> FEATURE:
<223> OTHER INFORMATION: amino acid sequence of VDJ junction of LCVR of
      mAb 171J 5H12

<400> SEQUENCE: 59

Cys Leu Gln Tyr Asp Glu Phe Pro Tyr Thr Phe
1               5                   10

<210> SEQ ID NO 60
<211> LENGTH: 396
<212> TYPE: DNA
<213> ORGANISM: artificial sequence
<220> FEATURE:
<223> OTHER INFORMATION: DNA sequence of HCVR of mAb 171J 9G7

<400> SEQUENCE: 60
atgaaatgca gctggattat cttcttcctg atggcagtgg ttacaggggt caattcagag      60
gttcagctgc agcagtctgg ggcagagctt gtgaagccag ggcctcagt caagttgtcc     120 tgcacaggtt ctggcttcaa cattgaagac atctatattc actgggtgaa acagaggcct    180
gaacagggcc tggagtggat tggaaggatg gatcctgcga atggtgatac tgtatatgcc    240
tcaaagttcc agggcaaggc cactatgaca gcagacactt catccaacac agcctacatg    300
caactcagca gcctgacatc tgagacact gccgtctatt actgtgctag agttttgac      360 tactggggcc aaggcaccag tctcacagtc tcctca                               396

<210> SEQ ID NO 61
<211> LENGTH: 132
<212> TYPE: PRT
<213> ORGANISM: artificial sequence
<220> FEATURE:
<223> OTHER INFORMATION: amino acid sequence of HCVR of mAb 171J 9G7

<400> SEQUENCE: 61

Met Lys Cys Ser Trp Ile Ile Phe Phe Leu Met Ala Val Val Thr Gly
1               5                   10                  15

Val Asn Ser Glu Val Gln Leu Gln Gln Ser Gly Ala Glu Leu Val Lys
                20                  25                  30

Pro Gly Ala Ser Val Lys Leu Ser Cys Thr Gly Ser Gly Phe Asn Ile
            35                  40                  45

Glu Asp Ile Tyr Ile His Trp Val Lys Gln Arg Pro Glu Gln Gly Leu
        50                  55                  60

Glu Trp Ile Gly Arg Met Asp Pro Ala Asn Gly Asp Thr Val Tyr Ala
65                  70                  75                  80

Ser Lys Phe Gln Gly Lys Ala Thr Met Thr Ala Asp Thr Ser Ser Asn
                85                  90                  95
```

```
Thr Ala Tyr Met Gln Leu Ser Ser Leu Thr Ser Gly Asp Thr Ala Val
            100                 105                 110

Tyr Tyr Cys Ala Arg Val Phe Asp Tyr Trp Gly Gln Gly Thr Ser Leu
        115                 120                 125

Thr Val Ser Ser
        130

<210> SEQ ID NO 62
<211> LENGTH: 5
<212> TYPE: PRT
<213> ORGANISM: artificial sequence
<220> FEATURE:
<223> OTHER INFORMATION: amino acid sequence of HCVR CDR1 of mAb 171J
      9G7

<400> SEQUENCE: 62

Asp Ile Tyr Ile His
1               5

<210> SEQ ID NO 63
<211> LENGTH: 17
<212> TYPE: PRT
<213> ORGANISM: artificial sequence
<220> FEATURE:
<223> OTHER INFORMATION: amino acid sequence of HCVR CDR2 of mAb 171J
      9G7

<400> SEQUENCE: 63

Arg Met Asp Pro Ala Asn Gly Asp Thr Val Tyr Ala Ser Lys Phe Gln
1               5                   10                  15

Gly

<210> SEQ ID NO 64
<211> LENGTH: 4
<212> TYPE: PRT
<213> ORGANISM: artificial sequence
<220> FEATURE:
<223> OTHER INFORMATION: amino acid sequence of HCVR CDR3 of mAb 171J
      9G7

<400> SEQUENCE: 64

Val Phe Asp Tyr
1

<210> SEQ ID NO 65
<211> LENGTH: 393
<212> TYPE: DNA
<213> ORGANISM: artificial sequence
<220> FEATURE:
<223> OTHER INFORMATION: DNA sequence of LCVR of mAb 171J 9G7

<400> SEQUENCE: 65
atgaagttgc ctgttaggct gttggtgctg atgttctgga ttcctgcttc cagcagtgat      60
gttgtgatga cccaaactcc tctctccctg cctgtcagtc ttggagatca agcctccatc     120
tcttgcagat ctagtcagaa ccttgtacac agtaatggat acacctattt acattggtac     180
ctgcagaagc caggccagtc tccaaagctc ctgatctaca agtttccaa ccgattttct      240 ggggtcccag acaggttcag tggcagtgga tcagggacag atttcacact caagatcagc     300
agagtggagg ctgaggatct gggagtttat ttctgctctc aaaatacaca tgttccgtac     360
acgttcggag gggggaccaa gctggaaata aaa                                  393

<210> SEQ ID NO 66
```

<211> LENGTH: 131
<212> TYPE: PRT
<213> ORGANISM: artificial sequence
<220> FEATURE:
<223> OTHER INFORMATION: amino acid sequence of LCVR of mAb 171J 9G7

<400> SEQUENCE: 66

Met Lys Leu Pro Val Arg Leu Leu Val Leu Met Phe Trp Ile Pro Ala
1               5                   10                  15

Ser Ser Ser Asp Val Val Met Thr Gln Thr Pro Leu Ser Leu Pro Val
            20                  25                  30

Ser Leu Gly Asp Gln Ala Ser Ile Ser Cys Arg Ser Ser Gln Asn Leu
        35                  40                  45

Val His Ser Asn Gly Tyr Thr Tyr Leu His Trp Tyr Leu Gln Lys Pro
    50                  55                  60

Gly Gln Ser Pro Lys Leu Leu Ile Tyr Lys Val Ser Asn Arg Phe Ser
65                  70                  75                  80

Gly Val Pro Asp Arg Phe Ser Gly Ser Gly Ser Gly Thr Asp Phe Thr
                85                  90                  95

Leu Lys Ile Ser Arg Val Glu Ala Glu Asp Leu Gly Val Tyr Phe Cys
            100                 105                 110

Ser Gln Asn Thr His Val Pro Tyr Thr Phe Gly Gly Gly Thr Lys Leu
        115                 120                 125

Glu Ile Lys
    130

<210> SEQ ID NO 67
<211> LENGTH: 16
<212> TYPE: PRT
<213> ORGANISM: artificial sequence
<220> FEATURE:
<223> OTHER INFORMATION: amino acid sequence of LCVR CDR1 of mAb 171J
      9G7

<400> SEQUENCE: 67

Arg Ser Ser Gln Asn Leu Val His Ser Asn Gly Tyr Thr Tyr Leu His
1               5                   10                  15

<210> SEQ ID NO 68
<211> LENGTH: 7
<212> TYPE: PRT
<213> ORGANISM: artificial sequence
<220> FEATURE:
<223> OTHER INFORMATION: amino acid sequence of LCVR CDR2 of mAb 171J
      9G7

<400> SEQUENCE: 68

Lys Val Ser Asn Arg Phe Ser
1               5

<210> SEQ ID NO 69
<211> LENGTH: 9
<212> TYPE: PRT
<213> ORGANISM: artificial sequence
<220> FEATURE:
<223> OTHER INFORMATION: amino acid sequence of LCVR CDR3 of mAb 171J
      9G7

<400> SEQUENCE: 69

Ser Gln Asn Thr His Val Pro Tyr Thr
1               5

<210> SEQ ID NO 70

```
-continued

<211> LENGTH: 8
<212> TYPE: PRT
<213> ORGANISM: artificial sequence
<220> FEATURE:
<223> OTHER INFORMATION: amino acid sequence of VDJ junction of HC of
      mAb 171J 9G7

<400> SEQUENCE: 70

Cys Ala Arg Val Phe Asp Tyr Trp
1               5

<210> SEQ ID NO 71
<211> LENGTH: 11
<212> TYPE: PRT
<213> ORGANISM: artificial sequence
<220> FEATURE:
<223> OTHER INFORMATION: amino acid sequence of VDJ junction of LC of
      mAb 171J 9G7

<400> SEQUENCE: 71

Cys Ser Gln Asn Thr His Val Pro Tyr Thr Phe
1               5                   10
```

ANTI-HOG TCN1 MONOCLONAL ANTIBODIES AND METHODS OF PRODUCTION AND USE THEREOF

This application incorporates by reference the sequence listing which is submitted together with this application in computer readable form which has the file name 2019P19746WOSequenceListing_ST25.txt and is 46 KB.

CROSS REFERENCE TO RELATED APPLICATIONS/INCORPORATION BY REFERENCE STATEMENT

This application claims benefit under 35 USC § 119(e) of U.S. Provisional Application No. 62/884,711, filed Aug. 9, 2019. The entire contents of the above-referenced patent(s)/patent application(s) are hereby expressly incorporated herein by reference.

STATEMENT REGARDING FEDERALLY SPONSORED RESEARCH OR DEVELOPMENT

Not Applicable.

BACKGROUND

Cobalamin is an essential nutrient and natural water-soluble vitamin of the B-complex family that must combine with an intrinsic factor for absorption by the intestine. Vitamin B12 (cyanocobalamin) is necessary for hematopoiesis, neural metabolism, DNA and RNA production, and carbohydrate, fat, and protein metabolism. Vitamin B12 improves iron functions in the metabolic cycle and assists folic acid in choline synthesis. Vitamin B12 metabolism is interconnected with that of folic acid, and a deficiency in vitamin B12 causes pernicious anemia, megaloblastic anemia, and neurologic lesions.

Transcobalamin I (TCN1), also known as Haptocorrin, R-factor, and R-protein, is a glycoprotein produced by the salivary glands of the mouth. In the body, TCN1 primarily serves to protect cobalamin (vitamin B12) from acid degradation in the stomach by producing a TCN1/vitamin B12 complex. Once the complex has traveled to the more neutral duodenum, pancreatic proteases degrade TCN1, thereby releasing free vitamin B12, which now binds to intrinsic factor for absorption by ileal enterocytes.

Hog Intrinsic Factor (HIF) preparations are typically used in diagnostic vitamin B12 assays. However, Hog TCN1 (or Pig TCN1, Swine TCN1, or hog R-protein) is the major HIF-related protein contaminant in the crude extract of hog gastric mucosa, and the presence of Hog TCN1 in the HIF preparations can compromise the integrity of any B12 assay in which the HIF preparation is used; therefore, it is imperative that any TCN1 present in the HIF preparations be estimated and/or removed.

However, there is currently no commercial source of anti-hog TCN1 monoclonal antibodies available for use in the estimation and/or removal of Hog TCN1 from HIF preparations that are used in B12 assays.

Therefore, there is a need in the art for anti-Hog TCN1 monoclonal antibodies as well as new and improved methods of estimating Hog TCN1 and/or removing Hog TCN1 from HIF preparations that overcome the disadvantages and defects of the prior art. It is to such antibodies, kits containing said antibodies, and methods of producing and using said antibodies, that the present disclosure is directed.

BRIEF DESCRIPTION OF THE DRAWINGS

FIG. 2: Amino acid sequence alignment of Transcobalamin I (TCN1) (SEQ ID NO:1) and Intrinsic Factor (HIF) from *Sus scrofa* (SEQ ID NO:17). Peptide 29-39 (also referred to herein as R1 and assigned SEQ ID NO:2), Peptide 80-89 (also referred to herein as R2 and assigned SEQ ID NO:3), and Peptide 200-215 (also referred to herein as R3 and assigned SEQ ID NO:4), which share no homology with Hog Intrinsic Factor, were selected for monoclonal antibody generation.

DETAILED DESCRIPTION

Figure 1:
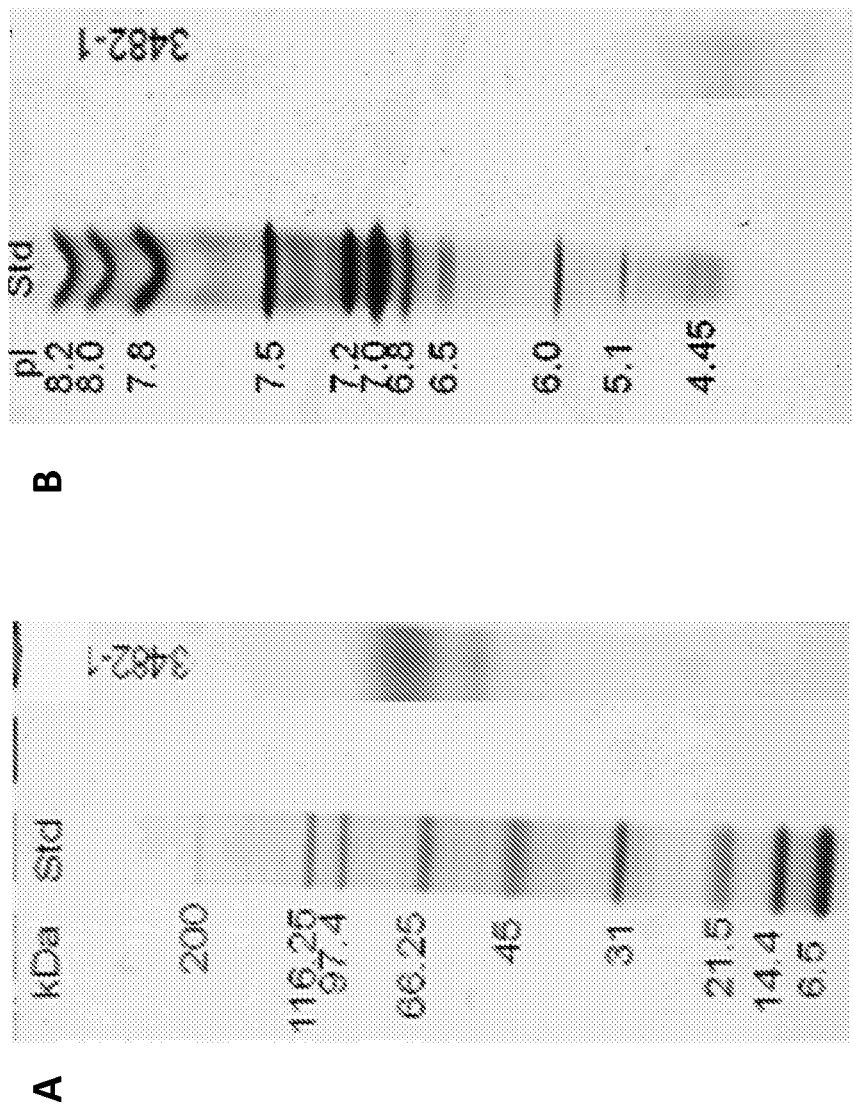
FIG. 1: Total fraction of Vitamin B12-binding proteins purified from crude powdered extract of hog gastric mucosa on the column of Vitamin B12-Sepharose according to Allen et al. (J. Biol. Chem. (1973) 248(10):3670-3680) and referred to for purposes of this disclosure as "partially purified Hog R-protein." Panel A: SDS-PAGE at reducing conditions shows that the fraction contains native Hog R-protein (wide 70-92 kDa band) and Hog Intrinsic Factor (narrow 55 kDa band). Panel B: Isoelectric focusing demonstrates that Isoelectric points of both glycosylated proteins—Hog R-protein and Hog Intrinsic Factor—are almost identical (pI<4.5).

Before explaining at least one embodiment of the present disclosure in detail by way of exemplary language and results, it is to be understood that the present disclosure is not limited in its application to the details of construction and the arrangement of the components set forth in the following description. The present disclosure is capable of other embodiments or of being practiced or carried out in various ways. As such, the language used herein is intended to be given the broadest possible scope and meaning; and the embodiments are meant to be exemplary—not exhaustive. Also, it is to be understood that the phraseology and terminology employed herein is for the purpose of description and should not be regarded as limiting.

Unless otherwise defined herein, scientific and technical terms used in connection with the present disclosure shall have the meanings that are commonly understood by those of ordinary skill in the art. Further, unless otherwise required by context, singular terms shall include pluralities and plural terms shall include the singular. Generally, nomenclatures utilized in connection with, and techniques of, cell and tissue culture, molecular biology, and protein and oligo- or polynucleotide chemistry and hybridization described herein are those well known and commonly used in the art. Standard techniques are used for recombinant DNA, oligonucleotide synthesis, and tissue culture and transformation (e.g., electroporation, lipofection). Enzymatic reactions and purification techniques are performed according to manufacturer's specifications or as commonly accomplished in the art or as described herein. The foregoing techniques and procedures are generally performed according to conventional methods well known in the art and as described in various general and more specific references that are cited and discussed throughout the present specification. See e.g., Sambrook et al. Molecular Cloning: A Laboratory Manual ($2^{nd}$ ed., Cold Spring Harbor Laboratory Press, Cold Spring Harbor, N.Y. (1989) and Coligan et al. Current Protocols in Immunology (Current Protocols, Wiley Interscience (1994)), which are incorporated herein by reference. The nomenclatures utilized in connection with, and the laboratory procedures and techniques of, analytical chemistry, synthetic organic chemistry, and medicinal and pharmaceutical chemistry described herein are those well known and commonly used in the art. Standard techniques are used for chemical syntheses, chemical analyses, pharmaceutical preparation, formulation, and delivery, and treatment of patients.

All patents, published patent applications, and non-patent publications mentioned in the specification are indicative of the level of skill of those skilled in the art to which the present disclosure pertains. All patents, published patent applications, and non-patent publications referenced in any portion of this application are herein expressly incorporated by reference in their entirety to the same extent as if each individual patent or publication was specifically and individually indicated to be incorporated by reference.

All of the compositions, kits, and/or methods disclosed herein can be made and executed without undue experimentation in light of the present disclosure. While the compositions, kits, and/or methods have been described in terms of particular embodiments, it will be apparent to those of skill in the art that variations may be applied to the compositions, kits, and/or methods and in the steps or in the sequence of steps of the methods described herein without departing from the concept, spirit, and scope of the present disclosure. All such similar substitutes and modifications apparent to those skilled in the art are deemed to be within the spirit, scope, and concept of the present disclosure as defined by the appended claims.

As utilized in accordance with the present disclosure, the following terms, unless otherwise indicated, shall be understood to have the following meanings:

The use of the term "a" or "an" when used in conjunction with the term "comprising" in the claims and/or the specification may mean "one," but it is also consistent with the meaning of "one or more," "at least one," and "one or more than one." As such, the terms "a," "an," and "the" include plural referents unless the context clearly indicates otherwise. Thus, for example, reference to "a compound" may refer to one or more compounds, two or more compounds, three or more compounds, four or more compounds, or greater numbers of compounds. The term "plurality" refers to "two or more."

The use of the term "at least one" will be understood to include one as well as any quantity more than one, including but not limited to, 2, 3, 4, 5, 10, 15, 20, 30, 40, 50, 100, etc. The term "at least one" may extend up to 100 or 1000 or more, depending on the term to which it is attached; in addition, the quantities of 100/1000 are not to be considered limiting, as higher limits may also produce satisfactory results. In addition, the use of the term "at least one of X, Y, and Z" will be understood to include X alone, Y alone, and Z alone, as well as any combination of X, Y, and Z. The use of ordinal number terminology (i.e., "first," "second," "third," "fourth," etc.) is solely for the purpose of differentiating between two or more items and is not meant to imply any sequence or order or importance to one item over another or any order of addition, for example.

The use of the term "or" in the claims is used to mean an inclusive "and/or" unless explicitly indicated to refer to alternatives only or unless the alternatives are mutually exclusive. For example, a condition "A or B" is satisfied by any of the following: A is true (or present) and B is false (or not present), A is false (or not present) and B is true (or present), and both A and B are true (or present).

As used herein, any reference to "one embodiment," "an embodiment," "some embodiments," "one example," "for example," or "an example" means that a particular element, feature, structure, or characteristic described in connection with the embodiment is included in at least one embodiment. The appearance of the phrase "in some embodiments" or "one example" in various places in the specification is not necessarily all referring to the same embodiment, for example. Further, all references to one or more embodiments or examples are to be construed as non-limiting to the claims.

Throughout this application, the term "about" is used to indicate that a value includes the inherent variation of error for a composition/apparatus/device, the method being employed to determine the value, or the variation that exists among the study subjects. For example, but not by way of limitation, when the term "about" is utilized, the designated value may vary by plus or minus twenty percent, or fifteen percent, or twelve percent, or eleven percent, or ten percent, or nine percent, or eight percent, or seven percent, or six percent, or five percent, or four percent, or three percent, or two percent, or one percent from the specified value, as such variations are appropriate to perform the disclosed methods and as understood by persons having ordinary skill in the art.

As used in this specification and claim(s), the words "comprising" (and any form of comprising, such as "comprise" and "comprises"), "having" (and any form of having, such as "have" and "has"), "including" (and any form of including, such as "includes" and "include"), or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AAB, BBC, AAABCCCC, CBBAAA, CABABB, and so forth. The skilled artisan will understand that typically there is no limit on the number of items or terms in any combination, unless otherwise apparent from the context.

As used herein, the term "substantially" means that the subsequently described event or circumstance completely occurs or that the subsequently described event or circumstance occurs to a great extent or degree. For example, when associated with a particular event or circumstance, the term "substantially" means that the subsequently described event or circumstance occurs at least 80% of the time, or at least 85% of the time, or at least 90% of the time, or at least 95% of the time. The term "substantially adjacent" may mean that two items are 100% adjacent to one another, or that the two items are within close proximity to one another but not 100% adjacent to one another, or that a portion of one of the two items is not 100% adjacent to the other item but is within close proximity to the other item.

The terms "analog" and "derivative" are used herein interchangeably and refer to a substance which comprises the same basic carbon skeleton and carbon functionality in its structure as a given compound, but can also contain one or more substitutions thereto. The term "substitution" as used herein will be understood to refer to the replacement of at least one substituent on a compound with a residue R. In certain non-limiting embodiments, R may include H, hydroxyl, thiol, a halogenid selected from fluoride, chloride bromide or iodite, a C1-C4 compound selected one of the following: linear, branched or cyclic alkyl, optionally substituted, and linear branched or cyclic alkenyl, wherein the optional substitutents are selected from one or more alkenylalkyl, alkynylalkyl, cycloalkyl, cycloalkenylalkyl, arylalkyl, heteroarylalkyl, heterocyclealkyl, optionally substituted heterocycloalkenylalkyl, arylcycloalkyl, and arylheterocycloalkyl, each of which is optionally substituted wherein the optional substitutents are selected from one or more of alkenylalkyl, alkynylalkyl, cycloalkyl, cyclalkenylalkyl, arylalkyl, alkylaryl, heteroarylalkyl, heterocyclealkyl, optionally substituted heterocycloalkenylalkyl, arylcycloalkyl, and arylheterocyclalkyl, phenyl, cyano, hydroxyl, alkyl, aryl, cycloalkyl, cyano, alkoxy, alkylthio, amino, —NH (alkyl), —NH(cycloalkyl)$_2$, carboxy, and —C(O))-alkyl.

The term "sample" as used herein will be understood to include any type of biological sample that may be utilized in accordance with the present disclosure. Examples of fluidic biological samples that may be utilized include, but are not limited to, whole blood or any portion thereof (i.e., plasma or serum), urine, saliva, sputum, cerebrospinal fluid (CSF), skin, intestinal fluid, intraperitoneal fluid, cystic fluid, sweat, interstitial fluid, extracellular fluid, tears, mucus, bladder wash, semen, fecal, pleural fluid, nasopharyngeal fluid, combinations thereof, and the like.

The term "specific binding partner," as used herein, will be understood to refer to any molecule capable of specifically associating with TCN1 for purposes of detection thereof. For example, but not by way of limitation, the specific binding partner may be an antibody, a receptor, a ligand, an aptamer, a molecular imprinted polymer (i.e., inorganic matrices), or any combination and/or derivative(s) thereof, as well as any other molecules capable of specific binding to the macrophilin-binding pharmaceutical.

The terms "peptide," "polypeptide," and "protein" are used herein to refer to a polymer of amino acid residues. The term "polypeptide" as used herein is a generic term to refer to native protein, protein fragments, or analogs of a polypeptide sequence. Hence, native protein, protein fragments, and analogs are species of the polypeptide genus. The term "isolated peptide/polypeptide/protein" as used herein refers to a peptide/polypeptide/protein of cDNA, recombinant RNA, or synthetic origin or some combination thereof, which by virtue of its origin, or source of derivation, the "isolated peptide/polypeptide/protein": (1) is not associated with other peptides/polypeptides/proteins found in nature, (2) is free of other peptides/polypeptides/proteins from the same source, e.g., free of murine proteins, (3) is expressed by a cell from a different species, and/or (4) does not occur in nature.

As used herein, the term "amino acid" embraces all molecules, whether natural or synthetic, which include both an amino functionality and an acid functionality and capable of being included in a polymer of naturally-occurring amino acids. Exemplary amino acids include naturally-occurring amino acids; analogs, derivatives, and congeners thereof; amino acid analogs having variant side chains; and all stereoisomers of any of any of the foregoing.

The terms "polynucleotide" and "nucleic acid" are used interchangeably. They refer to a polymeric form of nucleotides of any length, either deoxyribonucleotides or ribonucleotides, or analogs thereof. The following are non-limiting examples of polynucleotides: coding or non-coding regions of a gene or gene fragment, loci (locus) defined from linkage analysis, exons, introns, messenger RNA (mRNA), transfer RNA, ribosomal RNA, ribozymes, cDNA, recombinant polynucleotides, branched polynucleotides, plasmids, vectors, isolated DNA of any sequence, isolated RNA of any sequence, nucleic acid probes, and primers. A polynucleotide may comprise modified nucleotides, such as methylated nucleotides and nucleotide analogs. If present, modifications to the nucleotide structure may be imparted before or after assembly of the polymer. The sequence of nucleotides may be interrupted by non-nucleotide components. A polynucleotide may be further modified, such as by conjugation with a labeling component. The terms "isolated nucleic acid" and "isolated polynucleotide" are used interchangeably; a nucleic acid or polynucleotide is considered "isolated" if it: (1) is not associated with all or a portion of a polynucleotide in which the "isolated polynucleotide" is found in nature, (2) is linked to a polynucleotide to which it is not linked in nature, or (3) does not occur in nature as part of a larger sequence.

The term "vector," as used herein, is intended to refer to a nucleic acid molecule capable of transporting another nucleic acid to which it has been linked. One type of vector is a "plasmid," which refers to a circular double stranded DNA loop into which additional DNA segments may be ligated. Another type of vector is a viral vector, wherein additional DNA segments may be ligated into the viral genome. Certain vectors are capable of autonomous replication in a host cell into which they are introduced (e.g., bacterial vectors having a bacterial origin of replication and episomal mammalian vectors). Other vectors (e.g., non-episomal mammalian vectors) can be integrated into the genome of a host cell upon introduction into the host cell, and thereby be replicated along with the host genome. Moreover, certain vectors are capable of directing the expression of genes. Such vectors are referred to herein as "recombinant expression vectors" (or simply, "expression vectors").

The term "naturally-occurring" as used herein as applied to an object refers to the fact that an object can be found in nature. For example, a polynucleotide or polypeptide sequence that is present in an organism (including viruses) that can be isolated from a source in nature and which has not been intentionally modified by man in the laboratory or otherwise is naturally-occurring. The term "naturally-occurring" may be used interchangeably herein with the term "native."

The term "selectively hybridize" referred to herein means to detectably and specifically bind. Polynucleotides, oligonucleotides and fragments thereof encoding peptides/polypeptides/proteins in accordance with the inventive concept(s) selectively hybridize to nucleic acid strands under hybridization and wash conditions that minimize appreciable amounts of detectable binding to nonspecific nucleic acids. High stringency conditions can be used to achieve selective hybridization conditions as known in the art and discussed herein. Generally, the nucleic acid sequence homology between the polynucleotides, oligonucleotides, and fragments of the inventive concept(s) and a nucleic acid sequence of interest will be at least 80%, and more typically with increasing homologies of at least 85%, 90%, 95%, 99%, and 100%. Two amino acid sequences are homologous if there is a partial or complete identity between their sequences. For example, 85% homology means that 85% of the amino acids are identical when the two sequences are aligned for maximum matching. Gaps (in either of the two sequences being matched) are allowed in maximizing matching; gap lengths of 5 or less are preferred (but non-limiting), with 2 or less being more preferred (but non-limiting). Alternatively, two protein sequences (or polypeptide sequences derived from them of at least 30 amino acids in length) are homologous, as this term is used herein, if they have an alignment score of at more than 5 (in standard deviation units) using the program ALIGN with the mutation data matrix and a gap penalty of 6 or greater. See Dayhoff, M. O., in Atlas of Protein Sequence and Structure, pp. 101-110 (Volume 5, National Biomedical Research Foundation (1972)) and Supplement 2 to this volume, pp. 1-10. The two sequences or parts thereof are more preferably homologous if their amino acids are greater than or equal to 50% identical when optimally aligned using the ALIGN program. The term "corresponds to" is used herein to mean that a polynucleotide sequence is homologous (i.e., is identical, not strictly evolutionarily related) to all or a portion of a reference polynucleotide sequence, or that a polypeptide sequence is identical to a reference polypeptide sequence. In contradistinction, the term "complementary to" is used herein to mean that the complementary sequence is homologous to all or a portion of a reference polynucleotide sequence. For illustration, the nucleotide sequence "TATAC" corresponds to a reference sequence "TATAC" and is complementary to a reference sequence "GTATA."

The following terms are used to describe the sequence relationships between two or more polynucleotide or amino acid sequences: "reference sequence," "comparison window," "sequence identity," "percentage of sequence identity," and "substantial identity." A "reference sequence" is a defined sequence used as a basis for a sequence comparison; a reference sequence may be a subset of a larger sequence, for example, as a segment of a full-length cDNA or gene sequence given in a sequence listing or may comprise a complete cDNA or gene sequence. Generally, a reference sequence is at least 18 nucleotides or 6 amino acids in length, frequently at least 24 nucleotides or 8 amino acids in length, and often at least 48 nucleotides or 16 amino acids in length. Since two polynucleotides or amino acid sequences may each (1) comprise a sequence (i.e., a portion of the complete polynucleotide or amino acid sequence) that is similar between the two molecules, and (2) may further comprise a sequence that is divergent between the two polynucleotides or amino acid sequences, sequence comparisons between two (or more) molecules are typically performed by comparing sequences of the two molecules over a "comparison window" to identify and compare local regions of sequence similarity. A "comparison window," as used herein, refers to a conceptual segment of at least 18 contiguous nucleotide positions or 6 amino acids wherein a polynucleotide sequence or amino acid sequence may be compared to a reference sequence of at least 18 contiguous nucleotides or 6 amino acid sequences and wherein the portion of the polynucleotide sequence in the comparison window may comprise additions, deletions, substitutions, and the like (i.e., gaps) of 20 percent or less as compared to the reference sequence (which does not comprise additions or deletions) for optimal alignment of the two sequences. Optimal alignment of sequences for aligning a comparison window may be conducted by the local homology algorithm of Smith and Waterman (Adv. Appl. Math., 2:482 (1981)), by the homology alignment algorithm of Needleman and Wunsch (J. Mol. Biol., 48:443 (1970)), by the search for similarity method of Pearson and Lipman (Proc. Natl. Acad. Sci. (U.S.A.), 85:2444 (1988)), by computerized implementations of these algorithms (GAP, BESTFIT, FASTA, and TFASTA in the Wisconsin Genetics Software Package Release 7.0, (Genetics Computer Group, 575 Science Dr., Madison, Wis.), Geneworks, or MacVector software packages, or by inspection, and the best alignment (i.e., resulting in the highest percentage of homology over the comparison window) generated by the various methods is selected.

The term "sequence identity" means that two polynucleotide or amino acid sequences is identical (i.e., on a nucleotide-by-nucleotide or residue-by-residue basis) over the comparison window. The term "percentage of sequence identity" is calculated by comparing two optimally aligned sequences over the window of comparison, determining the number of positions at which the identical nucleic acid base (e.g., A, T, C, G, U, or I) or residue occurs in both sequences to yield the number of matched positions, dividing the number of matched positions by the total number of positions in the comparison window (i.e., the window size), and multiplying the result by 100 to yield the percentage of sequence identity. The terms "substantial identity" as used herein denotes a characteristic of a polynucleotide or amino acid sequence, wherein the polynucleotide or amino acid comprises a sequence that has at least 85 percent sequence identity, such as at least 90 to 95 percent sequence identity, or at least 99 percent sequence identity as compared to a reference sequence over a comparison window of at least 18 nucleotide (6 amino acid) positions, frequently over a window of at least 24-48 nucleotide (8-16 amino acid) positions, wherein the percentage of sequence identity is calculated by comparing the reference sequence to the sequence which may include deletions or additions which total 20 percent or less of the reference sequence over the comparison window. The reference sequence may be a subset of a larger sequence.

As used herein, the twenty conventional amino acids and their abbreviations follow conventional usage. See Immunology—A Synthesis (2nd Edition, E. S. Golub and D. R. Gren, Eds., Sinauer Associates, Sunderland, Mass. (1991)), which is incorporated herein by reference. Stereoisomers (e.g., D-amino acids) of the twenty conventional amino acids, unnatural amino acids such as α-,α-disubstituted amino acids, N-alkyl amino acids, lactic acid, and other unconventional amino acids may also be suitable components for polypeptides of the present disclosure. Examples of unconventional amino acids include: norleucine, 4-hydroxyproline, α-carboxyglutamate, ε-N,N,N-trimethyllysine, ε-N-acetyllysine, O-phosphoserine, N-acetylserine, N-formylmethionine, 3-methylhistidine, 5-hydroxylysine, σ-N-methylarginine, and other similar amino acids and imino acids (e.g., 4-hydroxyproline). In the polypeptide notation used herein, the left-hand direction is the amino terminal direction and the right-hand direction is the carboxy-terminal direction, in accordance with standard usage and convention.

As applied to polypeptides, the term "substantial identity" means that two peptide sequences, when optimally aligned, such as by the programs GAP or BESTFIT using default gap weights, share at least 80 percent sequence identity, such as at least 90 percent sequence identity, or at least 95 percent sequence identity, or at least 99 percent sequence identity. In certain particular (but non-limiting) embodiments, residue positions which are not identical differ by conservative amino acid substitutions. Conservative amino acid substitutions refer to the interchangeability of residues having similar side chains. For example, a group of amino acids having aliphatic side chains is glycine, alanine, valine, leucine, and isoleucine; a group of amino acids having aliphatic-hydroxyl side chains is serine and threonine; a group of amino acids having amide-containing side chains is asparagine and glutamine; a group of amino acids having aromatic side chains is phenylalanine, tyrosine, and tryptophan; a group of amino acids having basic side chains is lysine, arginine, and histidine; and a group of amino acids having sulfur-containing side chains is cysteine and methionine. Particular conservative amino acids substitution groups are: valine-leucine-isoleucine, phenylalanine-tyrosine, lysine-arginine, alanine-valine, glutamic-aspartic, and asparagine-glutamine.

The term "variant" of a reference polypeptide refers to a polypeptide having one or more amino acid substitutions, deletions or insertions relative to the reference polypeptide. An amino acid substitution may be "conservative" or "non-conservative." A "conservative" amino acid substitution refers to the substitution of an amino acid in a polypeptide with another amino acid having similar properties, such as but not limited to, size and charge. Conservative replacements are those that take place within a family of amino acids that are related in their side chains. Genetically encoded amino acids are generally divided into families: (1) acidic=aspartate, glutamate; (2) basic=lysine, arginine, histidine; (3) nonpolar=alanine, valine, leucine, isoleucine, proline, phenylalanine, methionine, tryptophan; and (4) uncharged polar=glycine, asparagine, glutamine, cysteine, serine, threonine, tyrosine. More particular families are: serine and threonine are aliphatic-hydroxy family; asparagine and glutamine are an amide-containing family; alanine, valine, leucine and isoleucine are an aliphatic family; and phenylalanine, tryptophan, and tyrosine are an aromatic family. For example, it is reasonable to expect that an isolated replacement of a leucine with an isoleucine or valine, an aspartate with a glutamate, a threonine with a serine, or a similar replacement of an amino acid with a structurally related amino acid will not have a major effect on the binding or properties of the resulting molecule, especially if the replacement does not involve an amino acid within a framework site. Whether an amino acid change results in a functional peptide can readily be determined by assaying the specific activity of the polypeptide derivative. Fragments or analogs of antibodies or immunoglobulin molecules can be readily prepared by those of ordinary skill in the art. Preferred amino- and carboxy-termini of fragments or analogs occur near boundaries of functional domains. Structural and functional domains can be identified by comparison of the nucleotide and/or amino acid sequence data to public or proprietary sequence databases. In particular (but non-limiting) embodiments, computerized comparison methods are used to identify sequence motifs or predicted protein conformation domains that occur in other proteins of known structure and/or function. Methods to identify protein sequences that fold into a known three-dimensional structure are known (Bowie et al., Science, 253:164 (1991)). Thus, the foregoing examples demonstrate that those of skill in the art can recognize sequence motifs and structural conformations that may be used to define structural and functional domains in accordance with the present disclosure.

Preferred amino acid substitutions are those which: (1) reduce susceptibility to proteolysis, (2) reduce susceptibility to oxidation, (3) alter binding affinity for forming protein complexes, (4) alter binding affinities, and (5) confer or modify other physicochemical or functional properties of such analogs. Analogs can include various mutations of a sequence other than the naturally-occurring peptide sequence. For example, single or multiple amino acid substitutions (such as, but not limited to, conservative amino acid substitutions) may be made in the naturally-occurring sequence (such as, but not limited to, in the portion of the polypeptide outside the domain(s) forming intermolecular contacts). A conservative amino acid substitution should not substantially change the structural characteristics of the parent sequence (e.g., a replacement amino acid should not tend to break a helix that occurs in the parent sequence, or disrupt other types of secondary structure that characterizes the parent sequence). Examples of art-recognized polypeptide secondary and tertiary structures are described in Proteins, Structures and Molecular Principles (Creighton, Ed., W. H. Freeman and Company, New York (1984)); Introduction to Protein Structure© (Branden and J. Tooze, eds., Garland Publishing, New York, N.Y. (1991)); and Thornton et al. (Nature 354:105 (1991)), which are each incorporated herein by reference.

The term "polypeptide fragment" as used herein refers to a polypeptide that has an amino-terminal and/or carboxy-terminal deletion, but where the remaining amino acid sequence is identical to the corresponding positions in the naturally-occurring sequence. A polypeptide fragment may be any length that is less than the length of the reference polypeptide.

The term "antibody" is used in the broadest sense, and specifically (but not by way of limitation) covers monoclonal antibodies (including full length monoclonal antibodies), polyclonal antibodies, multispecific antibodies (e.g., bispecific antibodies), fragments of any of the above, and conjugates of any of the above, so long as they exhibit the desired biological activity of analyte binding. Thus, the term "antibody" or "antibody peptide(s)" refers to a full-length immunoglobulin molecule (i.e., an intact antibody) or an antigen-binding fragment thereof that competes with the intact antibody for specific antigen binding. Antigen-binding fragments may be produced by recombinant DNA techniques, or by enzymatic or chemical cleavage of intact antibodies. Antigen-binding fragments include Fab, Fab', F(ab')$_2$, Fv, scFv, disulfide linked Fv, Fd, diabodies, single-chain antibodies, single domain antibodies (such as but not limited to, NANOBODIES®), and other antibody fragments or conjugates thereof that retain at least a portion of the variable region of an intact antibody, antibody substitute proteins or peptides (i.e., engineered binding proteins/peptides), and combinations or derivatives thereof. See, e.g., Hudson et al. (Nature Med. (2003) 9:129-134). The antibody can be of any type or class (e.g., IgG, IgE, IgM, IgD, and IgA) or sub-class (e.g., IgG1, IgG2, IgG3, IgG4, IgA1, and IgA2).

The term "antigen binding fragment" or "antigen-binding portion" of an antibody, as used herein, refers to one or more fragments of an antibody that retain the ability to bind to an antigen. The antigen-binding function of an antibody can be performed by fragments of an intact antibody. Examples of binding fragments encompassed within the term "antigen-binding fragment" of an antibody include but are not limited to, Fab, Fab', F(ab')$_2$, Fv, scFv, disulfide linked Fv, Fd, diabodies, single-chain antibodies, single domain antibodies (such as but not limited to, NANOBODIES®), isolated CDRH3, and other antibody fragments that retain at least a portion of the variable region of an intact antibody. These antibody fragments are obtained using conventional recombinant and/or enzymatic techniques and are screened for antigen binding in the same manner as intact antibodies.

An "antibody heavy chain," as used herein, refers to the larger of the two types of polypeptide chains present in all antibody molecules in their naturally occurring conformations.

An "antibody light chain," as used herein, refers to the smaller of the two types of polypeptide chains present in all antibody molecules in their naturally occurring conformations. Kappa and lambda light chains refer to the two major antibody light chain isotypes.

The terms "CDR," and its plural "CDRs," refer to a complementarity determining region (CDR) of an antibody or antibody fragment, which determine the binding character of an antibody or antibody fragment. In most instances, three CDRs are present in a light chain variable region (CDRL1, CDRL2 and CDRL3) and three CDRs are present in a heavy chain variable region (CDRH1, CDRH2 and CDRH3). CDRs contribute to the functional activity of an antibody molecule and are separated by amino acid sequences that comprise scaffolding or framework regions. Among the various CDRs, the CDR3 sequences, and particularly CDRH3, are the most diverse and therefore have the strongest contribution to antibody specificity. There are at least two techniques for determining CDRs: (1) an approach based on cross-species sequence variability (i.e., Kabat et al., Sequences of Proteins of Immunological Interest (National Institute of Health, Bethesda, Md. (1987), incorporated by reference in its entirety); and (2) an approach based on crystallographic studies of antigen-antibody complexes (Chothia et al., Nature, 342:877 (1989), incorporated by reference in its entirety).

The term "epitope" includes any protein determinant capable of specific binding to an immunoglobulin or T-cell receptor. In certain embodiments, an epitope is a region of an antigen that is specifically bound by an antibody. Epitopic determinants usually include chemically active surface groupings of molecules such as amino acids, sugar side chains, phosphoryl, or sulfonyl groups. In certain embodiments, an epitope may have specific three dimensional structural characteristics (e.g., a "conformational epitope"), as well as specific charge characteristics.

An epitope is defined as "the same" as another epitope if a particular antibody specifically binds to both epitopes. In certain embodiments, polypeptides having different primary amino acid sequences may comprise epitopes that are the same. In certain embodiments, epitopes that are the same may have different primary amino acid sequences. Different antibodies are said to bind to the same epitope if they compete for specific binding to that epitope.

An antibody "specifically binds" an antigen when it preferentially recognizes the antigen in a complex mixture of proteins and/or macromolecules. In certain embodiments, an antibody comprises an antigen-binding site that specifically binds to a particular epitope. In certain such embodiments, the antibody is capable of binding different antigens so long as the different antigens comprise that particular epitope or closely related epitopes. In certain instances, for example, homologous proteins from different species may comprise the same epitope. In certain embodiments, an antibody specifically binds to an antigen with a dissociation constant of no greater than $10^{-6}$ M, $10^{-7}$ M, $10^{-8}$ M or $10^{-9}$ M. When an antibody specifically binds to a receptor or ligand (i.e., counter receptor), it may substantially inhibit adhesion of the receptor to the ligand. As used herein, an antibody substantially inhibits adhesion of a receptor to a ligand when an excess of antibody reduces the quantity of receptor bound to ligand by at least about 20%, 40%, 60% or 80%, 85%, or 90% (as measured in an in vitro competitive binding assay).

An "isolated" antibody is one which has been separated and/or recovered from a component of the environment in which it was produced. Contaminant components of its production environment are materials which would interfere with diagnostic or therapeutic uses for the antibody, and may include enzymes, hormones, and other proteinaceous or non-proteinaceous solutes. In certain embodiments, the antibody will be purified as measurable by at least three different methods: 1) to greater than 50% by weight of antibody as determined by the Lowry method, such as more than 75% by weight, or more than 85% by weight, or more than 95% by weight, or more than 99% by weight; 2) to a degree sufficient to obtain at least 10 residues of N-terminal or internal amino acid sequence by use of a spinning cup sequentator, such as at least 15 residues of sequence; or 3) to homogeneity by SDS-PAGE under reducing or non-reducing conditions using Coomassie blue or, alternatively, silver stain. Isolated antibody includes the antibody in situ within recombinant cells since at least one component of the environment in which the antibody is produced will not be present. Ordinarily, however, isolated antibody will be prepared by at least one purification step. In addition, the "isolated antibody" is substantially free of other antibodies having different antigenic specificities. An isolated antibody may, however, have some cross-reactivity to other, related antigens.

The term "antibody mutant" refers to an amino acid sequence variant of an antibody wherein one or more of the amino acid residues have been modified. Such mutants necessarily have less than 100% sequence identity or similarity with the amino acid sequence having at least 75% amino acid sequence identity or similarity with the amino acid sequence of either the heavy or light chain variable domain of the antibody, such as at least 80%, or at least 85%, or at least 90%, or at least 95%.

The term "monoclonal antibody" as used herein refers to an antibody obtained from a population of substantially homogeneous antibodies that specifically bind to the same epitope, i.e., the individual antibodies comprising the population are identical except for possible naturally occurring mutations that may be present in minor amounts. In contrast to conventional (polyclonal) antibody preparations which typically include different antibodies directed against different determinants (epitopes), each monoclonal antibody is directed against a single determinant on the antigen. In addition to their specificity, the monoclonal antibodies are advantageous in that in one method of production they may be synthesized by a hybridoma culture, and thus are uncontaminated by other immunoglobulins. The modifier "monoclonal" indicates the character of the antibody as being obtained from a substantially homogeneous population of antibodies, and is not to be construed as requiring production of the antibody by any particular method. For example, in one embodiment, the monoclonal antibodies produced in accordance with the present disclosure may be made by the hybridoma method first described by Kohler and Milstein (Nature, 256:495 (1975)).

The monoclonal antibodies utilized in accordance with the present disclosure may be produced by any methodology known in the art including, but not limited to, a result of a deliberate immunization protocol; a result of an immune response that results in the production of antibodies naturally in the course of a disease or cancer; phage-derived antibodies; and the like. In addition to the hybridoma production method listed above, the monoclonal antibodies of the present disclosure may be produced by other various methods such as, but not limited to, recombinant DNA methods (see, e.g., U.S. Pat. No. 4,816,567); isolation of antibody fragments from a phage display library (see, e.g., Clackson et al., Nature (1991) 352:624-628; and Marks et al., J. Mol. Biol. (1991) 222:581-597); as well as various other monoclonal antibody production techniques (see, e.g., Harlow and Lane (1988) Antibodies: A Laboratory Manual (Cold Spring Harbor Laboratory, Cold Spring Harbor, N.Y.)).

Once the antibodies have been obtained, for example, once individual B cells have been identified and/or monoclonal antibodies have been produced, the sequences encoding the variable regions of these antibodies can be obtained. The variable region sequences can, for example, be obtained by first sequencing the antibody protein produced by the hybridoma, B-cell or phage and determining the encoding nucleic acid sequence. In one embodiment, the immunoglobulin variable region (VH and VL) DNA or cDNA may be sequenced instead. Where the antibody is derived from a hybridoma cell line or isolated B-cell, the cDNAs encoding the variable regions may be amplified using PCR by, for example, the methods described in Babcook et al. (Proc. Natl. Acad. Sci. USA, 93:7843-7848 (1996)), and in PCT Publication No. WO 92/02551. The contents of both references are expressly incorporated herein by reference in their entirety.

The term "neutralizing antibody" or "antibody that neutralizes" refers to an antibody that reduces at least one activity of a polypeptide comprising the epitope to which the antibody specifically binds. In certain embodiments, a neutralizing antibody reduces an activity in vitro and/or in vivo.

The term "antigen-binding site" refers to a portion of an antibody capable of specifically binding an antigen. In certain embodiments, an antigen-binding site is provided by one or more antibody variable regions.

As used herein, "substantially pure" means an object species is the predominant species present (i.e., on a molar basis it is more abundant than any other individual species in the composition). Generally, a substantially pure composition will comprise more than about 50% percent of all macromolecular species present in the composition, such as more than about 55%, 60%, 65%, 70%, 75%, 80%, 85%, 90%, 95%, and 99%. In one embodiment, the object species is purified to essential homogeneity (contaminant species cannot be detected in the composition by conventional detection methods) wherein the composition consists essentially of a single macromolecular species.

The term "agent" refers to a chemical compound, a mixture of chemical compounds, a biological macromolecule, or an extract made from biological materials. In certain embodiments, the "agent" may be a monoclonal antibody in accordance with the present disclosure.

The term "antagonist" refers to an agent that reduces an activity of a protein/enzyme. The term "agonist" refers to an agent that increases an activity of a protein/enzyme.

Turning now to the inventive concepts, unique and specific epitopes on Hog Transcobalamin I (TCN1) have been identified, and mouse monoclonal antibodies have been generated against these epitopes and/or against a crude preparation of Hog TCN1. These antibodies have several potential uses, including (for example but not by way of limitation): estimation of TCN1 in crude hog intestinal wall preparation (commonly used in isolation of Hog IF); and removal of TCN1 from Hog Intrinsic Factor (HIF) preparations (such as, but not limited to, by using affinity chromatography), as HIF preparations are commonly used in B12 assays.

Certain non-limiting embodiments of the present disclosure are directed to an antibody or antigen-binding fragment thereof that specifically binds to hog transcobalamin-1 (TCN1). In a particular non-limiting embodiment, the antibody or antigen-binding fragment thereof specifically binds to an epitope of Hog TCN1 selected from at least a portion of at least one of SEQ ID NO: 2, 3, 4, and/or 20-23.

Certain non-limiting embodiments of the present disclosure are directed to an antibody or antigen-binding fragment thereof that specifically binds to hog transcobalamin-1 (TCN1), wherein the antibody comprises one or more of: (i) a heavy chain variable region CDR1 having the amino acid sequence of SEQ ID NO:8; (ii) a heavy chain variable region CDR2 having the amino acid sequence of SEQ ID NO:9; (iii) a heavy chain variable region CDR3 having the amino acid sequence of SEQ ID NO:10; (iv) a light chain variable region CDR1 having the amino acid sequence of SEQ ID NO:14; (v) a light chain variable region CDR2 having the amino acid sequence of SEQ ID NO:15; and (vi) a light chain variable region CDR3 having the amino acid sequence of SEQ ID NO:16. In a particular non-limiting embodiment, the antibody or antigen-binding fragment thereof comprises two, three, four, or five of (i)-(vi) above. In another particular non-limiting embodiment, the antibody or antigen-binding fragment thereof comprises all of (i)-(vi) above.

Certain non-limiting embodiments of the present disclosure are directed to an antibody or antigen-binding fragment thereof that specifically binds to hog transcobalamin-1 (TCN1), wherein the antibody comprises one or more of: (i) a heavy chain variable region CDR1 having the amino acid sequence of SEQ ID NO:26; (ii) a heavy chain variable region CDR2 having the amino acid sequence of SEQ ID NO:27; (iii) a heavy chain variable region CDR3 having the amino acid sequence of SEQ ID NO:28; (iv) a light chain variable region CDR1 having the amino acid sequence of SEQ ID NO:31; (v) a light chain variable region CDR2 having the amino acid sequence of SEQ ID NO:32; and (vi) a light chain variable region CDR3 having the amino acid sequence of SEQ ID NO:33. In a particular non-limiting embodiment, the antibody or antigen-binding fragment thereof comprises two, three, four, or five of (i)-(vi) above. In another particular non-limiting embodiment, the antibody or antigen-binding fragment thereof comprises all of (i)-(vi) above.

Certain non-limiting embodiments of the present disclosure are directed to an antibody or antigen-binding fragment thereof that specifically binds to hog transcobalamin-1 (TCN1), wherein the antibody comprises one or more of: (i) a heavy chain variable region CDR1 having the amino acid sequence of SEQ ID NO:38; (ii) a heavy chain variable region CDR2 having the amino acid sequence of SEQ ID NO:39; (iii) a heavy chain variable region CDR3 having the amino acid sequence of SEQ ID NO:40; (iv) a light chain variable region CDR1 having the amino acid sequence of SEQ ID NO:43; (v) a light chain variable region CDR2 having the amino acid sequence of SEQ ID NO:44; and (vi) a light chain variable region CDR3 having the amino acid sequence of SEQ ID NO:45. In a particular non-limiting embodiment, the antibody or antigen-binding fragment thereof comprises two, three, four, or five of (i)-(vi) above. In another particular non-limiting embodiment, the antibody or antigen-binding fragment thereof comprises all of (i)-(vi) above.

Certain non-limiting embodiments of the present disclosure are directed to an antibody or antigen-binding fragment thereof that specifically binds to hog transcobalamin-1 (TCN1), wherein the antibody comprises one or more of: (i) a heavy chain variable region CDR1 having the amino acid sequence of SEQ ID NO:50; (ii) a heavy chain variable region CDR2 having the amino acid sequence of SEQ ID NO:51; (iii) a heavy chain variable region CDR3 having the amino acid sequence of SEQ ID NO:52; (iv) a light chain variable region CDR1 having the amino acid sequence of SEQ ID NO:55; (v) a light chain variable region CDR2 having the amino acid sequence of SEQ ID NO:56; and (vi) a light chain variable region CDR3 having the amino acid sequence of SEQ ID NO:57. In a particular non-limiting embodiment, the antibody or antigen-binding fragment thereof comprises two, three, four, or five of (i)-(vi) above. In another particular non-limiting embodiment, the antibody or antigen-binding fragment thereof comprises all of (i)-(vi) above.

Certain non-limiting embodiments of the present disclosure are directed to an antibody or antigen-binding fragment thereof that specifically binds to hog transcobalamin-1 (TCN1), wherein the antibody comprises one or more of: (i) a heavy chain variable region CDR1 having the amino acid sequence of SEQ ID NO:62; (ii) a heavy chain variable region CDR2 having the amino acid sequence of SEQ ID NO:63; (iii) a heavy chain variable region CDR3 having the amino acid sequence of SEQ ID NO:64; (iv) a light chain variable region CDR1 having the amino acid sequence of SEQ ID NO:67; (v) a light chain variable region CDR2 having the amino acid sequence of SEQ ID NO: 68; and (vi) a light chain variable region CDR3 having the amino acid sequence of SEQ ID NO:69. In a particular non-limiting embodiment, the antibody or antigen-binding fragment thereof comprises two, three, four, or five of (i)-(vi) above. In another particular non-limiting embodiment, the antibody or antigen-binding fragment thereof comprises all of (i)-(vi) above.

Certain particular non-limiting embodiments of the present disclosure are directed to an antibody or antigen-binding fragment thereof that is selected from the group of (A)-(E), wherein: (A) is an antibody or antigen-binding fragment thereof comprising a heavy chain variable region CDR1 having the amino acid sequence of SEQ ID NO:8, a heavy chain variable region CDR2 having the amino acid sequence of SEQ ID NO:9, a heavy chain variable region CDR3 having the amino acid sequence of SEQ ID NO:10, a light chain variable region CDR1 having the amino acid sequence of SEQ ID NO:14, a light chain variable region CDR2 having the amino acid sequence of SEQ ID NO:15, and a light chain variable region CDR3 having the amino acid sequence of SEQ ID NO:16; (B) is an antibody or antigen-binding fragment thereof comprising a heavy chain variable region CDR1 having the amino acid sequence of SEQ ID NO:26, a heavy chain variable region CDR2 having the amino acid sequence of SEQ ID NO:27, a heavy chain variable region CDR3 having the amino acid sequence of SEQ ID NO:28, a light chain variable region CDR1 having the amino acid sequence of SEQ ID NO:31, a light chain variable region CDR2 having the amino acid sequence of SEQ ID NO:32, and a light chain variable region CDR3 having the amino acid sequence of SEQ ID NO:33; (C) is an antibody or antigen-binding fragment thereof comprising a heavy chain variable region CDR1 having the amino acid sequence of SEQ ID NO:38, a heavy chain variable region CDR2 having the amino acid sequence of SEQ ID NO:39, a heavy chain variable region CDR3 having the amino acid sequence of SEQ ID NO:40, a light chain variable region CDR1 having the amino acid sequence of SEQ ID NO:43, a light chain variable region CDR2 having the amino acid sequence of SEQ ID NO:44, and a light chain variable region CDR3 having the amino acid sequence of SEQ ID NO:45; (D) is an antibody or antigen-binding fragment thereof comprising a heavy chain variable region CDR1 having the amino acid sequence of SEQ ID NO:50, a heavy chain variable region CDR2 having the amino acid sequence of SEQ ID NO:51, a heavy chain variable region CDR3 having the amino acid sequence of SEQ ID NO:52, a light chain variable region CDR1 having the amino acid sequence of SEQ ID NO:55, a light chain variable region CDR2 having the amino acid sequence of SEQ ID NO:56, and a light chain variable region CDR3 having the amino acid sequence of SEQ ID NO:57; and (E) is an antibody or antigen-binding fragment thereof comprising a heavy chain variable region CDR1 having the amino acid sequence of SEQ ID NO:62, a heavy chain variable region CDR2 having the amino acid sequence of SEQ ID NO:63, a heavy chain variable region CDR3 having the amino acid sequence of SEQ ID NO:64, a light chain variable region CDR1 having the amino acid sequence of SEQ ID NO:67, a light chain variable region CDR2 having the amino acid sequence of SEQ ID NO:68, and a light chain variable region CDR3 having the amino acid sequence of SEQ ID NO:69.

The antibody or antigen-binding fragment thereof may specifically bind to any epitope of Hog TCN1. For example, but not by way of limitation, the antibody or antigen-binding fragment thereof may specifically bind to any portion(s) of the amino acid sequence shown in SEQ ID NO:1, or a functional equivalent thereof (such as (but not limited to) an amino acid sequence that has at least about 70%, at least about 80%, at least about 85%, at least about 90%, at least about 91%, at least about 92%, at least about 93%, at least about 94%, at least about 95%, at least about 96%, at least about 97%, at least about 98%, or at least about 99% identity to at least a portion of SEQ ID NO:1).

In particular (but non-limiting) embodiments, the epitope of Hog TCN1 to which the antibody/functional fragment specifically binds comprises at least a portion of SEQ ID NO:2. In other particular (but non-limiting) embodiments, the epitope of Hog TCN1 to which the antibody/functional fragment specifically binds comprises at least a portion of SEQ ID NO:3. In yet other particular (but non-limiting) embodiments, the epitope of Hog TCN1 to which the antibody/functional fragment specifically binds comprises at least a portion of SEQ ID NO:4. In yet other particular (but non-limiting) embodiments, the epitope of Hog TCN1 to which the antibody/functional fragment specifically binds comprises at least a portion of SEQ ID NO:20. In yet other particular (but non-limiting) embodiments, the epitope of Hog TCN1 to which the antibody/functional fragment specifically binds comprises at least a portion of SEQ ID NO:21. In yet other particular (but non-limiting) embodiments, the epitope of HogTCN1 to which the antibody/functional fragment specifically binds comprises at least a portion of SEQ ID NO:22. In yet other particular (but non-limiting) embodiments, the epitope of HogTCN1 to which the antibody/functional fragment specifically binds comprises at least a portion of SEQ ID NO:23.

In a particular (but non-limiting) embodiment, the antibody or antigen-binding fragment thereof has a heavy chain variable region with an amino acid sequence that is at least about 70% identical to SEQ ID NO:7, 25, 37, 49, or 61, such as (but not limited to) at least about 75% identical, at least about 80% identical, at least about 85% identical, at least about 90% identical, at least about 91% identical, at least about 92% identical, at least about 93% identical, at least about 94% identical, at least about 95% identical, at least about 96% identical, at least about 97% identical, at least about 98% identical, or at least about 99% identical to SEQ ID NO:7, 25, 37, 49, or 61.

In a particular (but non-limiting) embodiment, the antibody or antigen-binding fragment thereof has a heavy chain variable region with an amino acid sequence that differs from SEQ ID NO:7, 25, 37, 49, or 61 by less than about 25 amino acids, less than about 24 amino acids, less than about 23 amino acids, less than about 22 amino acids, less than about 21 amino acids, less than about 20 amino acids, less than about 19 amino acids, less than about 18 amino acids, less than about 17 amino acids, less than about 16 amino acids, less than about 15 amino acids, less than about 14 amino acids, less than about 13 amino acids, less than about 12 amino acids, less than about 11 amino acids, less than about 10 amino acids, less than about 9 amino acids, less than about 8 amino acids, less than about 7 amino acids, less than about 6 amino acids, less than about 5 amino acids, less than about 4 amino acids, less than about 3 amino acids, less than about 2 amino acids, or less than about 1 amino acids.

In a particular (but non-limiting) embodiment, and alternatively and/or in addition to the above embodiments, the antibody or antigen-binding fragment thereof has a light chain variable region with an amino acid sequence that is at least about 70% identical to SEQ ID NO:13, 30, 42, 54, or 66, such as (but not limited to) at least about 75% identical, at least about 80% identical, at least about 85% identical, at least about 90% identical, at least about 91% identical, at least about 92% identical, at least about 93% identical, at least about 94% identical, at least about 95% identical, at least about 96% identical, at least about 97% identical, at least about 98% identical, or at least about 99% identical to SEQ ID NO:13, 30, 42, 54, or 66.

In a particular (but non-limiting) embodiment, the antibody or antigen-binding fragment thereof has a light chain variable region with an amino acid sequence that differs from SEQ ID NO:13, 30, 42, 54, or 66 by less than about 21 amino acids, less than about 20 amino acids, less than about 19 amino acids, less than about 18 amino acids, less than about 17 amino acids, less than about 16 amino acids, less than about 15 amino acids, less than about 14 amino acids, less than about 13 amino acids, less than about 12 amino acids, less than about 11 amino acids, less than about 10 amino acids, less than about 9 amino acids, less than about 8 amino acids, less than about 7 amino acids, less than about 6 amino acids, less than about 5 amino acids, less than about 4 amino acids, less than about 3 amino acids, less than about 2 amino acids, or less than about 1 amino acids.

In a particular (but non-limiting) embodiment, the antibody or antigen-binding fragment thereof has a heavy chain variable region with an amino acid sequence that is at least about 90% identical to SEQ ID NO:7, 25, 37, 49, or 61, and/or the antibody or antigen-binding fragment thereof has a light chain variable region with an amino acid sequence that is at least about 90% identical to SEQ ID NO:13, 30, 42, 54, or 66. In a particular (but non-limiting) embodiment, the antibody or antigen-binding fragment thereof has a heavy chain variable region with an amino acid sequence that differs from SEQ ID NO:7, 25, 37, 49, or 61 by less than about 13 amino acids, and/or a light chain variable region with an amino acid sequence that differs from SEQ ID NO:13, 30, 42, 54, or 66 by less than about 12 amino acids.

In another particular (but non-limiting) embodiment, the antibody or antigen-binding fragment thereof has a heavy chain variable region with the amino acid sequence of SEQ ID NO:7, 25, 37, 49, or 61 and/or a light chain variable region with the amino acid sequence of SEQ ID NO: 13, 30, 42, 54, or 66, respectively.

In another particular (but non-limiting) embodiment, the antibody or antigen-binding fragment thereof has a heavy chain with an amino acid sequence that is at least about 70% identical to SEQ ID NO:6, such as (but not limited to) at least about 75% identical, at least about 80% identical, at least about 85% identical, at least about 90% identical, at least about 91% identical, at least about 92% identical, at least about 93% identical, at least about 94% identical, at least about 95% identical, at least about 96% identical, at least about 97% identical, at least about 98% identical, or at least about 99% identical to SEQ ID NO:6.

In a particular (but non-limiting) embodiment, the antibody or antigen-binding fragment thereof has a heavy chain with an amino acid sequence that differs from SEQ ID NO:6 by less than about 100 amino acids, less than about 90 amino acids, less than about 80 amino acids, less than about 75 amino acids, less than about 70 amino acids, less than about 65 amino acids, less than about 60 amino acids, less than about 55 amino acids, less than about 50 amino acids, less than about 45 amino acids, less than about 40 amino acids, less than about 35 amino acids, less than about 30 amino acids, less than about 25 amino acids, less than about 24 amino acids, less than about 23 amino acids, less than about 22 amino acids, less than about 21 amino acids, less than about 20 amino acids, less than about 19 amino acids, less than about 18 amino acids, less than about 17 amino acids, less than about 16 amino acids, less than about 15 amino acids, less than about 14 amino acids, less than about 13 amino acids, less than about 12 amino acids, less than about 11 amino acids, less than about 10 amino acids, less than about 9 amino acids, less than about 8 amino acids, less than about 7 amino acids, less than about 6 amino acids, less than about 5 amino acids, less than about 4 amino acids, less than about 3 amino acids, less than about 2 amino acids, or less than about 1 amino acids.

In a particular (but non-limiting) embodiment, and alternatively and/or in addition to the above embodiments, the antibody or antigen-binding fragment thereof has a light chain with an amino acid sequence that is at least about 70% identical to SEQ ID NO:12, such as (but not limited to) at least about 75% identical, at least about 80% identical, at least about 85% identical, at least about 90% identical, at least about 91% identical, at least about 92% identical, at least about 93% identical, at least about 94% identical, at least about 95% identical, at least about 96% identical, at least about 97% identical, at least about 98% identical, or at least about 99% identical to SEQ ID NO:12.

In a particular (but non-limiting) embodiment, the antibody or antigen-binding fragment thereof has a light chain with an amino acid sequence that differs from SEQ ID NO:12 by less than about 45 amino acids, less than about 40 amino acids, less than about 35 amino acids, less than about 30 amino acids, less than about 25 amino acids, less than about 24 amino acids, less than about 23 amino acids, less than about 22 amino acids, less than about 21 amino acids, less than about 20 amino acids, less than about 19 amino acids, less than about 18 amino acids, less than about 17 amino acids, less than about 16 amino acids, less than about 15 amino acids, less than about 14 amino acids, less than about 13 amino acids, less than about 12 amino acids, less than about 11 amino acids, less than about 10 amino acids, less than about 9 amino acids, less than about 8 amino acids, less than about 7 amino acids, less than about 6 amino acids, less than about 5 amino acids, less than about 4 amino acids, less than about 3 amino acids, less than about 2 amino acids, or less than about 1 amino acids.

In a particular (but non-limiting) embodiment, the antibody or antigen-binding fragment thereof has a heavy chain with an amino acid sequence that is at least about 90% identical to SEQ ID NO:6, and/or the antibody or antigen-binding fragment thereof has a light chain with an amino acid sequence that is at least about 70% identical to SEQ ID NO:12. In a particular (but non-limiting) embodiment, the antibody or antigen-binding fragment thereof has a heavy chain with an amino acid sequence that differs from SEQ ID NO:6 by less than about 47 amino acids, and/or a light chain with an amino acids sequence that differs from SEQ ID NO:12 by less than about 24 amino acids.

In another particular (but non-limiting) embodiment, the antibody or antigen-binding fragment thereof has a heavy chain with the amino acid sequence of SEQ ID NO:6 and/or a light chain with the amino acid sequence of SEQ ID NO:12.

In yet another particular (but non-limiting) embodiment, the antibody or functional fragment has a heavy chain encoded by a polynucleotide that is at least about 70% identical to SEQ ID NO:5, or a heavy chain variable region encoded by a polynucleotide that is at least about 70% identical to SEQ ID NO:24, 36, 48, or 60, such as (but not limited to) at least about 75% identical, at least about 80% identical, at least about 85% identical, at least about 90% identical, at least about 91% identical, at least about 92% identical, at least about 93% identical, at least about 94% identical, at least about 95% identical, at least about 96% identical, at least about 97% identical, at least about 98% identical, or at least about 99% identical to SEQ ID NO:5, 24, 36, 48, or 60.

In yet another particular (but non-limiting) embodiment, and alternatively and/or in addition to the above embodiment, the antibody or functional fragment has a light chain encoded by a polynucleotide that is at least about 70% identical to SEQ ID NO:11, or a light chain variable region encoded by a polynucleotide that is at least about 70% identical to SEQ ID NO:29, 41, 53, or 65, such as (but not limited to) at least about 75% identical, at least about 80% identical, at least about 85% identical, at least about 90% identical, at least about 91% identical, at least about 92% identical, at least about 93% identical, at least about 94% identical, at least about 95% identical, at least about 96% identical, at least about 97% identical, at least about 98% identical, or at least about 99% identical to SEQ ID NO:11, 29, 41, 53, or 65.

In yet a further particular (but non-limiting) embodiment, the antibody or functional fragment has a heavy chain encoded by a polynucleotide that is at least about 70% identical to SEQ ID NO:5, and/or the antibody or functional fragment has a light chain encoded by a polynucleotide that is at least about 70% identical to SEQ ID NO:11. In yet a further particular (but non-limiting) embodiment, the antibody or functional fragment has a heavy chain variable region encoded by a polynucleotide that is at least about 70% identical to SEQ ID NO:24, 36, 48, or 60, and/or the antibody or functional fragment has a light chain variable region encoded by a polynucleotide that is at least about 70% identical to SEQ ID NO:29, 41, 53, or 65, respectively.

In yet another particular (but non-limiting) embodiment, the antibody or antigen-binding fragment thereof has a heavy chain encoded by a sequence that differs from SEQ ID NO:5, or a heavy chain variable region encoded by a sequence that differs from SEQ ID NO:24, 36, 48, or 60, by less than about 100 nucleotides, less than about 90 nucleotides, less than about 80 nucleotides, less than about 75 nucleotides, less than about 70 nucleotides, less than about 60 nucleotides, less than about 50 nucleotides, less than about 45 nucleotides, less than about 40 nucleotides, less than about 35 nucleotides, less than about 30 nucleotides, less than about 25 nucleotides, less than about 20 nucleotides, less than about 15 nucleotides, less than about 10 nucleotides, less than about 9 nucleotides, less than about 8 nucleotides, less than about 7 nucleotides, less than about 6 nucleotides, less than about 5 nucleotides, less than about 4 nucleotides, less than about 3 nucleotides, less than about 2 nucleotides, or less than about 1 nucleotide.

In yet another particular (but non-limiting) embodiment, and alternatively and/or in addition to the above embodiment, the antibody or antigen-binding fragment thereof has a light chain encoded by a sequence that differs from SEQ ID NO:11, or a light chain variable region encoded by a sequence that differs from SEQ ID NO:30, 42, 54, or 66, by less than about 100 nucleotides, less than about 90 nucleotides, less than about 80 nucleotides, less than about 75 nucleotides, less than about 70 nucleotides, less than about 60 nucleotides, less than about 50 nucleotides, less than about 45 nucleotides, less than about 40 nucleotides, less than about 35 nucleotides, less than about 30 nucleotides, less than about 25 nucleotides, less than about 20 nucleotides, less than about 15 nucleotides, less than about 10 nucleotides, less than about 9 nucleotides, less than about 8 nucleotides, less than about 7 nucleotides, less than about 6 nucleotides, less than about 5 nucleotides, less than about 4 nucleotides, less than about 3 nucleotides, less than about 2 nucleotides, or less than about 1 nucleotide.

In yet another particular (but non-limiting) embodiment, the antibody or antigen-binding fragment thereof has a heavy chain encoded by a sequence that differs from SEQ ID NO:5 by less than about 100 nucleotides and/or a light chain encoded by a sequence that differs from SEQ ID NO:11 by less than about 70 nucleotides. In yet another particular (but non-limiting) embodiment, the antibody or antigen-binding fragment thereof has a heavy chain variable region encoded by a sequence that differs from SEQ ID NO:25, 37, 49, or 61 by less than about 100 nucleotides and/or a light chain variable region encoded by a sequence that differs from SEQ ID NO:29, 41, 53, or 65, respectively, by less than about 70 nucleotides.

Standard assays to evaluate the binding ability of the antibodies are known in the art, including, for example (but not by way of limitation), ELISAs, Western blots, and RIAs and other types of suitable assays well known in the art. The binding kinetics (e.g., binding affinity) of the antibodies also can be assessed by standard assays known in the art, such as (but not limited to) by Biacore analysis. In some non-limiting embodiments, the antibodies described herein bind to sequences above with a dissociation constant of less than or equal to about $10^{-6}$ M, about $10^{-7}$ M, about $10^{-8}$ M, about $10^{-8}$ M, or about $10^{-10}$ M. In one particular (but non-limiting) embodiment, the antibody binds to an epitope of Hog TCN1 with a dissociation constant of less than or equal to about $10^{-7}$ M.

The antibody or antigen-binding fragment thereof may be a monoclonal antibody or antigen-binding fragment thereof. Alternatively, the antibody or antigen-binding fragment thereof may be a polyclonal antibody or antigen-binding fragment thereof.

In certain non-limiting embodiments, the antibody or antigen-binding fragment thereof is further defined as being selected from a full-length immunoglobulin molecule, an scFv, a Fab fragment, a Fab' fragment, a F(ab')$_2$, a Fv, a disulfide linked Fv, and combinations thereof.

In certain non-limiting embodiments, the antibody or antigen-binding fragment thereof is isolated. In particular (but non-limiting) embodiments, the antibody or antigen-binding fragment thereof is purified.

The present disclosure is also directed to antibodies or functional fragments thereof that bind to the same epitope as any of the antibodies or functional fragments described herein above.

Certain non-limiting embodiments of the present disclosure are also directed to a method of producing an antibody or antigen-binding fragment thereof which can specifically bind to an epitope of hog transcobalamin-1 (TCN1). The method includes immunizing a non-human animal with an antigenic compound comprising at least one peptide of SEQ ID NO:2-4 and/or 20-23; and recovering the antibody or antigen-binding fragment thereof from blood plasma of the non-human animal.

Certain non-limiting embodiments of the present disclosure are directed to a hybridoma producing any of the antibodies or antigen-binding fragments thereof described herein above.

Certain non-limiting embodiments of the present disclosure are directed to a method of producing an antibody or antigen-binding fragment thereof which can specifically bind to an epitope of hog transcobalamin-1 (TCN1). In the method, the hybridoma described herein above is cultured to produce any of the antibodies or antigen-binding fragments thereof described herein above. In at least certain non-limiting embodiments, the antibody or antigen-binding fragment thereof is recovered.

Certain non-limiting embodiments of the present disclosure are also directed to a conjugate comprising any of the antibodies or antigen-binding fragments thereof disclosed or otherwise contemplated herein attached to a detectable label. Non-limiting examples of detectable labels that may be utilized in accordance with the present disclosure include an enzyme label, a radioactive label, a fluorescent label, a chemiluminescent label, a bioluminescent label, and a particulate label, as well as any combinations thereof. In addition, the detectable label may be attached to the antibody or functional fragment via direct or indirect conjugation.

Certain non-limiting embodiments of the present disclosure are also directed to a conjugate comprising any of the antibodies or antigen-binding fragments thereof disclosed or otherwise contemplated herein attached to a solid support. Attachment of the antibody/antigen-binding fragment to a solid support (via direct or indirect conjugation) produces an affinity purification chromatography substrate such as, for example (but not by way of limitation), a column.

Certain non-limiting embodiments of the present disclosure are directed to a polynucleotide encoding any of the antibodies or antigen-binding fragments thereof disclosed or otherwise contemplated herein.

In a particular (but non-limiting) embodiment, a portion of the polynucleotide encoding a heavy chain or heavy chain variable region of the antibody or antigen-binding fragment thereof is at least about 70% identical to SEQ ID NO:5, 24, 36, 48, or 60, such as (but not limited to) at least about 75% identical, at least about 80% identical, at least about 85% identical, at least about 90% identical, at least about 91% identical, at least about 92% identical, at least about 93% identical, at least about 94% identical, at least about 95% identical, at least about 96% identical, at least about 97% identical, at least about 98% identical, or at least about 99% identical to SEQ ID NO:5, 24, 36, 48, or 60.

In yet another particular (but non-limiting) embodiment, and alternatively and/or in addition to the above embodiment, portion of the polynucleotide encoding a heavy chain or heavy chain variable region of the antibody or antigen-binding fragment thereof is at least about 70% identical to SEQ ID NO:11, 29, 41, 53, or 65, such as (but not limited to) at least about 75% identical, at least about 80% identical, at least about 85% identical, at least about 90% identical, at least about 91% identical, at least about 92% identical, at least about 93% identical, at least about 94% identical, at least about 95% identical, at least about 96% identical, at least about 97% identical, at least about 98% identical, or at least about 99% identical to SEQ ID NO:11, 29, 41, 53, or 65.

In yet another particular (but non-limiting) embodiment, a portion of the polynucleotide encoding a heavy chain or heavy chain variable region of the antibody or antigen-binding fragment thereof is at least about 90% identical to SEQ ID NO:5, 24, 36, 48, or 60, and/or a portion of the polynucleotide encoding a light chain or light chain variable region of the antibody or antigen-binding fragment thereof is at least about 90% identical to SEQ ID NO:11, 29, 41, 53, or 65, respectively.

In yet a further particular (but non-limiting) embodiment, a portion of the polynucleotide encoding a heavy chain or heavy chain variable region of the antibody or antigen-binding fragment thereof is at least about 90% identical to SEQ ID NO:5, 24, 36, 48, or 60 and/or a portion of the polynucleotide encoding a light chain or light chain variable region of the antibody or antigen-binding fragment thereof is at least about 90% identical to SEQ ID NO:11, 29, 41, 53, or 65, respectively.

In another particular (but non-limiting) embodiment, the portion of the sequence corresponding to the heavy chain or heavy chain variable region of the antibody or antigen-binding fragment thereof and/or the portion of the sequence corresponding to the light chain or light chain variable region of the antibody or antigen-binding fragment thereof differs from SEQ ID NO:5, 24, 36, 48, or 60 or SEQ ID NO:11, 29, 41, 53, or 65, respectively, by less than about 100 nucleotides, less than about 90 nucleotides, less than about 80 nucleotides, less than about 75 nucleotides, less than about 70 nucleotides, less than about 60 nucleotides, less than about 50 nucleotides, less than about 45 nucleotides, less than about 40 nucleotides, less than about 35 nucleotides, less than about 30 nucleotides, less than about 25 nucleotides, less than about 20 nucleotides, less than about 15 nucleotides, less than about 10 nucleotides, less than about 9 nucleotides, less than about 8 nucleotides, less than about 7 nucleotides, less than about 6 nucleotides, less than about 5 nucleotides, less than about 4 nucleotides, less than about 3 nucleotides, less than about 2 nucleotides, or less than about 1 nucleotide.

In yet another particular (but non-limiting) embodiment, the portion of the sequence corresponding to the heavy chain or heavy chain variable region of the antibody or antigen-binding fragment thereof differs from SEQ ID NO:5, 24, 36, 48, or 60 by less than about 100 nucleotides, and/or the portion of the sequence corresponding to the light chain or light chain variable region of the antibody or antigen-binding fragment thereof differs from SEQ ID NO:11, 29, 41, 53, or 65 by less than about 70 nucleotides.

Certain non-limiting embodiments of the present disclosure are directed to a vector comprising any of the polynucleotides encoding an antibody or antigen-binding fragment thereof described or otherwise contemplated herein.

Certain non-limiting embodiments of the present disclosure are directed to a recombinant host cell comprising any of the polynucleotides encoding an antibody or antigen-binding fragment thereof described or otherwise contemplated herein. Certain non-limiting embodiments of the present disclosure are directed to a recombinant host cell comprising any of the vectors described or otherwise contemplated herein.

Certain non-limiting embodiments of the present disclosure are directed to a method of producing an antibody or antigen-binding fragment thereof which can specifically bind to hog transcobalamin-1 (TCN1). The method comprises the steps of: (a) culturing any of the recombinant host cells described or otherwise contemplated herein in a cell culture under conditions that allow for the expression of the antibody or antigen-binding fragment thereof encoded by the polynucleotide; and (b) isolating the antibody or antigen-binding fragment thereof from the cell culture.

Certain non-limiting embodiments of the present disclosure are directed to a method of detecting TCN1 present in a hog intrinsic factor (HIF) preparation. The method comprises the steps of: contacting the HIF preparation with any of the antibodies or antigen-binding fragments thereof disclosed or otherwise contemplated herein under conditions whereby an antibody/TCN1 complex is formed if TCN1 is present in the HIF preparation; and detecting any antibody/TCN1 complex formed, wherein an amount of antibody-TCN1 complex formed is directly proportional to an amount of TCN1 present in the HIF preparation.

In a particular (but non-limiting) embodiment, a label as described herein above is attached to the antibody/functional fragment for use in the detection of the antibody/TCN1 complex.

Certain non-limiting embodiments of the present disclosure are directed to a method of removing TCN1 present in a hog intrinsic factor (HIF) preparation. The method comprises the steps of: contacting the HIF preparation with any of the antibodies or antigen-binding fragments thereof disclosed or otherwise contemplated therein under conditions whereby an antibody/TCN1 complex is formed if TCN1 is present in the HIF preparation; and removing the antibody/TCN1 complex from the HIF preparation.

In a particular (but non-limiting) embodiment, the antibody or antigen-binding fragment thereof is attached to a solid support, as described herein above, that aids in removal of the antibody-TCN1 complex from the HIF preparation.

In a particular (but non-limiting) embodiment, the method may further include the step of eluting the TCN1 from the antibody/TCN1 complex to thereby purify the TCN1 from the HIF preparation. In this manner, the method of removing TCN1 present in a hog intrinsic factor preparation also functions as a method of purifying TCN1 from a hog intrinsic factor preparation.

Certain non-limiting embodiments of the present disclosure also include kits containing any of the antibodies/antigen-binding fragments and/or compositions disclosed or otherwise contemplated herein (such as the compositions comprising antibody/antigen-binding fragment attached to a detectable label or a solid support), as well as any other reagents that may utilized in the assays/methods described herein and/or in vitamin B12 assays performed after TCN1 has been estimated and/or removed from a HIF preparation. For example (but not by way of limitation), the kit may further include an antibody or antigen-binding fragment thereof that binds to HIF.

The assay components/reagents of the compositions/kits/methods may be provided in any form that allows them to function in accordance with the present disclosure. For example, but not by way of limitation, each of the reagents may be provided in liquid form and disposed in bulk and/or single aliquot form within the kit. Alternatively, in a particular (but non-limiting) embodiment, one or more of the reagents may be disposed in the kit in the form of a single aliquot lyophilized reagent. The use of dried reagents in microfluidics devices is described in detail in U.S. Pat. No. 9,244,085 (Samproni), the entire contents of which are hereby expressly incorporated herein by reference.

In addition to the assay components/reagents described in detail herein above, the kits may further contain other reagent(s) for conducting any of the particular assays described or otherwise contemplated herein. The nature of these additional reagent(s) will depend upon the particular assay format, and identification thereof is well within the skill of one of ordinary skill in the art; therefore, no further description thereof is deemed necessary. Also, the components/reagents present in the kits may each be in separate containers/compartments, or various components/reagents can be combined in one or more containers/compartments, depending on the cross-reactivity and stability of the components/reagents. In addition, the kit may include a microfluidics device in which the components/reagents are disposed.

The relative amounts of the various components/reagents in the kits can vary widely to provide for concentrations of the components/reagents that substantially optimize the reactions that need to occur during the assay methods and further to optimize substantially the sensitivity of an assay. Under appropriate circumstances, one or more of the components/reagents in the kit can be provided as a dry powder, such as a lyophilized powder, and the kit may further include excipient(s) for dissolution of the dried reagents; in this manner, a reagent solution having the appropriate concentrations for performing a method or assay in accordance with the present disclosure can be obtained from these components. Positive and/or negative controls may also be included with the kit. In addition, the kit can further include a set of written instructions explaining how to use the kit. A kit of this nature can be used in any of the methods described or otherwise contemplated herein.

EXAMPLES

Examples are provided hereinbelow. However, the present disclosure is to be understood to not be limited in its application to the specific experimentation, results, and laboratory procedures disclosed herein. Rather, the Examples are simply provided as one of various embodiments and are meant to be exemplary, not exhaustive.

Example 1: Identification of Epitopes of Hog TCN1 and Production of Anti-Hog TCN1 Monoclonal Antibody Using Synthetic Peptide Hog R-protein (TCN1) is a glycoprotein comprising 392 amino acids (with a polypeptide chain Mw of about 46 kDa) and up to about 50% w/w carbohydrates; the amino acid sequence thereof is shown in SEQ ID NO:1. TCN1 protects acid sensitive vitamin B12 while it moves through the stomach.

For the purposes of this disclosure, a recombinant yeast-produced non-glycosylated pig TCN1 protein with a Mw of 46.3 kDa (Lifespan Biosciences, Inc., LS-G23154, Seattle, Wash.) will be referred to herein as "rec Pig TCN1," whereas glycosylated Hog TCN1 purified from crude powdered extract of hog gastric mucosa and having a Mw of about 70-92 kDa will be referred to herein as "native Hog R-protein."

TCN1 and Intrinsic Factor (IF), as well as TCN2, all have extraordinary affinity to the physiologically active forms of cobalamin (B12), with a $K_D$<1 pm; however, they each exhibit different selectivities toward non-functional cobalamin analogs. IF and, to some extent TCN, are sensitive to variations in the structure of the ligand, which helps these proteins to discriminate between the physiologically active and inactive corrinoids. On the contrary, TCN1 can successfully bind many defective corrinoids lacking even the whole nucleotide moiety. Binding to the carriers shields the lower part of the cobalamin molecule (also called α-site), which contains the nucleotide. On the contrary, the upper surface of cobalamin (β-site) with the active group is thought to be open, as judged from its reactivity with the external compounds in the case of holo-IF and holo-HC.

Hog TCN1 is the major contaminant in Hog Intrinsic Factor (HIF) preparations, which are used in vitamin B12 assays. Vitamin B12-binding proteins can be separated from most of the gastric proteins that do not bind vitamin B12 using affinity chromatography on vitamin B12-Sepharose as described by Allen et al. (J. Biol. Chem. (1973) 248(10): 3670-3680). FIG. 1 shows the total fraction of vitamin B12-binding proteins purified from crude powdered extract of hog gastric mucosa on the column of vitamin B12-Sepharose. SDS-PAGE at reducing conditions (Panel A) shows that the fraction contains native Hog R-protein (wide 70-92 kDa band) and Hog Intrinsic Factor (narrow 55 kDa band). Isoelectric focusing (Panel B) demonstrates that isoelectric points of both proteins are almost identical (pI<4.5).

For the purposes of this disclosure, the total fraction of vitamin B12-binding proteins purified from crude powdered extract of hog gastric mucosa on the column of Vitamin B12-Sepharose will be referred to herein as "partially purified native Hog R-protein."

As can be seen in FIG. 2, which contains an amino acid sequence alignment of Transcobalamin I (TCN1) and Intrinsic Factor (HIF) from *Sus scrofa*. The polypeptide chains of the two proteins share 31% identity and 49% homology.

It is extremely difficult to separate the two vitamin B12-binding proteins from each other by routine methods such as ammonium sulfate fractionation, size exclusion, or ion-exchange chromatography, because the two proteins have close molecular weights and almost identical isoelectric points (FIG. 1). Affinity chromatography on a column with a Hog TCN1-specific monoclonal antibody (mAb) would allow for separation of Hog TCN1 and HIF.

To the best of the inventors' knowledge, only one mouse monoclonal antibody, clone 3F10, is available commercially for Human TCN1, and there are no monoclonal antibodies available for Hog TCN1 or Hog Intrinsic Factor (HIF). However, this anti-Human-TCN1 antibody does not cross react with Hog TCN1.

Monoclonal antibodies specific to native Hog R-protein would allow for the development of an ELISA for estimation of Hog TCN1 in crude material and HIF preparations. Antibodies to Pig TCN1 would also allow for the development of an affinity column (or other affinity substrate) for use in the removal of Hog TCN1 contaminants from HIF preparations and/or in the polishing of the purified HIF, as needed.

An affinity column with anti-Hog R-protein monoclonal antibody would allow for purification of native glycosylated Hog R-protein from natural sources. To the best of the inventors' knowledge, only non-glycosylated yeast-produced recombinant Pig TCN1 protein is available commercially (LifeSpan BioSciences, Inc., LS-G23154, Seattle, Wash.), and there is no native Hog TCN1 currently available.

To identify unique and specific epitope(s) on Hog TCN1, an amino acid sequence alignment of TCN1 (or Haptocorrin, Accession Number P17830.2) and Intrinsic Factor (HIF, Accession Number XP_003122730.2) from *Sus scrofa* was performed using the Basic Local Alignment Search Tool (BLASTA) software (National Center for Biotechnology Information, US National Library of Medicine, Bethesda, Md.). Several Hog TCN1 peptides sharing no homology with HIF were identified, as shown in FIG. 2. These peptides were labeled R1, R2, and R3, and the amino acid sequences thereof are shown in Table 1.

Figure 3:
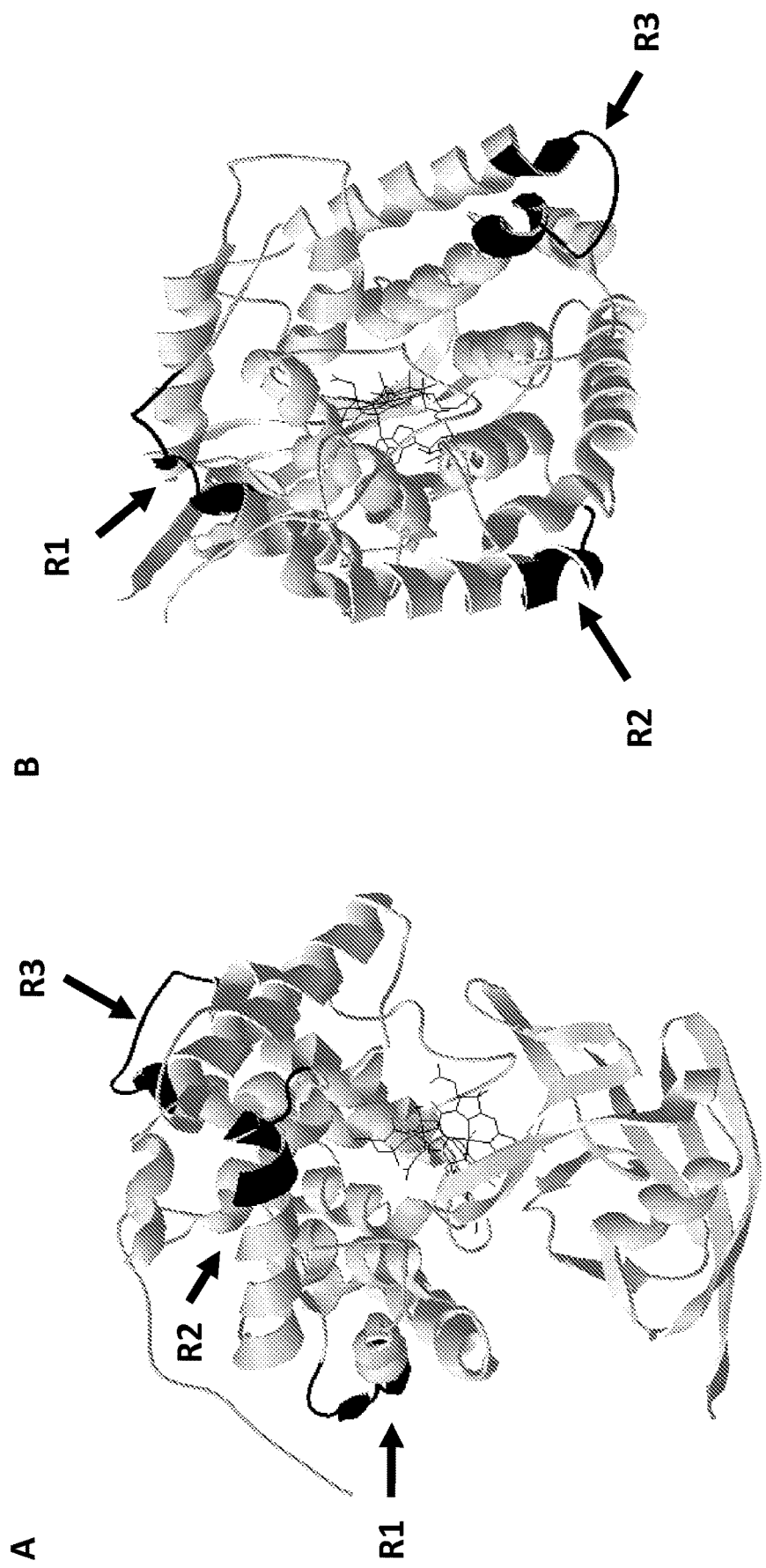
FIG. 3: Location of peptides R1, R2, and R3 on the surface of protein globule is shown on the front (Panel A) and top (Panel B) views of a model TCN1 crystal structure (PDB 4KKJ).

Surface localization of R1, R2, and R3 epitopes on the TCN1 molecule was confirmed using DeepView/Swiss-PdbViewer software from Swiss Institute of Bioinformatics (Lausanne, Switzerland). The crystal structure of Human Haptocorrin in complex with cyancobalamin at 2.35 Å resolution (PDB 4KKJ, (Furger, et al., J. Biol. Chem. (2013) 288(35): 25466-25476)) was used as a 3D-model to identify the location of the peptides. The locations of the R1, R2, and R3 peptides on the surface of the TCN1 molecule are shown in FIG. 3 in the front (Panel A) and top (Panel B) views of the model crystal structure.

Analysis of the amino acid sequences of the R1, R2, and R3 peptides with the FASTA software (EMBL-EBI, Hinxton, Cambridge) confirmed that these peptides represent epitopes unique for Hog R-protein. Thus, a specific murine monoclonal antibody was subsequently developed to one of the epitopes.

TABLE 2

Hog TCN1 Peptides and Respective Conjugates as Synthesized

| Peptide Based on: | Peptide Name | Description | Peptide Mw |
|---|---|---|---|
| SEQ ID NO: 2 | R1-BSA | SEKDYSHLRLL - 6C-BSA | 1576.85 |
|  | R1-OVA | SEKDYSHLRLL - 6C-Ovalbumin | 1576.85 |
|  | R1 | SEKDYSHLRLL | 1360.54 |
| SEQ ID NO: 3 | R2-BSA | QDDXNRRDXS* - 6C-BSA | 1447.6 |
|  | R2-OVA | QDDXNRRDXS* - 6C-Ovalbumin | 1447.6 |
|  | R2 | QDDXNRRDXS* | 1231.3 |
| SEQ ID NO: 4 | R3-BSA | KRSISNGKIKAAIKDS - 6C-BSA | 1932.33 |
|  | R3-OVA | KRSISNGKIKAAIKDS - 6C-Ovalbumin | 1932.33 |
|  | R3 | KRSISNGKIKAAIKDS | 1716.99 |

*X represents Norleucine

TABLE 1

Epitopes of Hog TCN1 Utilized for Generation of Antibodies

| Peptide Designation | SEQ ID NO: | Sequence | Amino Acid Residues of SEQ ID NO: 1 |
|---|---|---|---|
| R1 | 2 | SEKDYSHLRLL | 29-39 |
| R2 | 3 | QDDXNRRDXS* | 80-89 |
| R3 | 4 | KRSISNGKIKAAIKDS | 200-215 |

*Note that in SEQ ID NO: 3, the two native Methionine residues were modified to Norleucine in production of the peptide R2 (and are indicated with an "X" n the above sequence).

For production of monoclonal antibodies against the above-referenced epitopes, synthetic peptides and their respective conjugates with ovalbumin (OVA) and bovine serum albumin (BSA) were prepared at Bio-Synthesis, Inc. (Lewisville, Tex.), as outlined in Table 2. Note that for peptide R2, the two methionine residues present in the native Hog TCN1 sequence were modified to norleucine for synthesis of the peptide and conjugates thereof that were used as immunogens.

Antibodies were generated in compliance with federal regulations and IACUC protocol. The mouse system has worked very well for developing antibodies for use in in vitro diagnostics applications and thus was employed for the production of anti-Hog TCN1 antibodies.

In this Example, immunogens comprising R1, R2, or R3 peptide conjugated to BSA were used to immunize female BALB/c mice, Swiss Webster (SW) mice, or A/J mice intraperitoneally (IP) to produce monoclonal antibodies to Hog TCN1 peptide. Mice received three or more injections of immunogen (50 μg/dose/animal) with an interval of three weeks. Primary immunization was performed using antigen emulsified in Complete Freund's Adjuvant (CFA), followed by subsequent booster immunizations using Incomplete Freund's Adjuvant (IFA).

One week after the last injection, the mice were bled, and the serum samples were tested for peptide-specific antibodies in an ELISA assay with corresponding ovalbumin conjugates and free peptides. All ELISA steps were performed at room temperature. Nunc Maxi-Sorp™ flat-bottom ELISA plates were coated with peptide or peptide-OVA conjugate at 2 and 1 μg/mL in PBS, respectively, at 50 μl per well for 1 hour. The plates were flicked dry, and the remaining binding sites were blocked by adding 200 μl per well of blocking solution (0.5% Casein in PBS containing 0.05% Tween 20) for 1 hour. Plates were washed three times with Milli-Q water containing 0.05% Tween 20, and antibody samples to be tested (serum, hybridoma supernatant, or mAb dilutions in PBS) were placed in the wells of the plates at volume 50 μl per well. After incubation for one hour, the plates were washed again as described above, and goat anti-mouse IgG-HRP conjugate diluted 1:3,000 in blocking solution was added at 50 μl per well for 1 hour. The plates were washed, and TMB substrate (Moss, Pasadena, Md.) was added at 100 μl per well for 15 minutes. Optical density of the samples at 650 nm was measured using an ELISA plate reader.

The serum samples were also tested for binding with a sample of native Hog R-protein partially purified on Vitamin B12-Sepharose and contaminated with Hog Intrinsic Factor (FIG. 1). For this purpose, ELISA plates were coated with partially purified native Hog R-protein at 1 μg/mL in PBS at 50 μl per well for 1 hour, and the subsequent ELISA steps were performed as described above.

Figure 4:
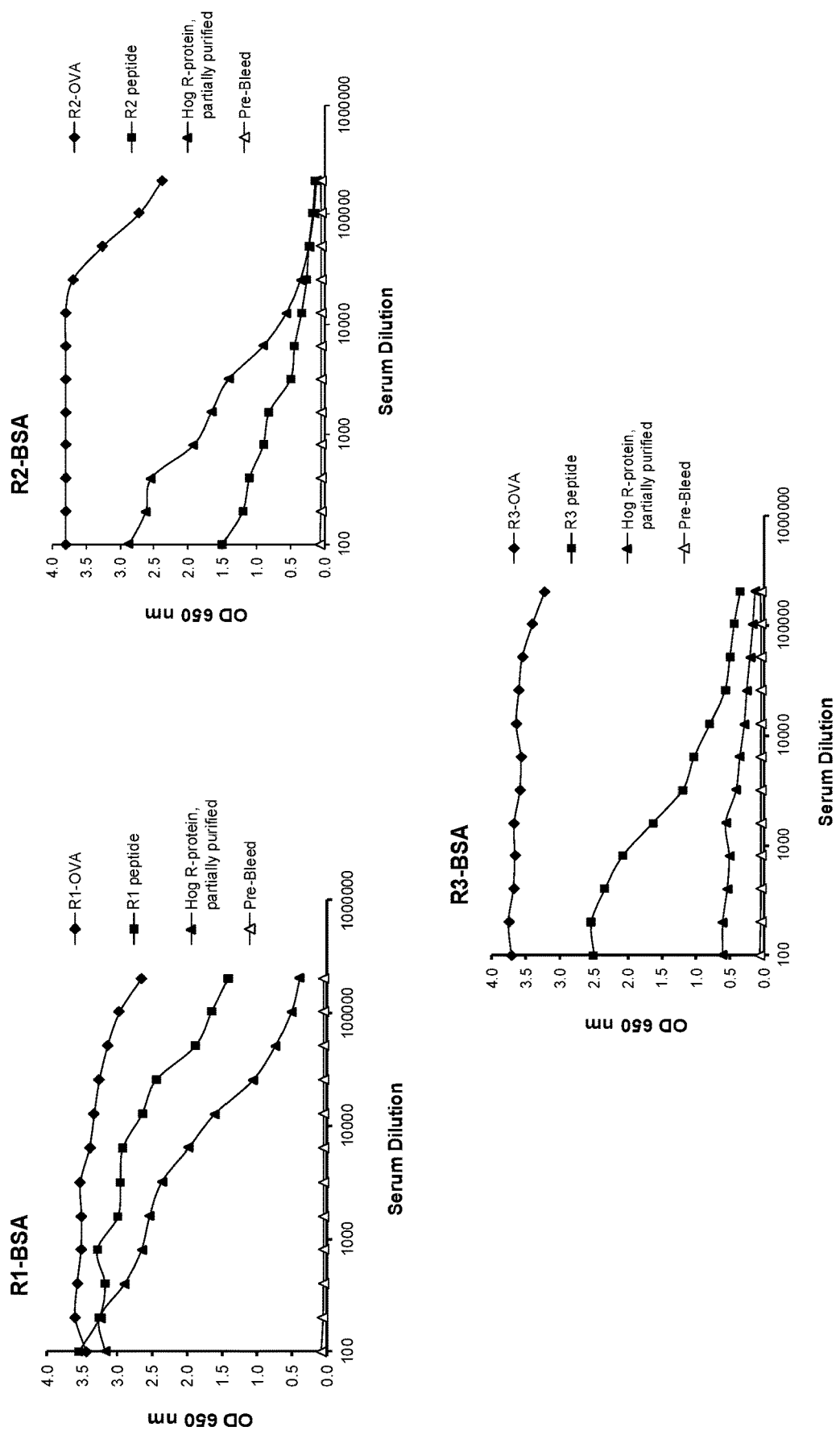
FIG. 4: Immune sera of A/J mice immunized with different Hog TCN1 peptide-BSA conjugates were titrated on ELISA plates coated with synthetic peptide, peptide-OVA conjugate, or partially purified native Hog R-protein. As can be seen, all animals developed high antibody titers to respective peptides and peptide-OVA conjugates; however, only serum from R1-BSA and R2-BSA animals bound partially purified native Hog R-protein.

FIG. 4 shows the results of the mice bleed titration of selected A/J mice. Mice #C3, C1, and C5 were immunized with R1-BSA, R2-BSA, and R3-BSA, respectively. As can be seen, all animals developed high antibody titers to respective peptide and peptide-OVA conjugate, while only sera from R1-BSA- and R2-BSA-immunized animals bound native Hog R-protein. These results confirm that synthetic R1 and R2 peptides induce an immune response to native Hog TCN1. In addition, the epitope corresponding to synthetic R3 peptide may not be readily available for antibody binding on the native, heavily glycosylated protein.

Mice with high anti-peptide antibody titers were selected for monoclonal antibody generation. The mice received prefusion boosts on three consecutive days before fusion with the same immunogen (25 μg/dose/animal in PBS, IP). On the fourth day, mice were sacrificed, and the spleen cells were harvested. Immune splenocytes and P3-X63Ag8.653 murine myeloma cells (ATCC CRL-1580™) were fused in the presence of polyethylene glycol. The fused cells were suspended in HAT-containing medium and cultivated about 10-21 days. Hybridoma supernatants were screened in ELISA for anti-peptide antibodies using plates coated with respective peptide as described above. Positive clones were sub-cloned by limiting dilution, expanded, and frozen. Monoclonal antibodies were purified from hybridoma supernatants on a column of Protein A Sepharose (GE Healthcare, Chicago, Ill.). Table 3 represents the properties of some monoclonal antibodies that were generated to Hog TCN1 peptides.

Example 2: Production of Anti-Hog TCN1 Monoclonal Antibodies Using a Crude Preparation of Hog R-Protein from a Natural Source In this Example, a sample of native Hog R-protein partially purified from powdered crude extract of hog gastric mucosa on Vitamin B12-Sepharose (FIG. 1) was used to immunize 5 BALB/c and 10 A/J female mice to produce monoclonal antibodies to Hog R-protein. Mice received 3 intraperitoneal injections of immunogen (50 μg/dose/animal) with an interval of 3 weeks. Primary immunization was performed using antigen emulsified in Complete Freund's Adjuvant (CFA), followed by subsequent booster immunizations using Incomplete Freund's Adjuvant (IFA).

Figure 6:
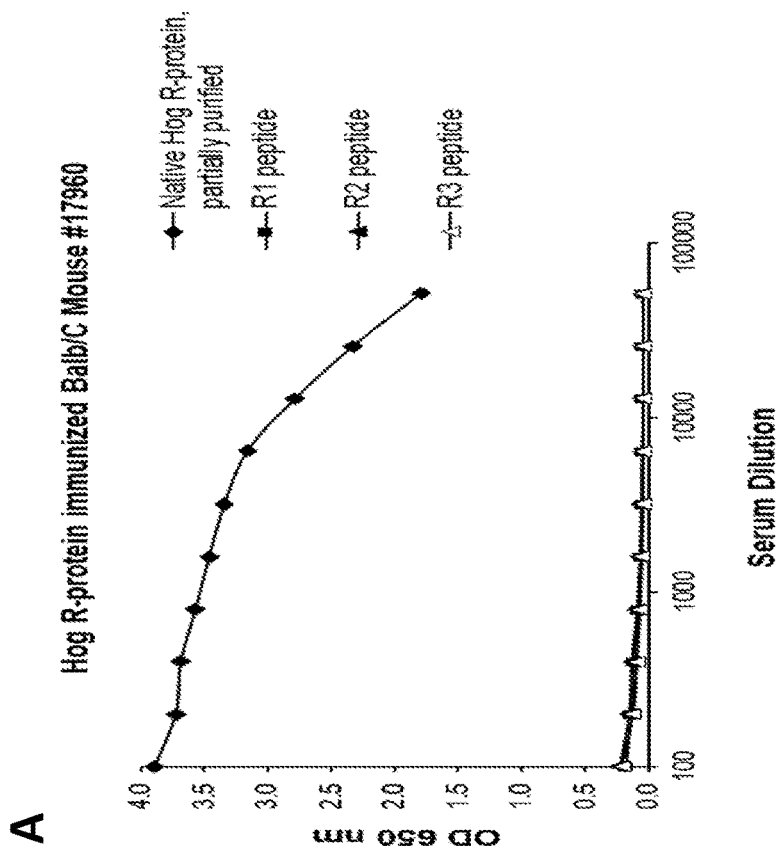
FIG. 6: Immune sera of Balb/C (A) and A/J (B) mice immunized with partially purified native Hog R-protein were titrated on ELISA plates coated with synthetic peptide or partially purified native Hog R-protein. As can be seen, mice of both strains developed high antibody titers to Hog TCN1, but not to synthetic R1, R2, or R3 peptides.

One week after the last injection, mice were bled, and serum samples were tested in an ELISA assay for Hog TCN1-specific antibodies and binding with synthetic peptides as described in Example 1. The 171B 1G5 mAb was used as a positive control for the presence of Hog TCN1 protein on the coated ELISA plates (not shown). All animals immunized with partially purified Hog R-protein developed high antibody titers to the antigen (>1:100,000). FIG. 6

TABLE 3

Monoclonal Antibodies Generated to Hog TCN1 Peptides

| Sample | Immunogen | Epitope | Epitope SEQ ID NO: | Isotype | pI |
|---|---|---|---|---|---|
| 171F 3B9 | R3-BSA | KRSISNGKIKAAIKDS | 4 | IgG2b, κ | 6.0-6.7 |
| 171F 9F5 | R3-BSA | KRSISNGKIKAAIKDS | 4 | IgG2b, κ | 6.0-6.4 |
| 171F 7B4 | R3-BSA | KRSISNGKIKAAIKDS | 4 | IgG1, κ | 5.7-6.0 |
| 171B 1G5 | R2-BSA | QDDMNRRDMS | 3 | IgG2b, κ | 6.0-7.1 |

Purified mAbs were tested in an ELISA assay for binding to corresponding peptide, partially purified native Hog-R-protein, and recombinant Pig TCN1 (Lifespan BioSciences, LS-G23154, Seattle, Wash.), and Hog Intrinsic Factor. For this purpose, 2-fold dilution of the antigens starting from 8 μg/mL in PBS were placed in the wells of ELISA plates at 50 μl per well for 1 hour at room temperature. The plates were flicked dry, blocked with 200 μl per well of blocking solution, and washed three times as described above. Monoclonal antibodies to Hog TCN1 peptides at 1 μg/mL in PBS were added at 50 μl per well. After 1-hour incubation, the plates were washed again, and goat anti-mouse IgG-HRP conjugate diluted 1:3,000 in blocking solution was added at 50 μl per well for 1 hour. The plates were washed, and TMB substrate (Moss, Pasadena, Md.) was added at 100 μl per well for 15 minutes. Plates were read at 650 nm using an ELISA plate reader.

Figure 5:
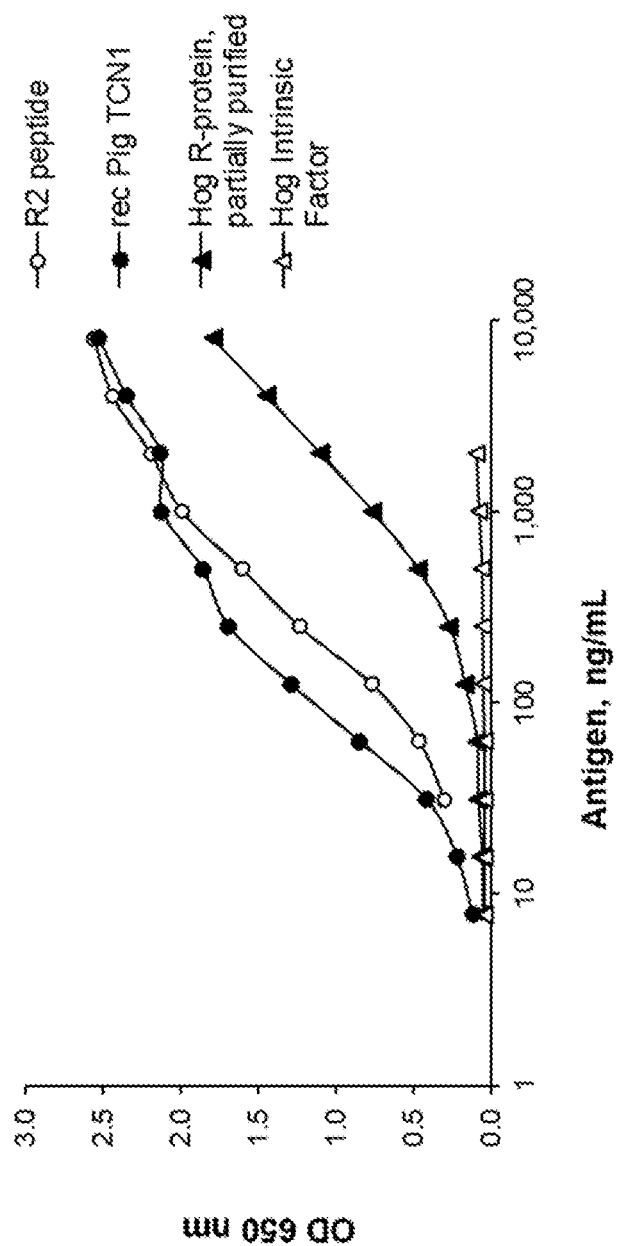
FIG. 5: Antigen binding properties of 171B 1G5 mAb. This monoclonal antibody was generated against R2-BSA conjugate. As can be seen, 171B 1G5 mAb is highly specific to R2 peptide and recognizes both native and recombinant Hog TCN1 proteins. No cross-reactivity to Hog Intrinsic Factor was observed.

While all anti-peptide monoclonal antibodies demonstrated strong dose-dependent binding to corresponding synthetic peptides, only the 171B 1G5 mAb generated against R2 peptide recognized both recombinant Pig TCN1 and partially purified native Hog R-protein. FIG. 5 shows ELISA results of different antigen binding by the 171B 1G5 monoclonal antibody. As can be seen, the 171B 1G5 monoclonal antibody bound R2 peptide as well as both native and recombinant Hog TCN1 proteins, and the mAb also demonstrated no cross-reactivity to Hog Intrinsic Factor. The results of this test confirmed that the sample of partially purified Hog R-protein contains Hog TCN1 and can be used for generation of anti-Hog TCN1 monoclonal antibodies.

presents the examples of Balb/C (Panel A) and A/J (Panel B) mice bleed titrations on different antigens. As can be seen, mice of both strains developed high antibody titers to Hog TCN1, but no binding with synthetic R1, R2, and R3 peptides was observed. These results indicate that these peptides potentially don't represent immunodominant epitopes of native glycosylated Hog R-protein.

Figure 7:
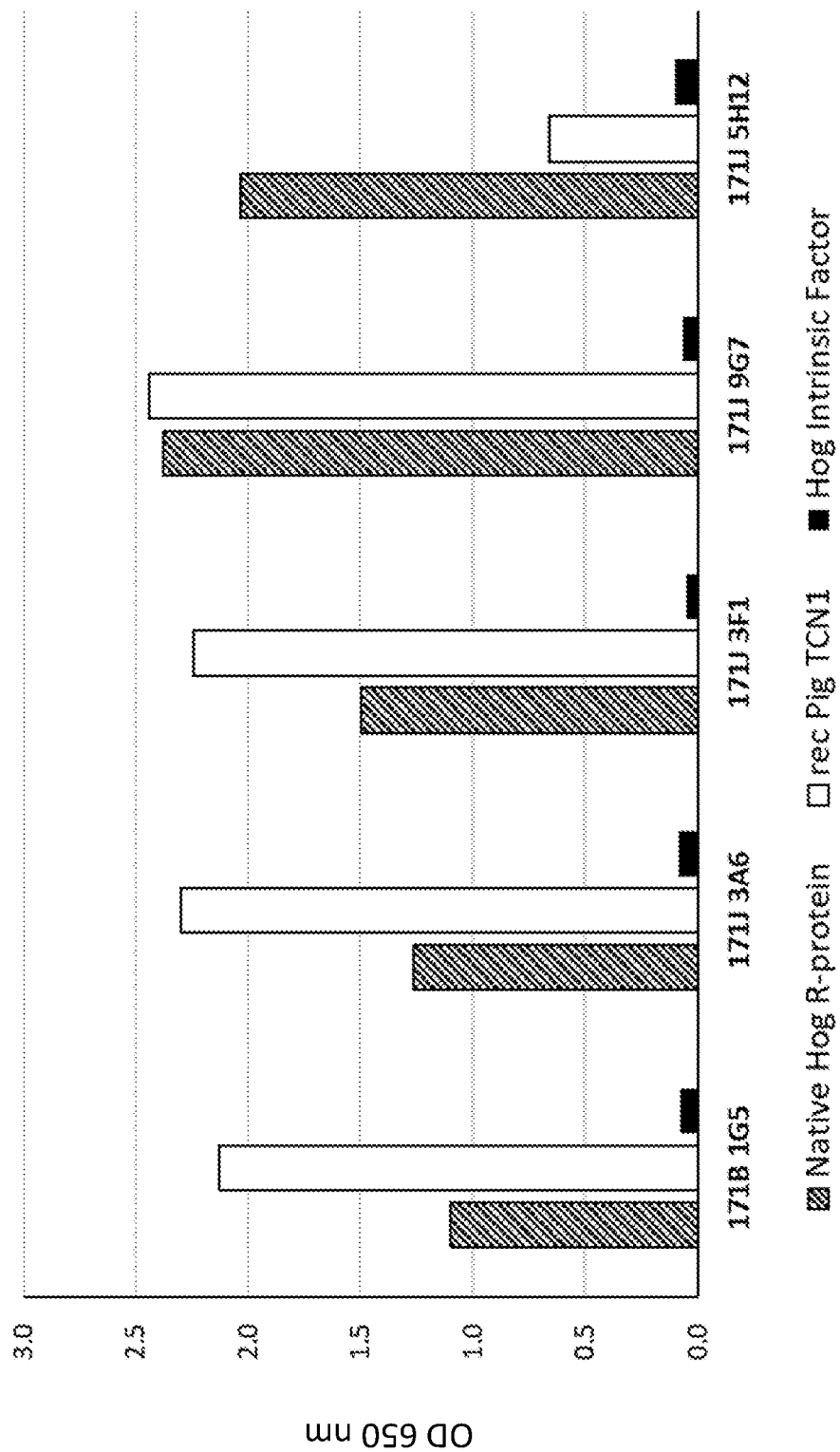
FIG. 7: Selection of hybridomas producing monoclonal antibodies to native Hog TCN1. Hybridoma supernatants were screened in ELISA for binding both rec Pig TCN1 and partially purified native Hog-R-protein. As can be seen, monoclonal antibodies produced by 171J 3F1 and 171J 3A6 clones bound rec Pig TCN1 much better than native Hog R-protein; monoclonal antibody 171J 9G7 recognized both antigens equally well, and 171J 5H12 mAb bound native Hog R-protein more strongly than the recombinant R-protein. No cross-reactivity to Hog Intrinsic Factor was observed.

Mice received prefusion boosts on three consecutive days with the same immunogen (10 μg/dose/animal in PBS, IP), and on the fourth day, mouse spleens were harvested and frozen. Several years later, when recombinant Pig TCN1 protein became commercially available, thawed immune splenocytes were used for hybridoma preparation according to the standard procedure described above in Example 1. Hybridoma supernatants were screened for binding both rec Pig TCN1 (LifeSpan BioSciences, LS-G23154, Seattle, Wash.) and partially purified native Hog-R-protein adsorbed on ELISA plates at 1 μg/mL in 50 μl volume per well. Several hybridomas giving positive signals on both antigens were selected. As can be seen in FIG. 7, monoclonal antibodies produced by the 171J 3F1 and 171J 3A6 clones bound rec Pig TCN1 much better than native Hog R-protein; monoclonal antibody 171J 9G7 recognized both antigens equally well, and the 171J 5H12 mAb bound native Hog R-protein more strongly than rec Pig TCN1. No cross-reactivity of the monoclonal antibodies with Hog Intrinsic Factor was observed. The hybridomas were sub-cloned by limiting dilution, expanded, and frozen. Monoclonal antibodies were purified from hybridoma supernatants on a column of Protein A Sepharose (GE Healthcare, Chicago, Ill.).

Monoclonal antibody epitope mapping was performed by PEPperPRINT GmbH (Heidelberg, Germany) on microarrays of linear 15-mer Hog TCN1 (UniProt ID: P17630.2) and Hog Intrinsic Factor (UniProt ID: F1RI90) peptides with peptide-peptide overlap of 14 amino acids. Briefly, incubation of peptide microarrays with 171B 1G5, 171J 3F1, 171J 3A6, 171J 5H12, or 171J 9G7 monoclonal antibody at concentrations of 1, 10, and 100 μg/mL was followed by staining with secondary goat anti-mouse IgG (H+L) DyLight800 antibody as well as read-out with LI-COR Odyssey Imaging System. Microarray image analysis and peptide annotation were done with PepSlide® Analyzer. Pre-staining of each peptide microarray variant with the secondary antibody did not show any background interaction that could interfere with the main assays.

Figure 8:
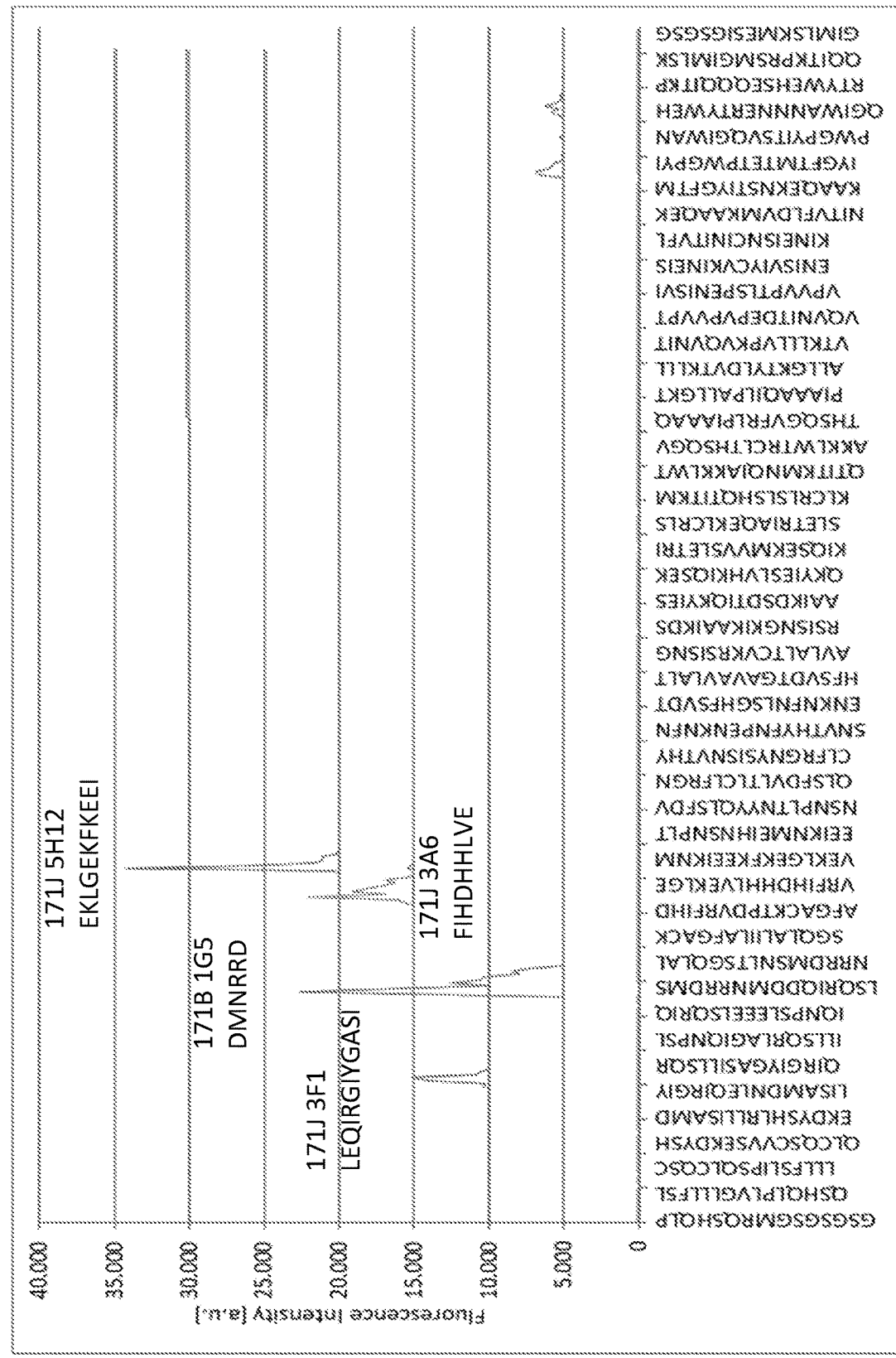
FIG. 8: Summary of epitope mapping of mouse monoclonal antibodies assayed against Hog TCN1 peptide microarray. Results of epitope mapping confirmed that the mAbs are specific to Hog TCN1, and unique linear epitopes were identified for 171B 1G5, 171J 3F1, 171J 3A6, and 171J 5H12 antibodies. Monoclonal antibody 171J 9G7 did not bind any linear Hog TCN1 or Hog Intrinsic Factor peptides.

While none of the mAbs showed any response against linear Hog Intrinsic Factor peptides, even at a high antibody concentration of 100 μg/ml, unique linear Hog TCN1 epitopes were successfully identified for 171B 1G5, 171J 3F1, 171J 3A6, and 171J 5H12 antibodies. No epitope was shared by two or more antibodies, and analysis of their amino acid sequences with FASTA software (EMBL-EBI, Hinxton, Cambridge) confirmed that all identified epitopes are unique for Hog TCN1. FIG. 8 represents a summary of the epitope mapping of mouse mAbs assayed against Hog TCN1 peptide microarrays.

Monoclonal antibody 171J 9G7 did not show any response against the linear Hog TCN1 or Hog Intrinsic Factor peptides, even at a high antibody concentration of 100 μg/ml. This negative outcome likely resulted from a conformational or more complex discontinuous nature of the epitope that could not be mimicked by the linear peptides.

Properties of Hog TCN1 specific monoclonal antibodies are presented in Table 4.

Hog TCN1 mAbs were immobilized at 700-5,000 RU density on the carboxymethyl dextran surface in flow cells 2, 3, and 4 of the CM5 sensor chip using amino-coupling chemistry. Control antibody was immobilized in flow cell 1 for bulk effects subtraction. Recombinant Pig TCN1 (LifeSpan BioSciences, LS-G23154, Seattle, Wash.) or native Hog R-protein were injected over the surfaces with immobilized mAbs during 8 minutes at a 30 μL/min flow rate followed by 20 minutes of dissociation. The buffer blanks were run in triplicate by injection of running buffer (10 mM HEPES, 150 mM NaCl, 0.05% P-20, pH 7.4) and used to double-reference the mAb-binding data before fitting. After each cycle of binding, the surface was regenerated by two consecutive injections of 10 mM Glycine, pH 2.0 and 0.1 M Sodium Bicarbonate, pH 8.5 for 30 seconds each at a 30 μL/min flow rate. Kinetic data were collected over 25-1600 nM antigen concentrations and globally fitted to a simple 1:1 interaction model. Biacore T200 Evaluation Software Version 3.0 (GE Healthcare Bio-Sciences) was used to determine the binding parameters of the Hog TCN1 specific mAbs interaction. Kinetic parameters of the binding of the anti-Hog TCN1 monoclonal antibodies with rec Pig TCN1 and native Hog R-protein are presented in Table 5. As can be seen, 3 out of 5 antibodies interact only with recombinant Pig TCN1, and only 171J 5H12 mAb binds native Hog R-protein with very high affinity, forming an extremely stable complex with this antigen. Monoclonal antibody 171J 9G7 recognizes both antigens, but affinity of the antibody to recombinant protein is more than 500 times higher than to native protein.

TABLE 4

Properties of Hog TCN1 specific Monoclonal Antibodies

| mAb | Epitope | Epitope SEQ ID NO: | AA Positions | Isotype |
| --- | --- | --- | --- | --- |
| 171B 1G5 | DMNRRD | 20 | 82-87 | IgG2b, kappa |
| 171J 3F1 | LEQIRGIYGASI | 21 | 46-57 | IgG1, kappa |
| 171J 3A6 | FIHDHHLVE | 22 | 113-121 | IgG2b, kappa |
| 171J 5H12 | EKLGEKFKEEI | 23 | 121-131 | IgG1, kappa |
| 171J 9G7 | Conformational | N/A | N/A | IgG1, kappa |

Figure 9:
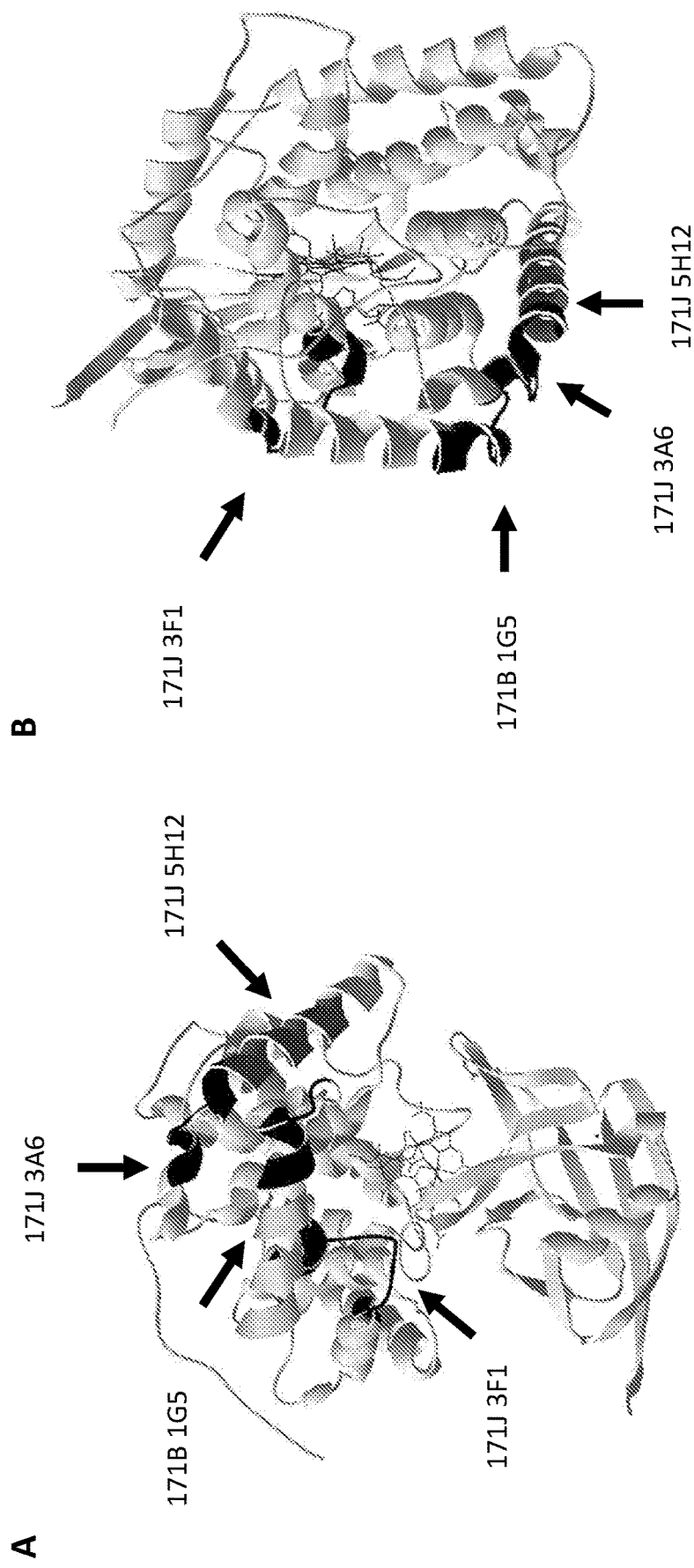
FIG. 9: Surface locations of linear epitopes for 171B 1G5, 171J 3F1, 171J 3A6, and 171J 5H12 antibodies are shown in the front (Panel A) and top (Panel B) views of model TCN1 crystal structure (PDB 4KKJ).

The location of the linear epitopes for 171B 1G5, 171J 3F1, 171J 3A6, and 171J 5H12 monoclonal antibodies on the surface of the TCN1 molecule was determined as described above in Example 1, and these locations are shown in FIG. 9 in the front (Panel A) and top (Panel B) views of the model crystal structure. As can be seen, the epitopes for all 4 mAbs are located on the same side of the protein globule, thus rendering it difficult to impossible to currently use any pair of the mAbs for detection of native Hog TCN1 in sandwich assay. This conclusion was confirmed by ELISA and Biacore pairing experiments (data not shown).

The binding parameters of the interaction between the anti-Hog TCN1 monoclonal antibodies and the TCN1 protein were determined in kinetics experiments using Biacore T200 equipped with Biacore T200 Control Software Version 2.0.1 (GE Healthcare Bio-Sciences, Pittsburgh, Pa.). Anti- These results can be explained by differences in glycosylation of the two antigens. The molecular weight of 46.3 kDa for yeast-produced recombinant Pig TCN1 (Lifespan BioSciences, LS-G23154, Seattle, Wash.) corresponds to the molecular weight of non-glycosylated polypeptide chain. As was mentioned before, native Hog R-protein is heavily glycosylated and comprises up to 50% w/w carbohydrates. Glycosylation, from one side, prevents the 171J 3F1, 171J 3A6, and 171B 1G5 mAbs from native antigen binding, and makes the interaction of the 171J 9G7 mAb with glycosylated Hog R-protein less effective. From the other side, glycosylation promotes binding of the 171J 5H12 mAb to native Hog TCN1, and the carbohydrate moiety is an important part of the epitope recognized by this antibody. This conclusion was confirmed by experiments with enzymatic deglycosylation of native Hog R-protein (data not shown).

TABLE 5

Kinetics Parameters of Monoclonal Antibody Binding
with Recombinant and Native Hog TCN1

| | Antigen | | | | | |
|---|---|---|---|---|---|---|
| | rec TCN1 protein | | | native Hog R-protein | | |
| mAb | $k_a$ (1/Ms) | $k_d$ (1/s) | KD (nM) | $k_a$ (1/Ms) | $k_d$ (1/s) | KD (nM) |
| 171B 1G5 | 6.50E+04 | 4.70E-03 | 72.3 | No Binding Detected | | |
| 171J 3F1 | 7.15E+04 | 1.65E-04 | 2.3 | No Binding Detected | | |
| 171J 3A6 | 2.60E+04 | 6.81E-05 | 2.6 | No Binding Detected | | |
| 171J 5H12 | No Binding Detected | | | 1.15E+05 | 1.90E-05 | 0.17 |
| 171J 9G7 | 5.06E+04 | 3.16E-05 | 0.26 | 4.83E+03 | 6.90E-04 | 142.8 |

Example 3: Sequencing of Anti-Hog TCN1 Monoclonal Antibodies

Hybridoma cells produced as in Examples 1 and 2 were provided that produce monoclonal antibodies 171B 1G5, 171J 3F1, 171J 3A6, 171J 5H12, and 171J 9G7, and total RNA was isolated therefrom following the technical manual of TRIZOL® RNA extraction reagent (Thermo Fisher Scientific, Waltham, MA). Total RNA was then reverse-transcribed into cDNA using either isotype-specific anti-sense primers or universal primers following the technical manual of PRIMESCRIPT™ First Strand cDNA Synthesis Kit (Takara Bio USA, Inc., Mountain View, CA). Antibody fragments of $V_H$, $V_L$, $C_H$, and $C_L$ were amplified according to the standard operating procedure (SOP) of rapid amplification of cDNA ends (RACE) of GenScript (Piscataway, NJ). Amplified antibody fragments were cloned into a standard cloning vector separately. Colony PCR was performed to screen for clones with inserts of correct sizes. No less than five clones with inserts of correct sizes were sequenced for each fragment, and each clone had >99% sequence identity to the other clones. The sequences of different clones were aligned, and the consensus sequences were provided.

Each DNA and amino acid sequence obtained for each monoclonal antibody has been assigned a sequence identifier, as outlined in Table 6. These sequences include DNA sequences of both heavy and light chains, amino acid sequences of heavy and light chains, amino acid sequences of heavy and light chain variable regions, and amino acid sequences of the three complementarity determining regions (CDR1, CDR2, and CDR3) for both heavy and light chain variable regions for each monoclonal antibody.

TABLE 6

Sequence Identifiers Assigned to Various Antibody Sequences

| | SEQ ID NO for: | | | | |
|---|---|---|---|---|---|
| Antibody Sequence | 171B 1G5 | 171J 3F1 | 171J 3A6 | 171J 5H12 | 171J 9G7 |
| DNA sequence of heavy chain | 5 | | | | |
| Amino acid sequence of heavy chain | 6 | | | | |
| DNA sequence of heavy chain variable region | | 24 | 36 | 48 | 60 |
| Amino acid sequence of heavy chain variable region | 7 | 25 | 37 | 49 | 61 |
| Heavy chain CDR1 | 8 | 26 | 38 | 50 | 62 |
| Heavy chain CDR2 | 9 | 27 | 39 | 51 | 63 |
| Heavy chain CDR3 | 10 | 28 | 40 | 52 | 64 |
| DNA sequence of light chain | 11 | | | | |
| Amino acid sequence of light chain | 12 | | | | |
| DNA sequence of light chain variable region | | 29 | 41 | 53 | 65 |
| Amino acid sequence of light chain variable region | 13 | 30 | 42 | 54 | 66 |
| Light chain CDR1 | 14 | 31 | 43 | 55 | 67 |
| Light chain CDR2 | 15 | 32 | 44 | 56 | 68 |
| Light chain CDR3 | 16 | 33 | 45 | 57 | 69 |
| V(D)J junction of heavy chain | 18 | 34 | 46 | 58 | 70 |
| V(D)J junction of light chain | 19 | 35 | 47 | 59 | 71 |

In addition, an IMGT® analysis (ImMunoGeneTics information system, Montpellier, France) of the V(D)J junctions of the heavy and light chain variable region sequences for each monoclonal antibody are shown in Table 7.

TABLE 7

IMGT® Analysis of V(D)J Junctions

| Sequence | V-GENE & allele | Functionality | V-REGION identity % (nt) | J-GENE & allele | D-GENE & allele | AA Junction | Junction Frame |
|---|---|---|---|---|---|---|---|
| Monoclonal Antibody 1716 1G5 | | | | | | | |
| $V_H$ | Musmus IGHV351*01 F | Productive | 97.19% (277/285 nt) | Musmus IGHJ4*01 F | — (a) | CARYDYDVY FSLDYW(a) (SEQ ID NO: 18) | in-frame |
| $V_L$ | Musmus IGKV1-110*01 F | productive | 98.30% (289/294 nt) | Musmus IGKJ5*01 F | — | CSQSTHVPL TF (SEQ ID NO: 19) | in-frame |
| Monoclonal Antibody 171J 3F1 | | | | | | | |
| $V_H$ | Musmus IGHV1-26*01 F | Productive | 89.58% (258/288 nt) | Musmus IGHJ2*01 F | Musmus IGHD1-1*02F | CARNYYDGG SYYFDYW (SEQ ID NO: 34) | in-frame |

TABLE 7-continued

IMGT® Analysis of V(D)J Junctions

| Sequence | V-GENE & allele | Function-ality | V-REGION identity % (nt) | J-GENE & allele | D-GENE & allele | AA Junction | Junction Frame |
|---|---|---|---|---|---|---|---|
| $V_L$ | Musmus IGKV12-41*01 F | productive | 95.34% (266/279 nt) | Musmus IGKJ4*01 F, or Musmus IGKF4*02 F | — | CQHFWNTP FTF (SEQ ID NO: 35) | in-frame |
| Monoclonal Antibody 171J 3A6 | | | | | | | |
| $V_H$ | Musmus IGHV1517*01 P | Productive | 91.67% (264/288 nt) | Musmus IGHJ2*01 F | — | CVRSGGDYF DYW (SEQ ID NO: 46) | in-frame |
| $V_L$ | Musmus IGKV1-117*01 F | productive | 96.94% (285/294 nt) | Musmus IGKJ1*01 F | — | CFQGSHLPW TF (SEQ ID NO: 47) | in-frame |
| Monoclonal Antibody 171J 5H12 | | | | | | | |
| $V_H$ | Musmus IGHV1-80*01 F | Productive | 95.14% (274/288 nt) | Musmus IGHJ1*03 F | Musmus IGHD1-1*01F | CARVNWDA FSYIDVW (SEQ ID NO: 58) | in-frame |
| $V_L$ | Musmus IGKV14-111*01 F | productive | 95.34% (266/279 nt) | Musmus IGKJ2*01 F | — | CLQYDEFPYT F (SEQ ID NO: 59) | in-frame |
| Monoclonal Antibody 171J 9G7 | | | | | | | |
| $V_H$ | Musmus IGHV14-3*02 F | Productive | 93.40% (269/288 nt) | Musmus IGHJ2*03 F | — | CARVFDYW (SEQ ID NO: 70) | in-frame |
| $V_L$ | Musmus IGKV1-110*01 F | productive | 98.64% (290/294 nt) | Musmus IGKJ2*01 F | — | CSQNTHVPY TF (SEQ ID NO: 71) | in-frame |

The isotype of monoclonal antibody 171B 1G5 was mouse IgG2b, kappa.

Figure 10:
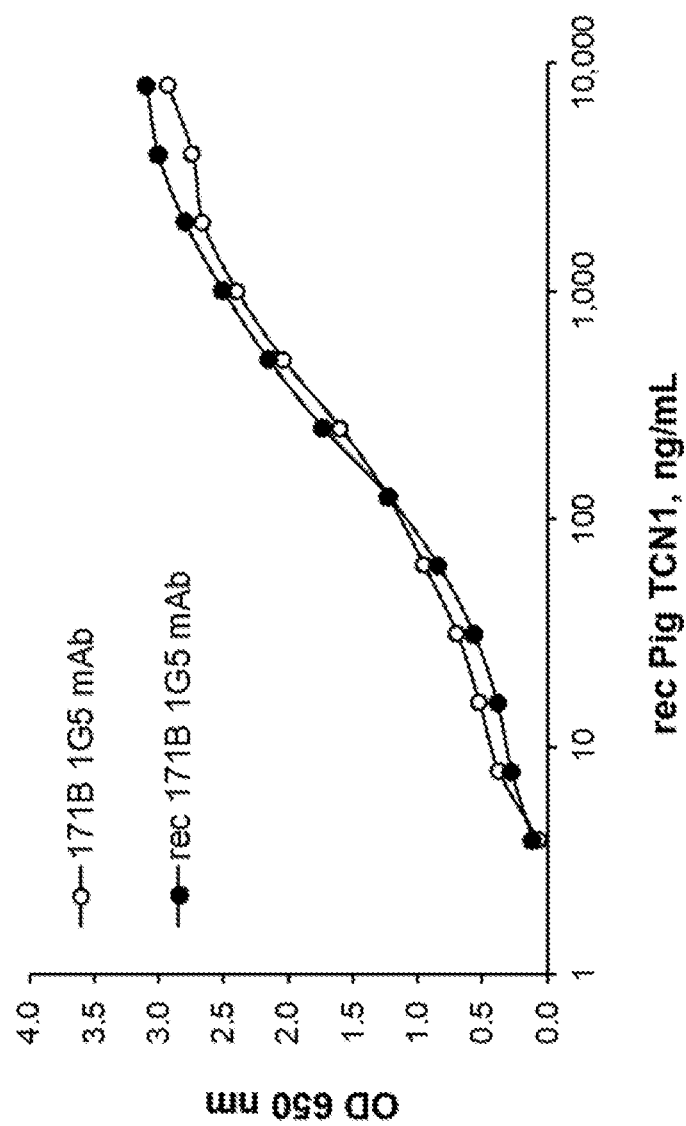
FIG. 10: ELISA titration results of recombinant Pig TCN1 using conventionally produced 171B 1G5 monoclonal antibody versus recombinantly produced 171B 1G5 monoclonal antibody. As can be seen, this data confirms the correct sequencing of the monoclonal antibody, as the two titration curves are superimposable.

Using the sequence information for the anti-Hog TCN1 monoclonal antibodies, synthetic heavy and light chain genes were synthesized and transiently expressed in mammalian cells to produce a small quantity of recombinant antibody. The expressed antibody was purified on a Protein A affinity column and tested in an ELISA assay for Hog TCN1 binding as described above. FIG. 10 shows exemplary ELISA titration results of recombinant Pig TCN1 using conventionally produced 171B 1G5 monoclonal antibody versus recombinantly produced 171B 1G5 monoclonal antibody. As can be seen, the data in FIG. 10 confirms that the sequences obtained for the antibody are correct, as the two titration curves are superimposable.

Example 4: Purification of Native Hog TCN1 Protein from Crude Preparations on an Affinity Column with 171J 5H12 Monoclonal Antibody In this Example, monoclonal antibody 171J 5H12 was used to prepare affinity sorbent for purification of native Hog R-protein from crude preparations. Affinity resins were prepared by covalent immobilization of 30 mg anti-Hog TCN1 monoclonal antibody 171J 5H12 on 3 g CNBr-Sepharose 4B Fast Flow (GE Healthcare Bio-Sciences, #17-0981-01, Pittsburgh, Pa.) using manufacturer's protocols and resuspended in PBS, pH 7.4. A 20% solution of crude powdered extract of hog gastric mucosa was prepared by suspending 42 g of powder in 220 mL of distilled water containing 0.02% sodium azide and stirred at 40° C. for 16 hrs. The resulting suspension was centrifugated at 20,000 g for 1 hour at 40° C., and the turbid supernatant was decanted from the pellet, transferred to new tubes, and centrifuged again at 20,000 g for 40 min at 40° C.

The cleared water extract of the crude hog gastric mucosa (~180 mL) was mixed with 171J 5H12 mAb-Sepharose (~10 mL) and stirred gently on an orbital shaker overnight at room temperature. Affinity resins were separated from the supernatant with vacuum suction on a Buchner funnel containing a medium sintered glass disk, washed 3 times with PBS, pH 7.4, and packed in a glass column (1.5×7.2 cm, V=12.7 mL). The column was washed with 100 mL PBS, pH 7.4 followed by 100 mL of 0.1 M Sodium Citrate, pH 5.0 at 10 mL/min flow rate. Bound protein was eluted from the column with 100 mL of 0.1 M Sodium Citrate, pH 2.2, and fractions were monitored by absorption at 280 nm. Protein containing fractions were pooled and dialyzed against two changes PBS containing 0.02% sodium azide, pH 7.4 (2 L each). A total of 7.8 mg of protein was purified from 42 g crude powdered extract of hog gastric mucosa.

Figure 11:
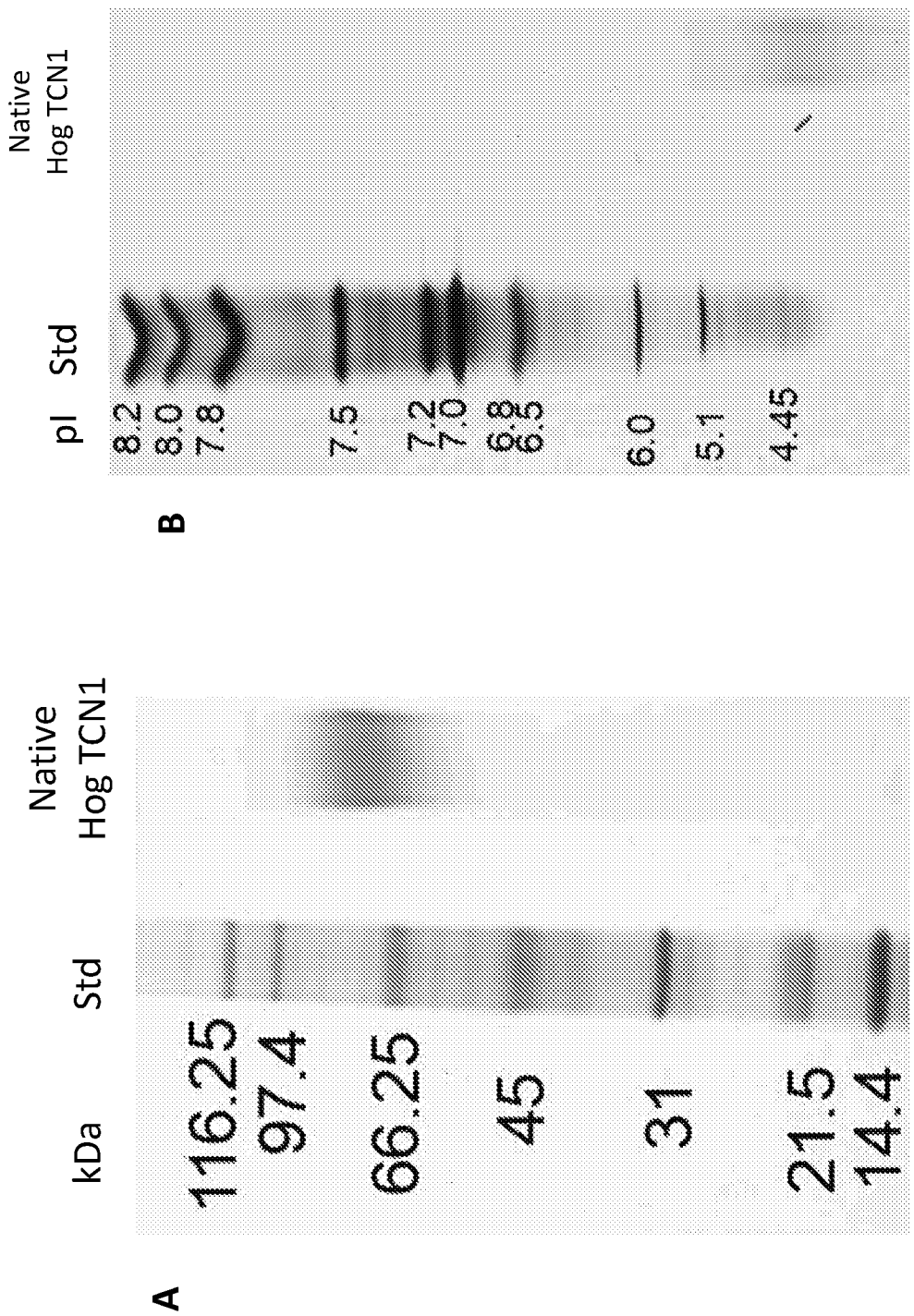
FIG. 11: Native Hog R-protein affinity purified on the column with 171J 5H12 mAb from powdered crude extract of hog gastric mucosa. Panel A: SDS-PAGE at reducing conditions stained with Coomassie Blue R, shows that the sample of native Hog R-protein (wide 70-92 kDa band) is homogeneous. Panel B: Isoelectric focusing, BioSafe Coomassie stain, shows that native Hog TCN1 is a very acidic protein with pI<4.5.

As can be seen in FIG. 11, like native Hog TCN1, protein purified on the affinity column with 171J 5H12 mAb migrates as a single 70-92 kDa wide band on SDS-PAGE at reducing conditions (Panel A) and has a very acidic isoelectric point (pI<4.5, Panel B).

Protein identification was done by Bio-Synthesys (Lewisville, Tex.) by trypsin digestion of 70-92 kDa protein in gel slices. Peptides were analyzed by nano-capillary LC-MS/MS followed by a data search. The major protein in the sample was identified as Hog Transcobalamin I, and peptides covered 67% Hog TCN1 sequence.

This Example demonstrates that monoclonal antibody 171J 5H12 can be used for affinity resins preparation. Such resins can be used for single step isolation of homogeneous native Hog TCN1 from crude extract of hog gastric mucosa at very gentle conditions.

Example 5: Detection of Native Hog TCN1 Using ELISA with 171J 5H12 mAb

In this Example, monoclonal antibody 171J 5H12 was used in an ELISA assay for detection of native Hog R-protein in crude preparations and purified samples of Hog Intrinsic Factor. Native Hog TCN1 affinity purified on the column with immobilized 171J 5H12 monoclonal antibody (FIG. 11) was used as a standard to prepare standard titration curve. All ELISA steps were performed at room temperature. Nunc Maxi-Sorp™ flat-bottom ELISA plates were coated with Vitamin B12-BSA conjugate at 2 µg/mL in PBS at 50 µl per well for 1 hour. The plates were flicked dry, blocked with 200 µl per well of blocking solution, and washed as described above. 2-fold dilutions of native Hog TCN1 (2000 ng/mL) and samples to be tested were prepared in PBS and placed in the wells of the plates at volume 50 µl per well. After 1-hour incubation and washing the plates, 171J 5H12 mAb was added at 1 µg/mL in PBS at 50 µL per well. The plates were incubated for 1 hour and washed, and then goat anti-mouse IgG-HRP conjugate diluted 1:3,000 in blocking solution was added at 50 µl per well for 1 hour. The plates were washed again, and TMB substrate (Moss, Pasadena, Md.) was added at 100 µL per well for 15 minutes. Plates were read at 650 nm using an ELISA plate reader.

Figure 12:
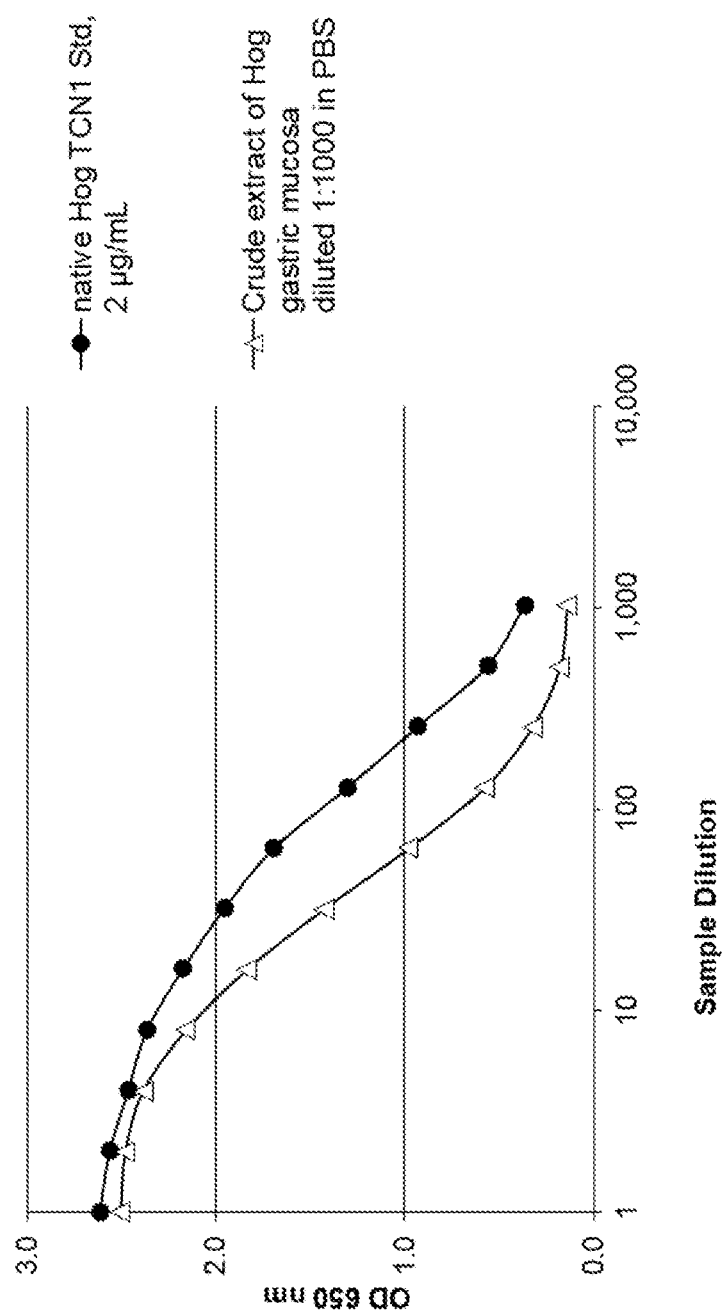
FIG. 12: Detection of native Hog TCN1 in crude extract of hog gastric mucosa using an ELISA assay with monoclonal antibody 171J 5H12. Detection limit is at least 1 ng/mL.

FIG. 12 demonstrates detection of native Hog TCN1 in a crude extract of hog gastric mucosa using an ELISA assay with monoclonal antibody 171J 5H12. As can be seen, the assay allows for the detection of at least 1 ng/mL of native Hog TCN1 in the sample.

Figure 13:
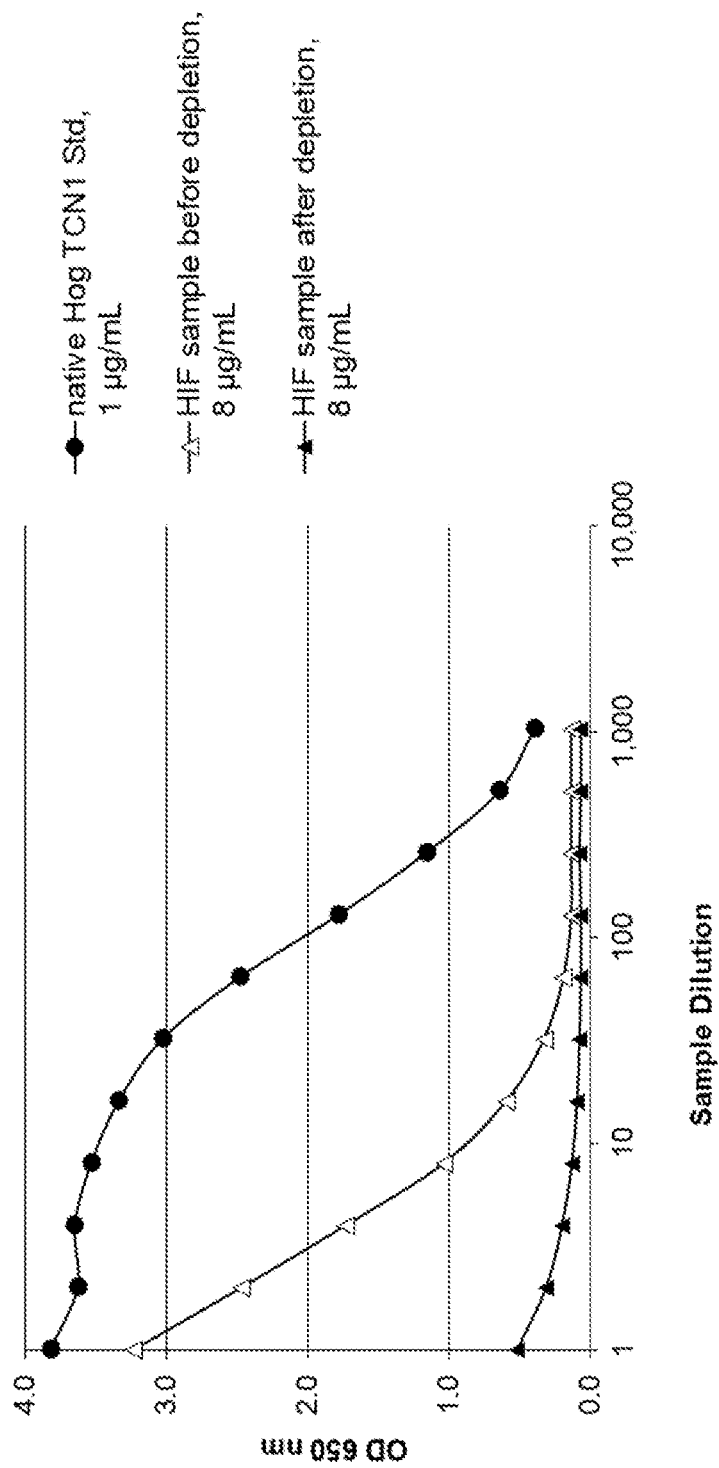
FIG. 13: Hog Intrinsic Factor sample polishing with 171J 5H12 mAb-Sepharose. HIF sample before and after depletion on affinity resins with 171J 5H12 monoclonal antibodies was tested in an ELISA assay for the presence of native Hog TCN1. As can be seen, after depletion, the level of Hog TCN1 contamination decreased significantly from 2.7 to 0.1% of total protein.

Example 6: Hog Intrinsic Factor Sample Polishing on Affinity Resin with 171J 5H12 mAb In this Example, monoclonal antibody 171J 5H12 specific to native Hog TCN1 was used for the development of affinity resins for use in the removal of Hog TCN1 contaminants from Hog Intrinsic Factor preparations and/or in the polishing of the purified HIF, as needed. A sample of Hog Intrinsic Factor was tested in the ELISA assay described in Example 5, and a low level of Hog TCN1 contamination was detected. To remove the contaminant, the depletion of the sample was performed on affinity resins with immobilized 171J 5H12 mAb. 100 µL of 171J 5H12-Sepharose 4B prepared as described in Example 4 was added to 300 µl of HIF (1 mg/mL) and incubated for 5 hours at room temperature with periodic gentle mixing. Affinity resins were removed by centrifugation at 3000 g for 15 min at room temperature, and supernatant was tested in an ELISA assay for the presence of native Hog TCN1. FIG. 13 shows the results of Hog Intrinsic Factor sample polishing with 171J 5H12 mAb-Sepharose. As can be seen, after depletion, the level of Hog TCN1 contamination decreased from 2.7 to 0.1% of total protein.

Thus, in accordance with the present disclosure, there have been provided compositions and methods of producing and using same which fully satisfy the objectives and advantages set forth hereinabove. Although the present disclosure has been described in conjunction with the specific drawings, experimentation, results, and language set forth hereinabove, it is evident that many alternatives, modifications, and variations will be apparent to those skilled in the art. Accordingly, it is intended to embrace all such alternatives, modifications, and variations that fall within the spirit and broad scope of the present disclosure.

---

What is claimed is:

1. An antibody or antigen-binding fragment thereof that can specifically bind to hog transcobalamin-1 (TCN1), wherein the antibody or antigen-binding fragment thereof is selected from the group consisting of:
   (A) an antibody or antigen-binding fragment thereof comprising a heavy chain variable region CDR1 having the amino acid sequence of SEQ ID NO:8, a heavy chain variable region CDR2 having the amino acid sequence of SEQ ID NO:9, a heavy chain variable region CDR3 having the amino acid sequence of SEQ ID NO: 10, a light chain variable region CDR1 having the amino acid sequence of SEQ ID NO: 14, a light chain variable region CDR2 having the amino acid sequence of SEQ ID NO:15, and a light chain variable region CDR3 having the amino acid sequence of SEQ ID NO:16;
   (B) an antibody or antigen-binding fragment thereof comprising a heavy chain variable region CDR1 having the amino acid sequence of SEQ ID NO:26, a heavy chain variable region CDR2 having the amino acid sequence of SEQ ID NO:27, a heavy chain variable region CDR3 having the amino acid sequence of SEQ ID NO: 28, a light chain variable region CDR1 having the amino acid sequence of SEQ ID NO: 31, a light chain variable region CDR2 having the amino acid sequence of SEQ ID NO:32, and a light chain variable region CDR3 having the amino acid sequence of SEQ ID NO:33;
   (C) an antibody or antigen-binding fragment thereof comprising a heavy chain variable region CDR1 having the amino acid sequence of SEQ ID NO:38, a heavy chain variable region CDR2 having the amino acid sequence of SEQ ID NO:39, a heavy chain variable region CDR3 having the amino acid sequence of SEQ ID NO: 40, a light chain variable region CDR1 having the amino acid sequence of SEQ ID NO: 43, a light chain variable region CDR2 having the amino acid sequence of SEQ ID NO:44, and a light chain variable region CDR3 having the amino acid sequence of SEQ ID NO:45;
   (D) an antibody or antigen-binding fragment thereof comprising a heavy chain variable region CDR1 having the amino acid sequence of SEQ ID NO:50, a heavy chain variable region CDR2 having the amino acid sequence of SEQ ID NO:51, a heavy chain variable region CDR3 having the amino acid sequence of SEQ ID NO: 52, a light chain variable region CDR1 having the amino acid sequence of SEQ ID NO: 55, a light chain variable region CDR2 having the amino acid sequence of SEQ ID NO:56, and a light chain variable region CDR3 having the amino acid sequence of SEQ ID NO:57; and
   (E) an antibody or antigen-binding fragment thereof comprising a heavy chain variable region CDR1 having the amino acid sequence of SEQ ID NO:62, a heavy chain variable region CDR2 having the amino acid sequence of SEQ ID NO:63, a heavy chain variable region CDR3 having the amino acid sequence of SEQ ID NO: 64, a light chain variable region CDR1 having the amino acid sequence of SEQ ID NO: 67, a light chain variable region CDR2 having the amino acid sequence of SEQ ID NO:68, and a light chain variable region CDR3 having the amino acid sequence of SEQ ID NO:69.

2. The antibody or antigen-binding fragment thereof of claim 1, wherein:
   (A) the antibody or antigen-binding fragment thereof specifically binds to an epitope of hog TCN1 comprising at least a portion of at least one of SEQ ID NO:3 and 20;
   (B) the antibody or antigen-binding fragment thereof specifically binds to an epitope of hog TCN1 comprising at least a portion of SEQ ID NO:21;
   (C) the antibody or antigen-binding fragment thereof specifically binds to an epitope of hog TCN1 comprising at least a portion of SEQ ID NO:22; or
   (D) the antibody or antigen-binding fragment thereof specifically binds to an epitope of hog TCN1 comprising at least a portion of SEQ ID NO:23.

3. The antibody or antigen-binding fragment thereof of claim 1, further defined as a monoclonal antibody or antigen-binding fragment thereof.

4. The antibody or antigen-binding fragment thereof of claim 1, wherein:
   (A) a heavy chain variable region of the antibody or antigen-binding fragment thereof has an amino acid sequence that is at least about 90% identical to SEQ ID NO:7;

(B) a heavy chain variable region of the antibody or antigen-binding fragment thereof has an amino acid sequence that is at least about 90% identical to SEQ ID NO:25;

(C) a heavy chain variable region of the antibody or antigen-binding fragment thereof has an amino acid sequence that is at least about 90% identical to SEQ ID NO:37;

(D) a heavy chain variable region of the antibody or antigen-binding fragment thereof has an amino acid sequence that is at least about 90% identical to SEQ ID NO:49; or (E) a heavy chain variable region of the antibody or antigen-binding fragment thereof has an amino acid sequence that is at least about 90% identical to SEQ ID NO:61.

5. The antibody or antigen-binding fragment thereof of claim 1, wherein:

(A) a light chain variable region of the antibody or antigen-binding fragment thereof has an amino acid sequence that is at least about 90% identical to SEQ ID NO:13;

(B) a light chain variable region of the antibody or antigen-binding fragment thereof has an amino acid sequence that is at least about 90% identical to SEQ ID NO:30;

(C) a light chain variable region of the antibody or antigen-binding fragment thereof has an amino acid sequence that is at least about 90% identical to SEQ ID NO:42;

(D) a light chain variable region of the antibody or antigen-binding fragment thereof has an amino acid sequence that is at least about 90% identical to SEQ ID NO:54; or (E) a light chain variable region of the antibody or antigen-binding fragment thereof has an amino acid sequence that is at least about 90% identical to SEQ ID NO:66.

6. The antibody or antigen-binding fragment thereof of claim 1, wherein:

(A) the heavy and light chain variable regions of the antibody or antigen-binding fragment thereof have the amino acid sequences of SEQ ID NOS: 7 and 13, respectively;

(B) the heavy and light chain variable regions of the antibody or antigen-binding fragment thereof have the amino acid sequences of SEQ ID NOS: 25 and 30, respectively;

(C) the heavy and light chain variable regions of the antibody or antigen-binding fragment thereof have the amino acid sequences of SEQ ID NOS: 37 and 42, respectively;

(D) the heavy and light chain variable regions of the antibody or antigen-binding fragment thereof have the amino acid sequences of SEQ ID NOS: 49 and 54, respectively; or (E) the heavy and light chain variable regions of the antibody or antigen-binding fragment thereof have the amino acid sequences of SEQ ID NOS: 61 and 66, respectively.

7. The antibody or antigen-binding fragment thereof of claim 1, further defined as being selected from a full length immunoglobulin molecule, an scFv, a Fab fragment, a Fab' fragment, F(ab')$_2$, a Fv, a disulfide linked Fv, and combinations thereof.

8. The antibody or antigen-binding fragment thereof of claim 1, further defined as a purified antibody or antigen-binding fragment thereof.

9. A method of producing an antibody or antigen-binding fragment thereof of claim 1 that can specifically bind to an epitope of hog transcobalamin-1 (TCN1), the method comprising the steps of:

immunizing a non-human animal with an antigenic compound comprising at least one peptide of SEQ ID NO:2, 3, 4, 20, 21, 22, or 23; and recovering the antibody or antigen-binding fragment thereof from blood plasma of the non-human animal.

10. A hybridoma producing the antibody or antigen-binding fragment thereof of claim 1.

11. A method of producing an antibody or antigen-binding fragment thereof that can specifically bind to an epitope of hog transcobalamin-1 (TCN1), the method comprising the steps of:

culturing the hybridoma according to claim 10 to produce the antibody or antigen-binding fragment thereof; and recovering the antibody or antigen-binding fragment thereof.

12. A composition, comprising:

at least one antibody or antigen-binding fragment thereof of claim 1; and a detectable label attached to the at least one antibody or antigen-binding fragment thereof.

13. A composition, comprising:

a solid support; and at least one antibody or antigen-binding fragment thereof of claim 1 bound to the solid support.

14. A polynucleotide encoding the antibody or antigen-binding fragment thereof of claim 1.

15. The polynucleotide of claim 14, wherein:

(A) a portion of the polynucleotide encoding a heavy chain of the antibody or antigen-binding fragment thereof is at least about 90% identical to SEQ ID NO:5;

(B) a portion of the polynucleotide encoding a heavy chain variable region of the antibody or antigen-binding fragment thereof is at least about 90% identical to SEQ ID NO:24;

(C) a portion of the polynucleotide encoding a heavy chain variable region of the antibody or antigen-binding fragment thereof is at least about 90% identical to SEQ ID NO:36;

(D) a portion of the polynucleotide encoding a heavy chain variable region of the antibody or antigen-binding fragment thereof is at least about 90% identical to SEQ ID NO:48; or (E) a portion of the polynucleotide encoding a heavy chain variable region of the antibody or antigen-binding fragment thereof is at least about 90% identical to SEQ ID NO:60.

16. The polynucleotide of claim 14, wherein:

(A) a portion of the polynucleotide encoding a light chain of the antibody or antigen-binding fragment thereof is at least about 90% identical to SEQ ID NO:11;

(B) a portion of the polynucleotide encoding a light chain variable region of the antibody or antigen-binding fragment thereof is at least about 90% identical to SEQ ID NO:29;

(C) a portion of the polynucleotide encoding a light chain variable region of the antibody or antigen-binding fragment thereof is at least about 90% identical to SEQ ID NO:41;

(D) a portion of the polynucleotide encoding a light chain variable region of the antibody or antigen-binding fragment thereof is at least about 90% identical to SEQ ID NO:53; or (E) a portion of the polynucleotide encoding a light chain variable region of the antibody or antigen-binding fragment thereof is at least about 90% identical to SEQ ID NO:65.

17. A vector, comprising:
a polynucleotide encoding the antibody or antigen-binding fragment thereof of claim 1; or
the polynucleotide of claim 14.

18. A recombinant host cell, comprising:
a polynucleotide encoding the antibody or antigen-binding fragment thereof of claim 1; or
the polynucleotide of claim 14.

19. A method of producing an antibody or antigen-binding fragment thereof that can specifically bind to hog transcobalamin-1 (TCN1), the method comprising the steps of:
   (a) culturing the recombinant host cell of claim 18 in a cell culture under conditions that allow for the expression of the antibody or antigen-binding fragment thereof encoded by the polynucleotide; and
   (b) isolating the antibody or antigen-binding fragment thereof from the cell culture.

20. A method of detecting TCN1 present in a hog intrinsic factor (HIF) preparation, the method comprising the steps of:
   contacting the HIF preparation with the antibody or antigen-binding fragment thereof of claim 1 under conditions whereby an antibody/TCN1 complex is formed if TCN1 is present in the HIF preparation; and
   detecting any antibody/TCN1 complex formed, wherein an amount of antibody/TCN1 complex formed is directly proportional to an amount of TCN1 present in the HIF preparation.

21. The method of claim 20, wherein the antibody or antigen-binding fragment thereof has a label attached thereto that is used in the detection of the antibody/TCN1 complex.

22. A method of removing TCN1 present in a hog intrinsic factor (HIF) preparation, the method comprising the steps of:
   contacting the HIF preparation with the antibody or antigen-binding fragment thereof of claim 1 under conditions whereby an antibody/TCN1 complex is formed if TCN1 is present in the HIF preparation; and
   removing the antibody/TCN1 complex from the HIF preparation.

23. The method of claim 22, wherein the antibody or antigen-binding fragment thereof is attached to a solid support that aids in removal of the antibody/TCN1 complex from the HIF preparation.

24. The method of claim 22, further comprising the step of eluting the TCN1 from the antibody/TCN1 complex to thereby purify the TCN1 from the HIF preparation.

25. A kit comprising:
the antibody or antigen-binding fragment thereof of claim 1;
the hybridoma of claim 10;
the composition of claim 12;
the polynucleotide of claim 14;
the vector of claim 17; or
the recombinant host cell of claim 18.

26. The kit of claim 25, further comprising an antibody or antigen-binding fragment thereof that can specifically bind to hog intrinsic factor (HIF).

\* \* \* \* \*